US010263345B2

(12) United States Patent
Ng et al.

(10) Patent No.: US 10,263,345 B2
(45) Date of Patent: Apr. 16, 2019

(54) MULTIPORT MULTIBAND VEHICULAR ANTENNA ASSEMBLIES INCLUDING MULTIPLE RADIATORS

(71) Applicant: Laird Technologies, Inc., Earth City, MO (US)

(72) Inventors: Kok Jiunn Ng, Perak (MY); Yih Jia Teoh, Kedah (MY); Kean Meng Lim, Kedah (MY); En Chi Lee, Kedah (MY); Tshu Pin Chee, Penang (MY)

(73) Assignee: LAIRD TECHNOLOGIES, INC., Earth City ( * ) Notice: Subject to any disclaimer, the term of this patent is extended or adjusted under 35 U.S.C. 154(b) by 0 days.

(21) Appl. No.: 15/835,277

(22) Filed: Dec. 7, 2017

(65) Prior Publication Data
US 2018/0109006 A1    Apr. 19, 2018

Related U.S. Application Data

(63) Continuation-in-part of application No. PCT/US2016/036864, filed on Jun. 10, 2016.

(30) Foreign Application Priority Data

Jun. 11, 2015    (MY) .............................. PI2015701948

(51) Int. Cl.
*H01Q 21/28*     (2006.01)
*H01Q 1/42*      (2006.01)
(Continued)

(52) U.S. Cl.
CPC .......... *H01Q 21/28* (2013.01); *H01Q 1/3275* (2013.01); *H01Q 1/405* (2013.01); *H01Q 1/42* (2013.01);
(Continued)

(58) Field of Classification Search
CPC ....... H01Q 21/28; H01Q 1/3275; H01Q 1/405
(Continued)

(56) References Cited

U.S. PATENT DOCUMENTS

| 7,289,074 B2 | 10/2007 | Yamaguchi |
| 9,093,750 B2 * | 7/2015 | Thiam ................. H01Q 9/0407 |

(Continued)

FOREIGN PATENT DOCUMENTS

| JP | 2004056773 A | 2/2004 |
| KR | 20150028134 A | 3/2015 |
| WO | WO-2014204494 A1 | 12/2014 |

OTHER PUBLICATIONS

International Search Report and Written Opinion dated Aug. 31, 2016 for PCT Application No. PCT/US2016/036864 filed Jun. 10, 2016 (published as WO 2016/201208 dated Dec. 15, 2016) which is the parent application to the instant application, 11 pages.

*Primary Examiner* — Peguy Jean Pierre

(57) ABSTRACT

Exemplary embodiments are disclosed of multiport multiband vehicular antenna assemblies. In exemplary embodiments, a multiport multiband antenna assembly may include multiple ports (e.g., three, four, or five ports, etc.) with different combinations of antennas or radiators operable over various frequencies, such as one or more cellular frequencies (e.g., Long Term Evolution (LTE), etc.), internet frequencies (e.g., Wi-Fi, Wi-Fi ISM, etc.), satellite navigation frequencies (e.g., Global Positioning System (GPS), Global Navigation Satellite System (GLONASS), etc.), and/or other frequencies. For example, a multiport multiband antenna assembly may include radiators or antennas operable with LTE, WI-FI, GPS (and/or with other cellular, internet, and/or satellite navigation frequencies) where the radiators or antennas are located and/or part of a single antenna system, e.g., positioned on and/or supported by the same or common base assembly and within the same interior
(Continued)

enclosure cooperatively defined by the base assembly and radome of a single roof-mount antenna system, etc.

20 Claims, 50 Drawing Sheets

(51) Int. Cl.
- *H01Q 1/32* (2006.01)
- *H01Q 1/40* (2006.01)
- *H01Q 21/24* (2006.01)
- *H01Q 21/30* (2006.01)
- *H04B 7/0413* (2017.01)
- *H01Q 1/38* (2006.01)
- *H01Q 9/36* (2006.01)
- *H01Q 1/22* (2006.01)
- *H01Q 9/04* (2006.01)

(52) U.S. Cl.
CPC .......... *H01Q 21/24* (2013.01); *H01Q 21/30* (2013.01); *H04B 7/0413* (2013.01); *H01Q 1/2291* (2013.01); *H01Q 1/38* (2013.01); *H01Q 9/0407* (2013.01); *H01Q 9/36* (2013.01)

(58) Field of Classification Search
USPC ........................................................ 343/173
See application file for complete search history.

(56) References Cited

U.S. PATENT DOCUMENTS

| | | | |
|---|---|---|---|
| 9,692,501 B1* | 6/2017 | Mitchell | H04B 7/1851 |
| 2012/0032863 A1* | 2/2012 | Lai | H01Q 1/243 |
| | | | 343/767 |
| 2014/0043204 A1 | 2/2014 | Basnayake et al. | |
| 2015/0130679 A1 | 5/2015 | Shin et al. | |
| 2016/0064807 A1* | 3/2016 | Reed | H01Q 1/3275 |
| | | | 343/713 |
| 2016/0104932 A1* | 4/2016 | Anninzadeh | H01Q 1/3275 |
| | | | 343/872 |

* cited by examiner

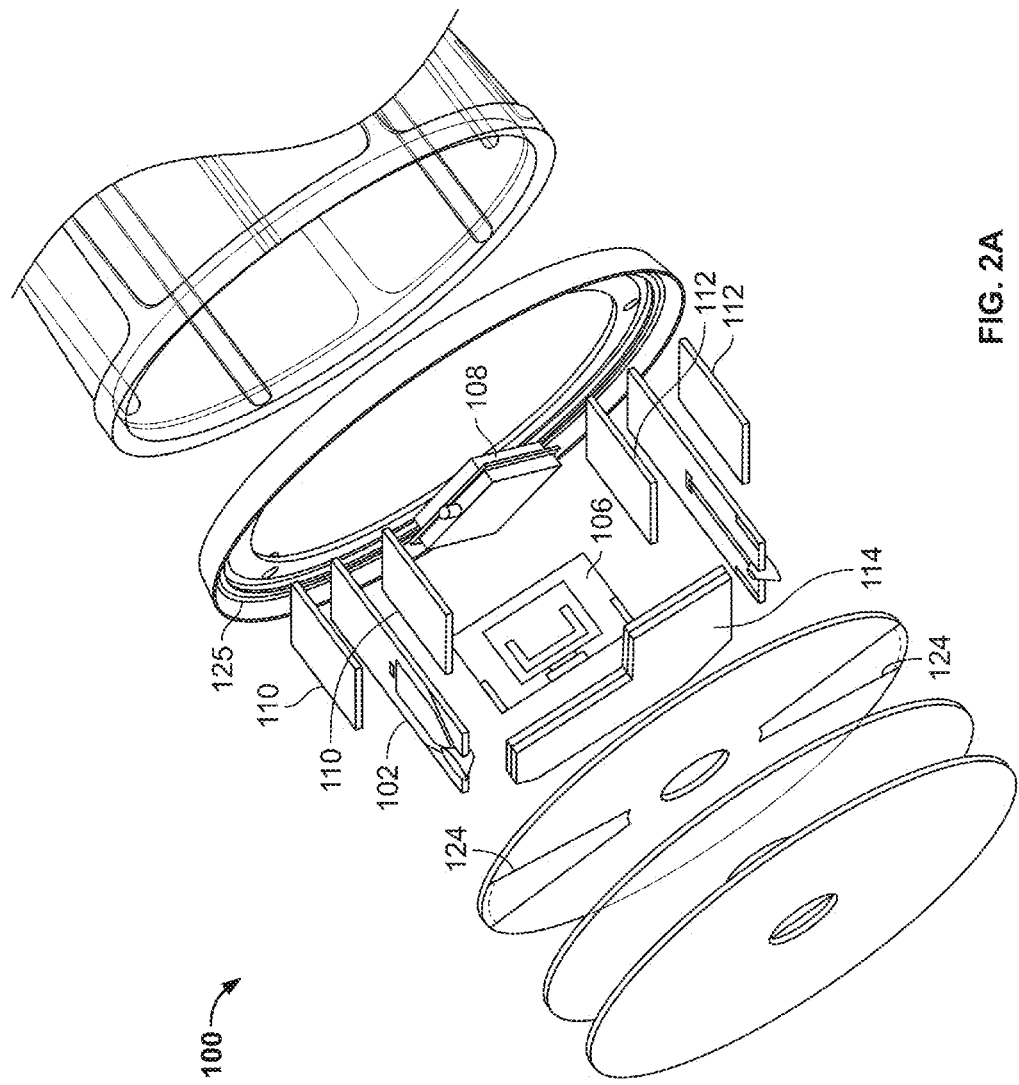

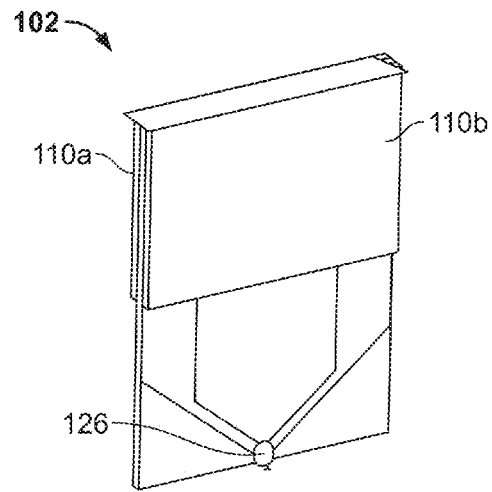
FIG. 3A
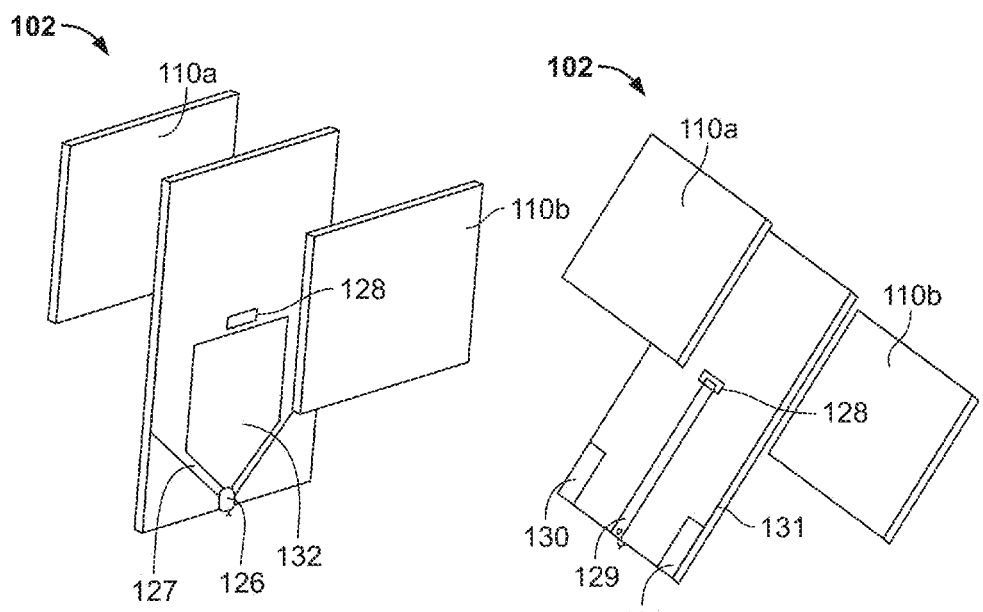
FIG. 3B
FIG. 3C

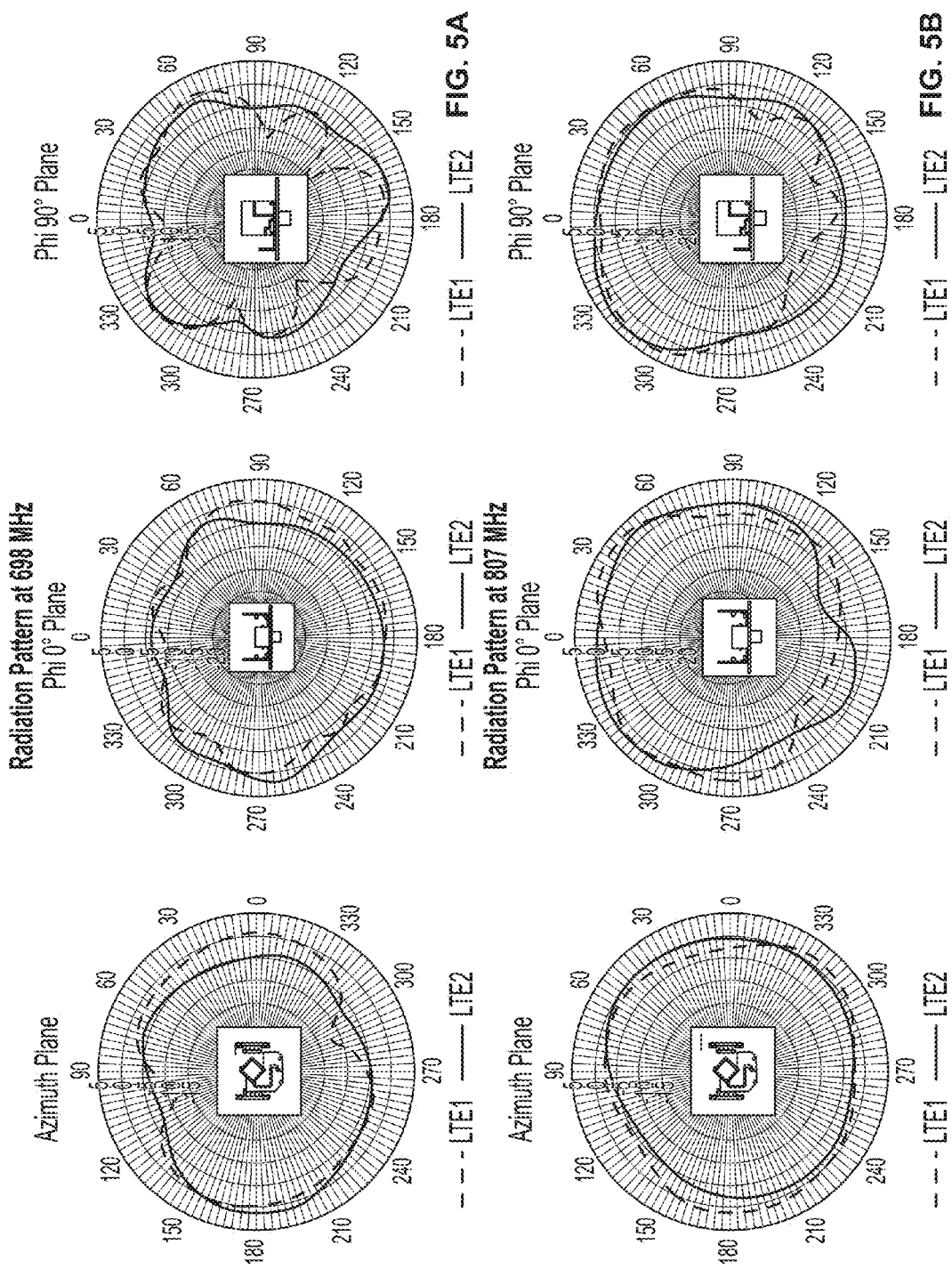

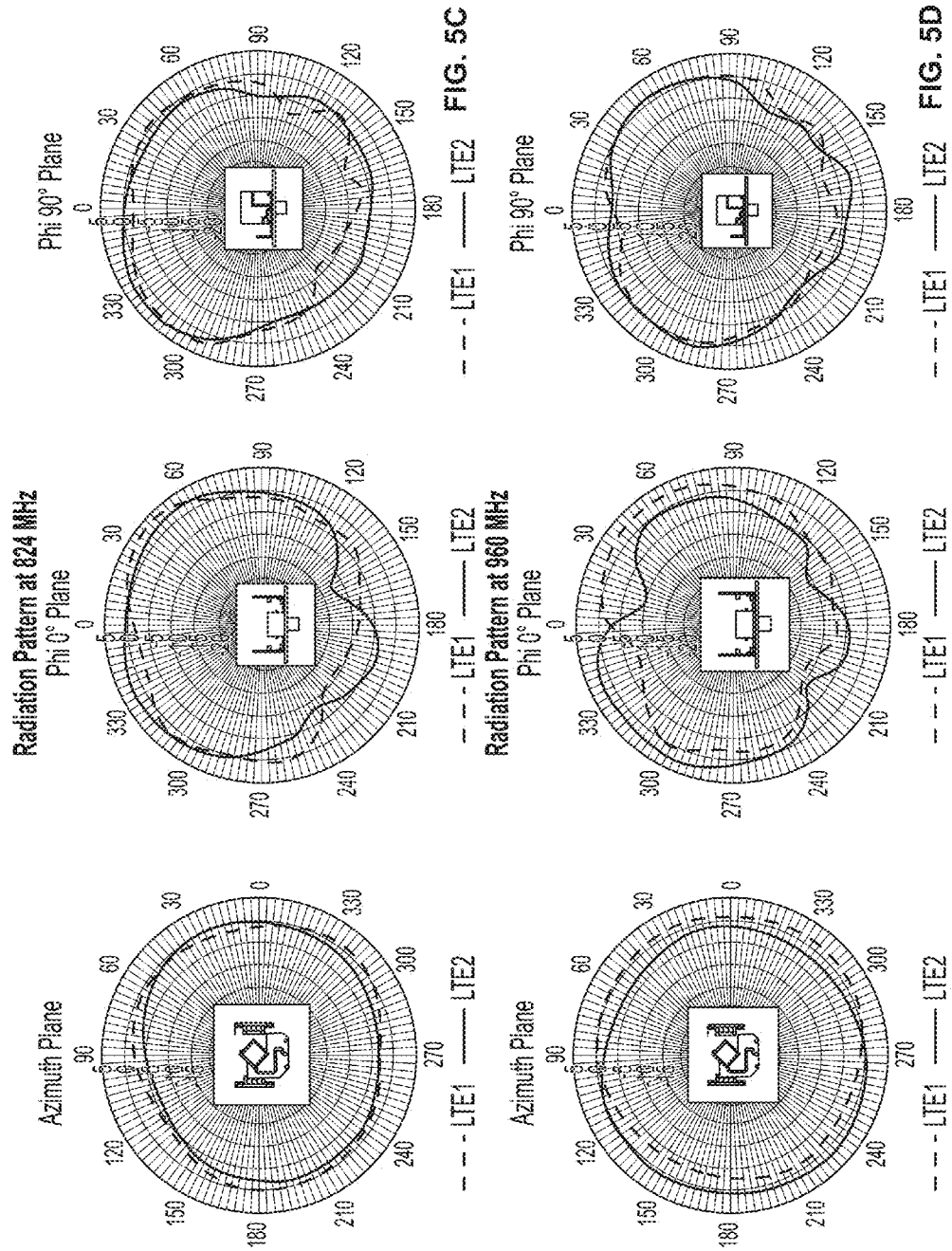

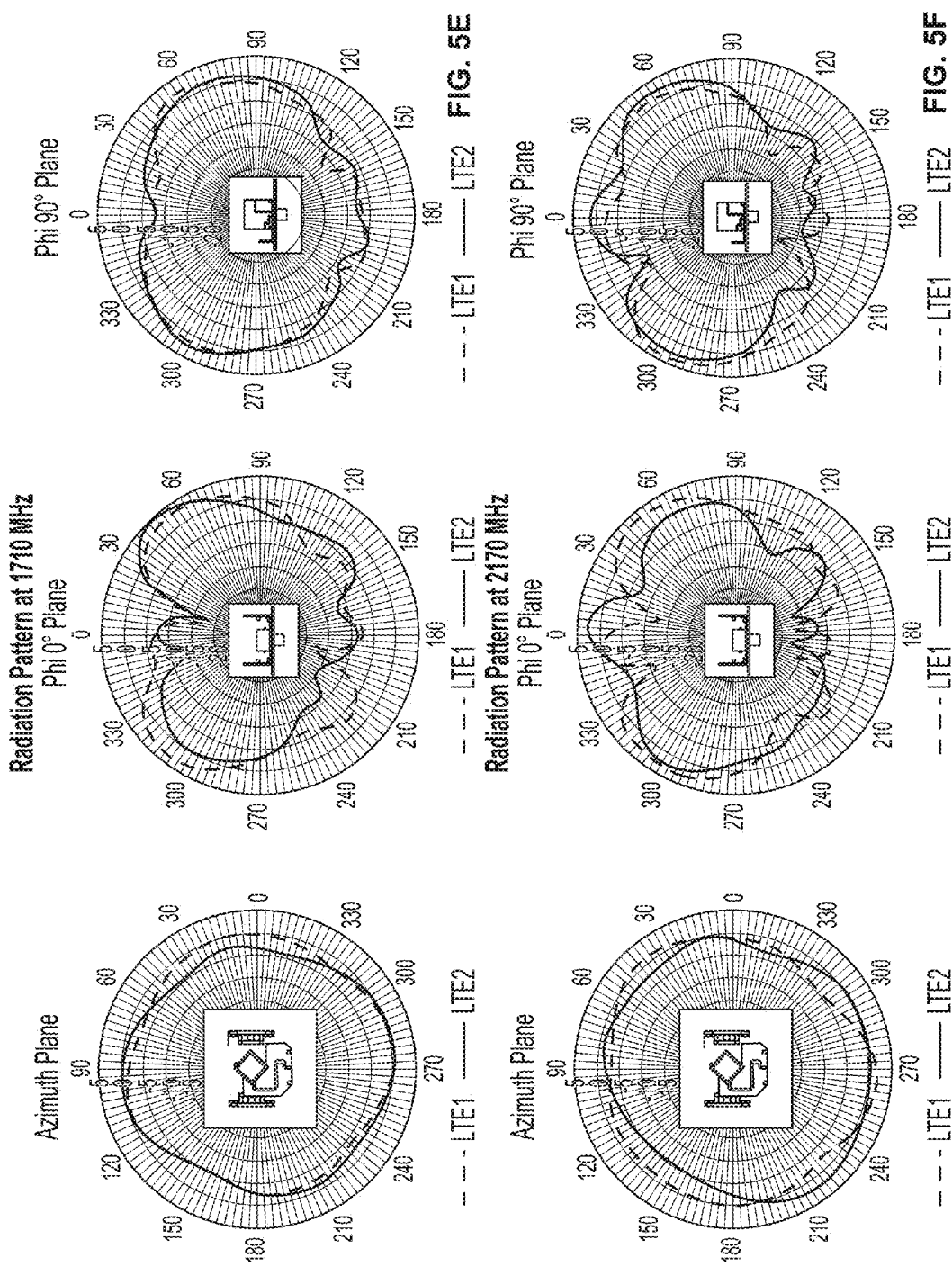

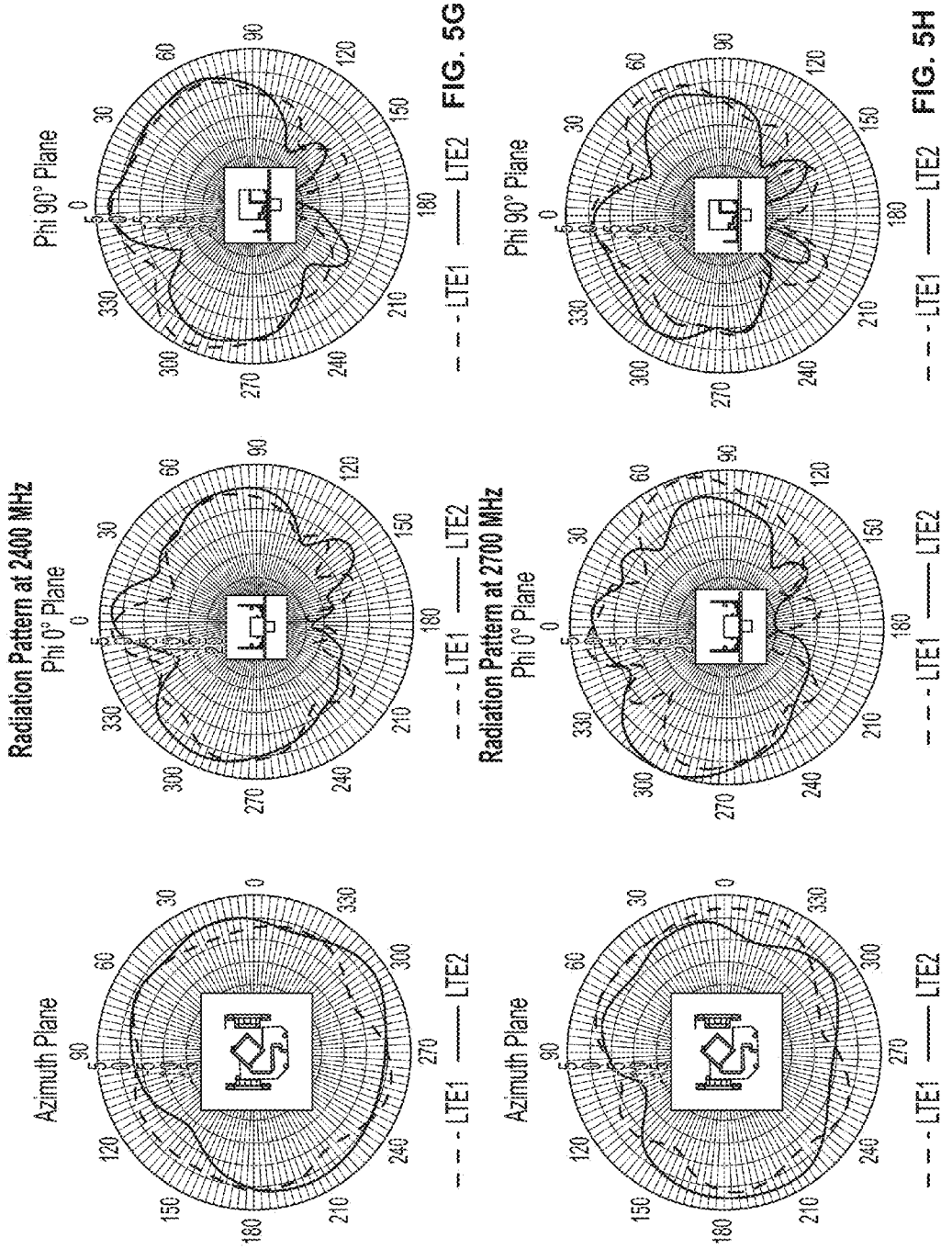

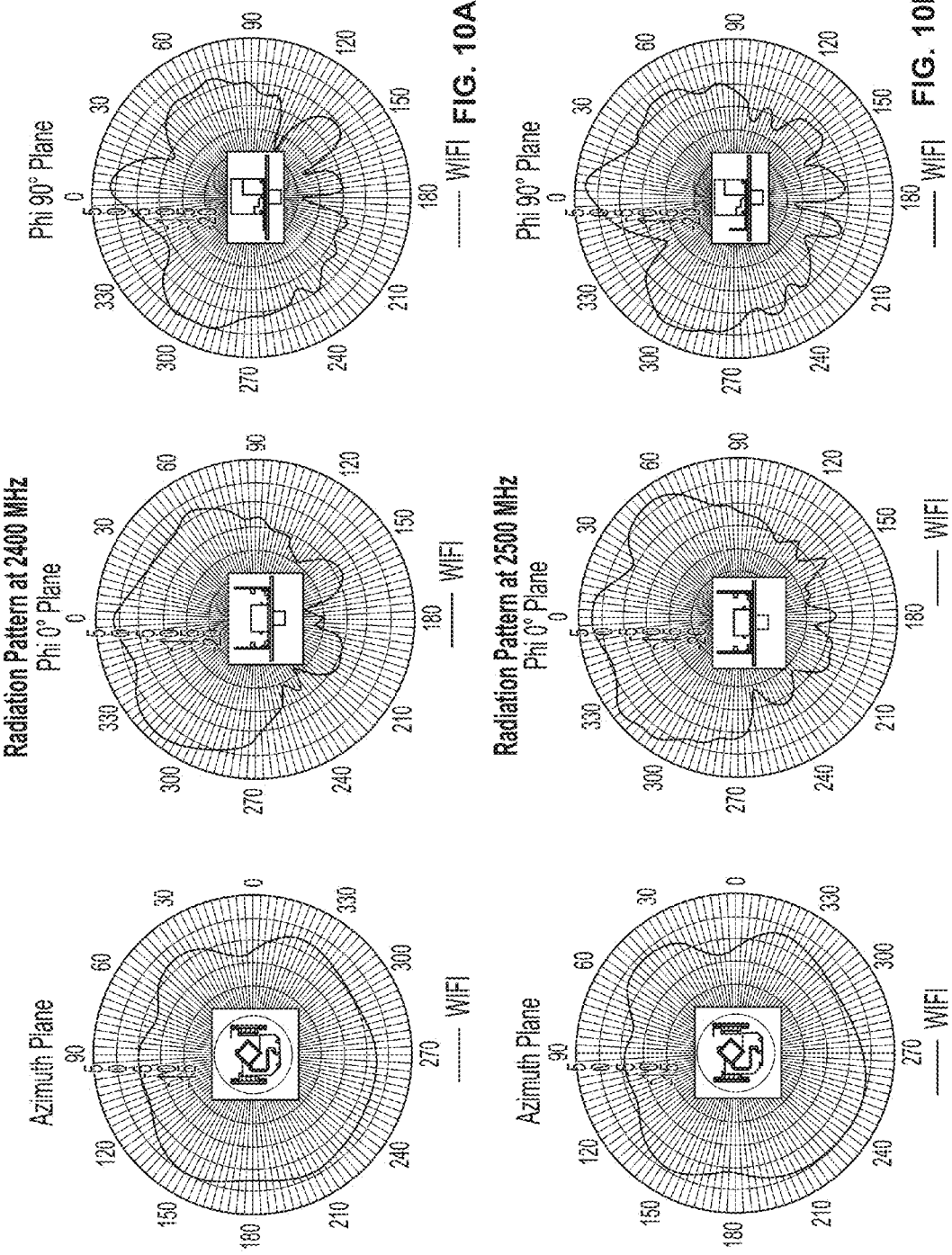

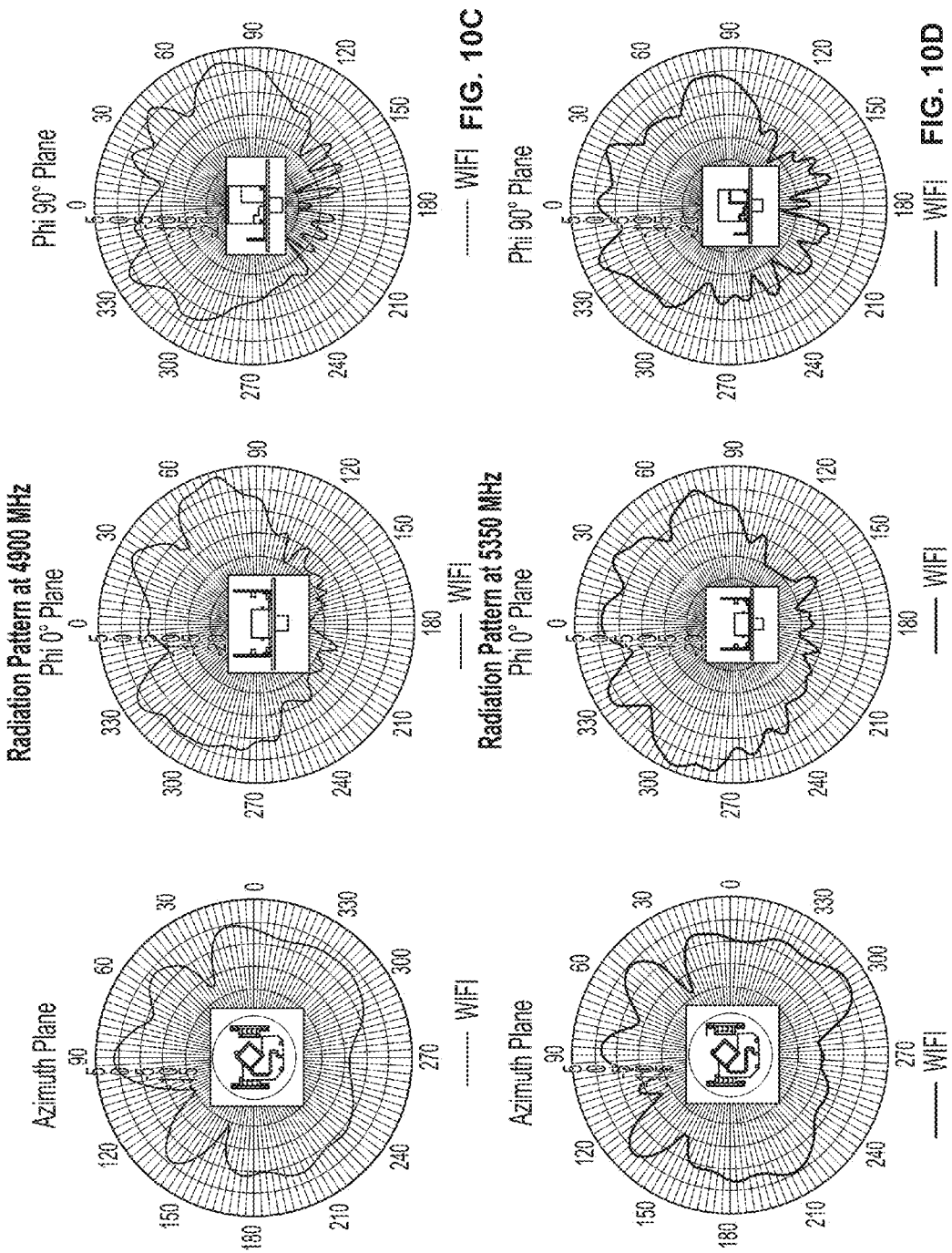

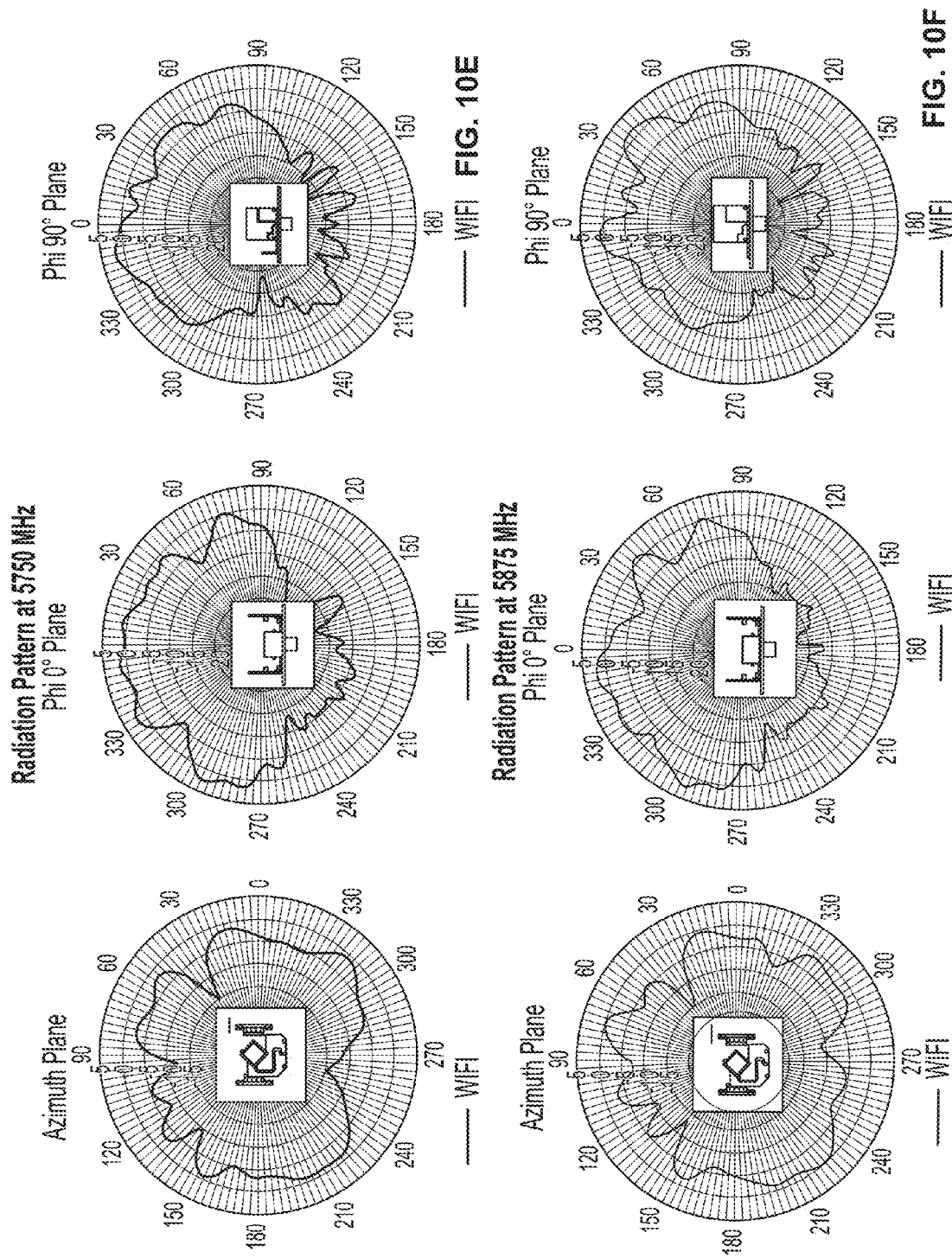

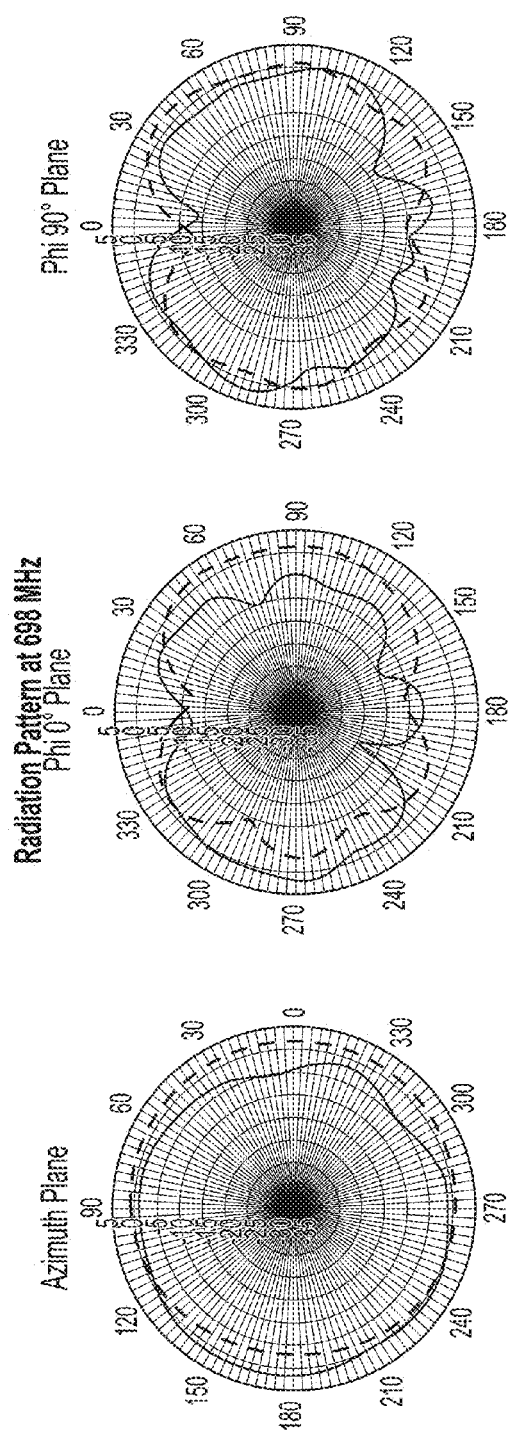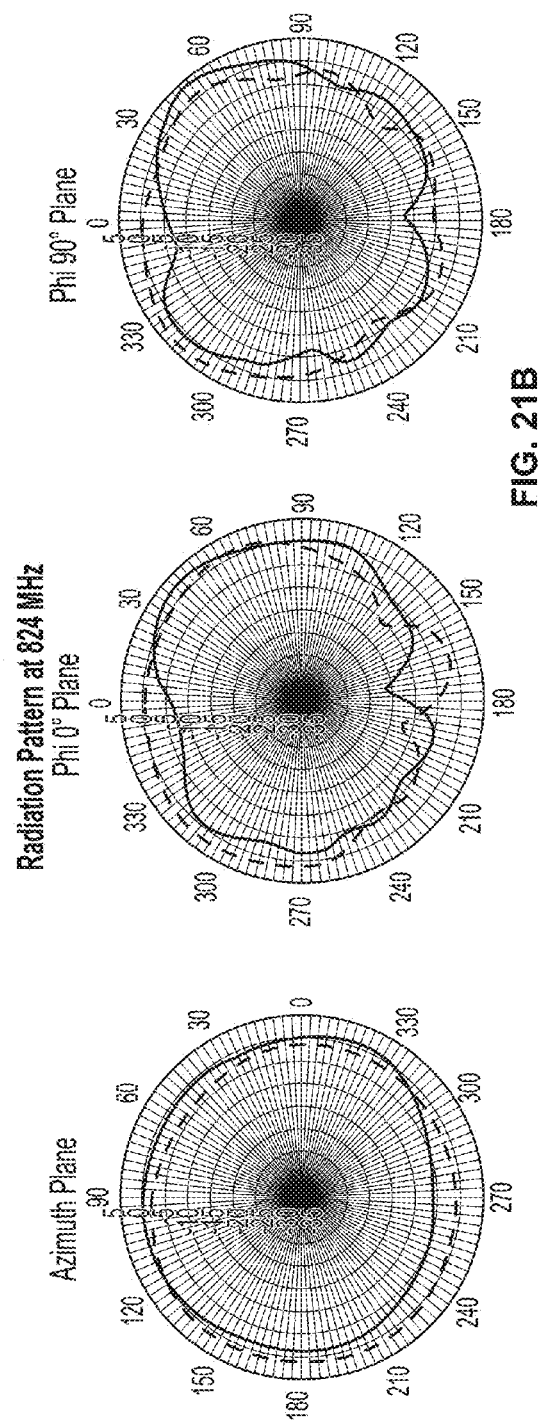
FIG. 21A
FIG. 21B

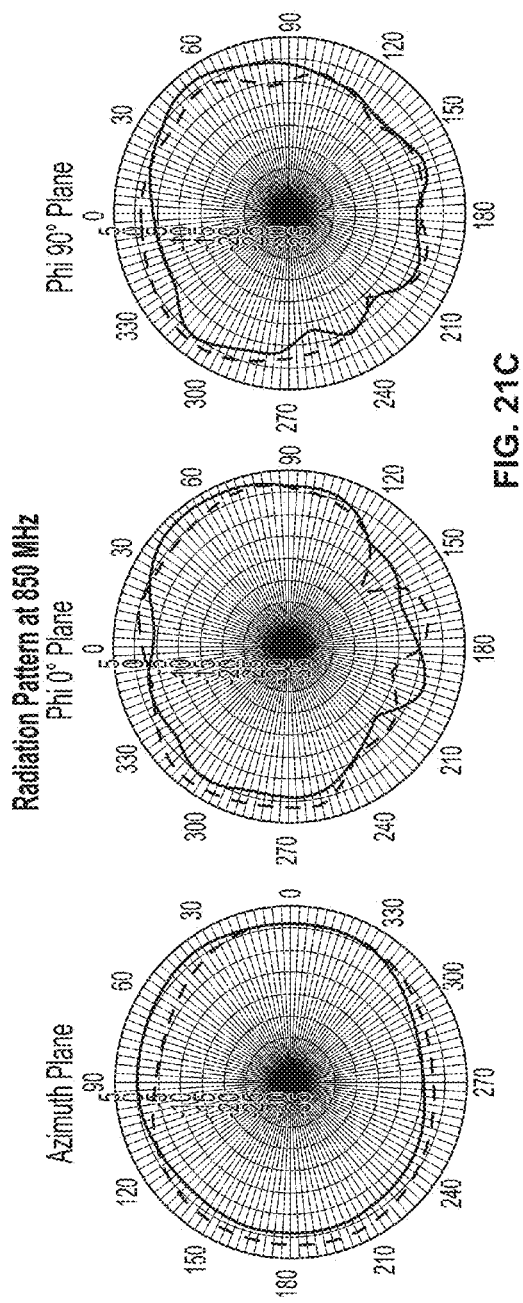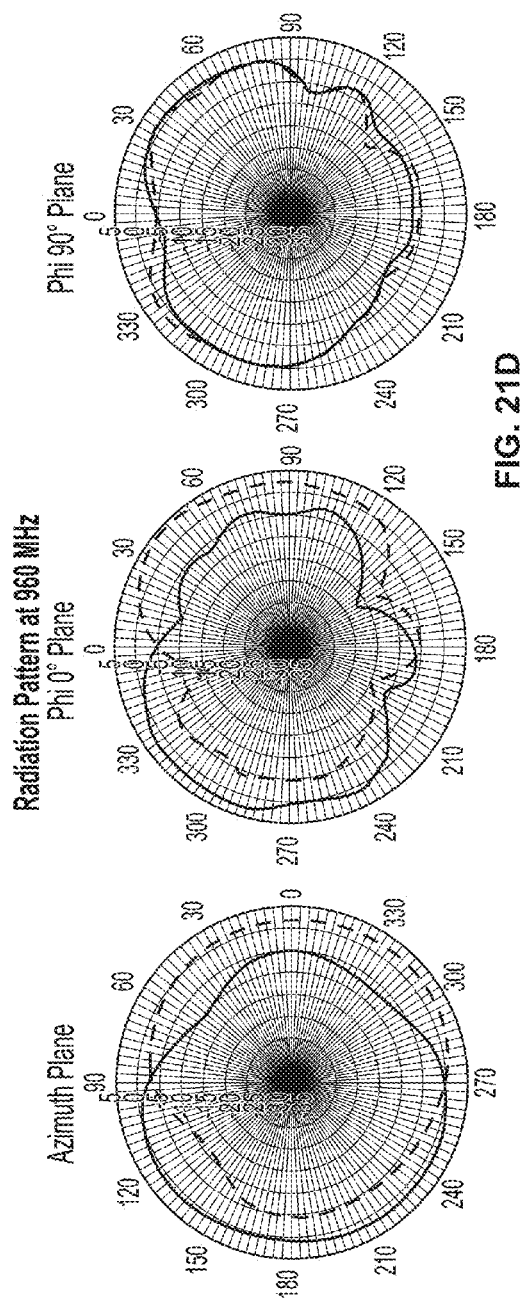
FIG. 21C
FIG. 21D

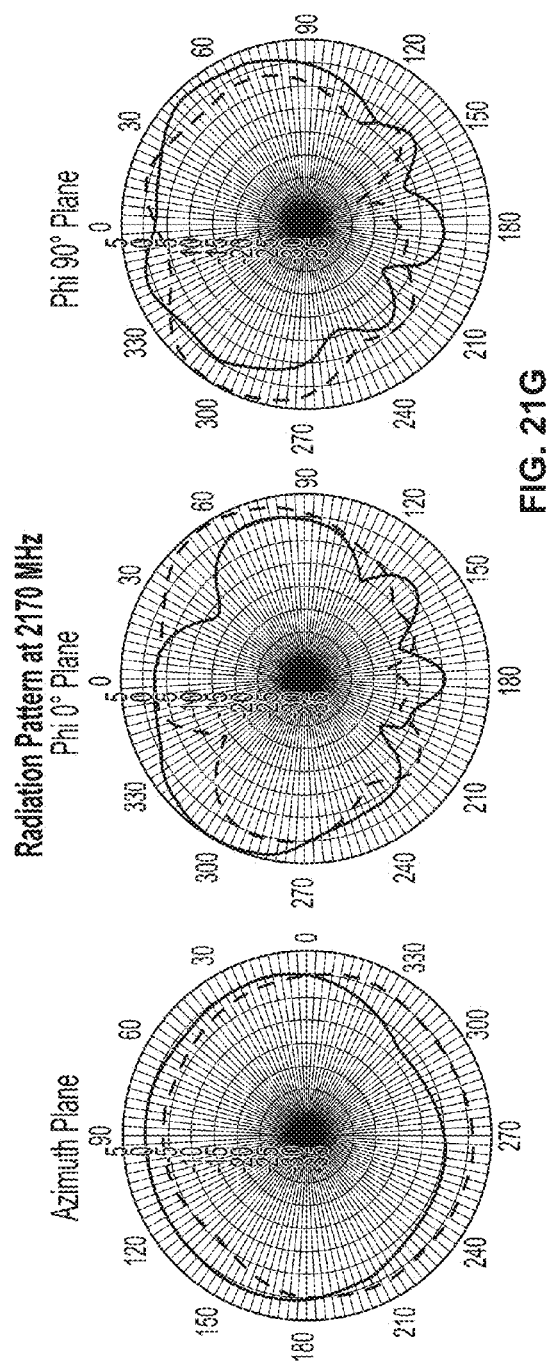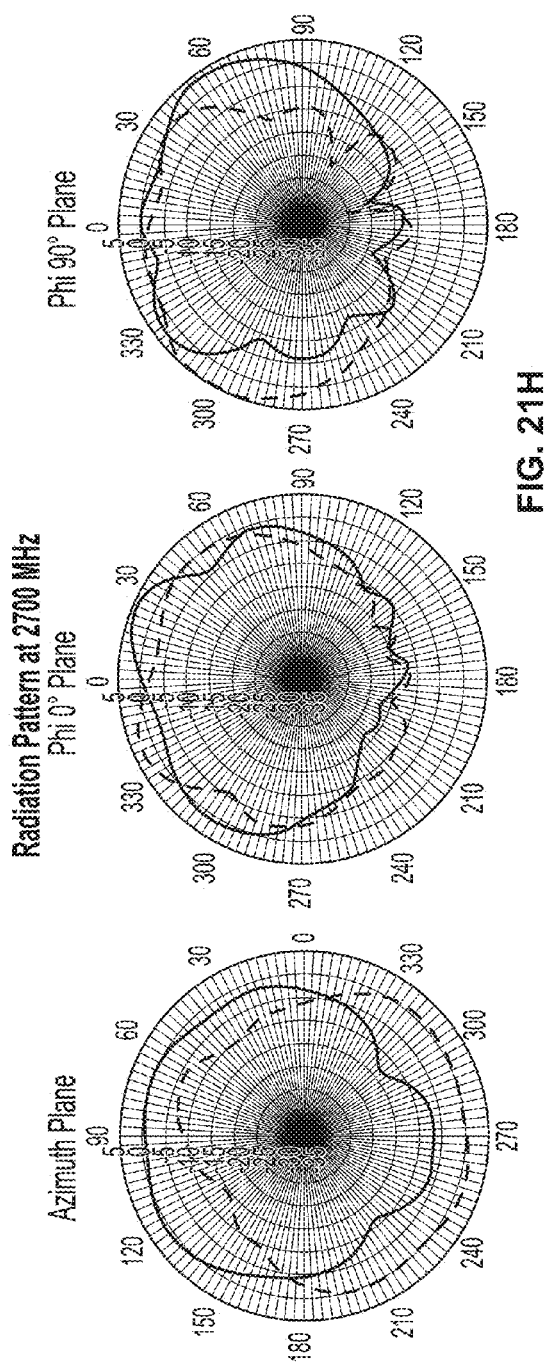

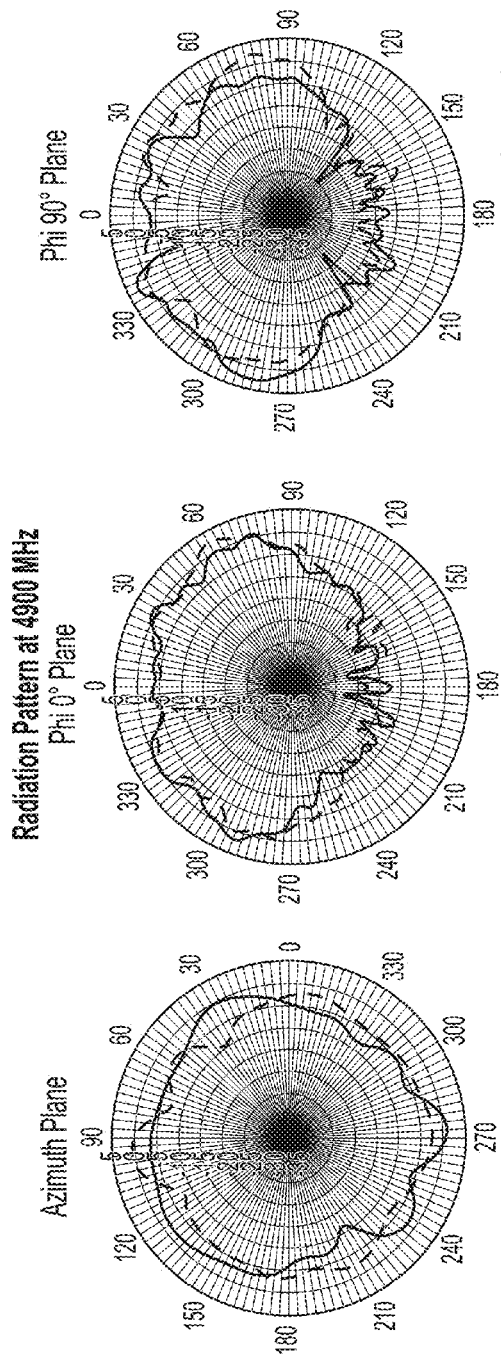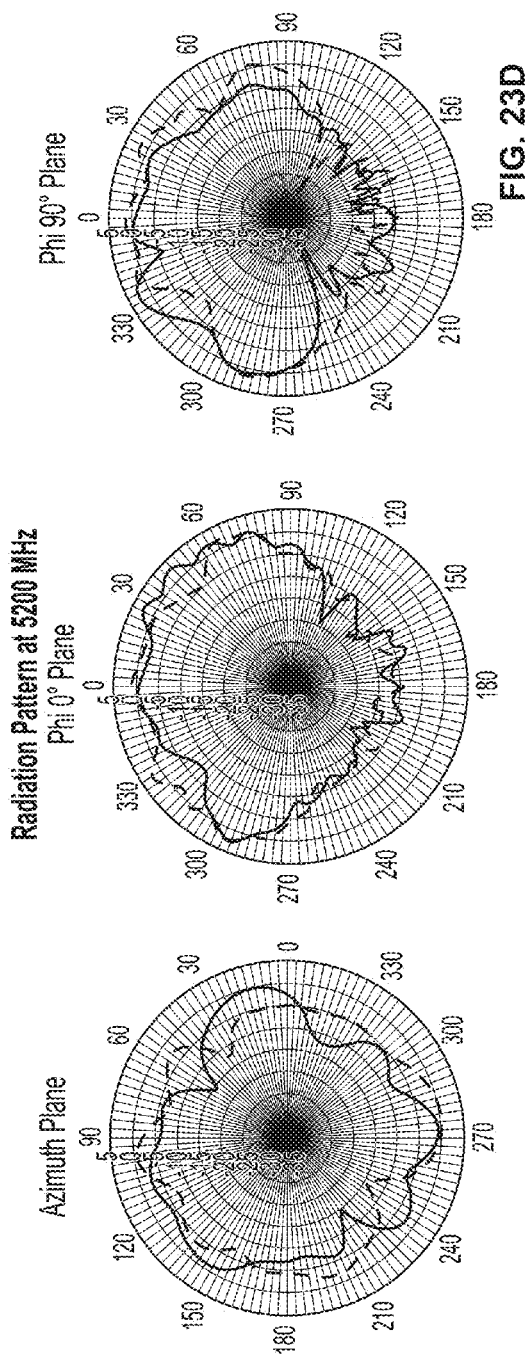

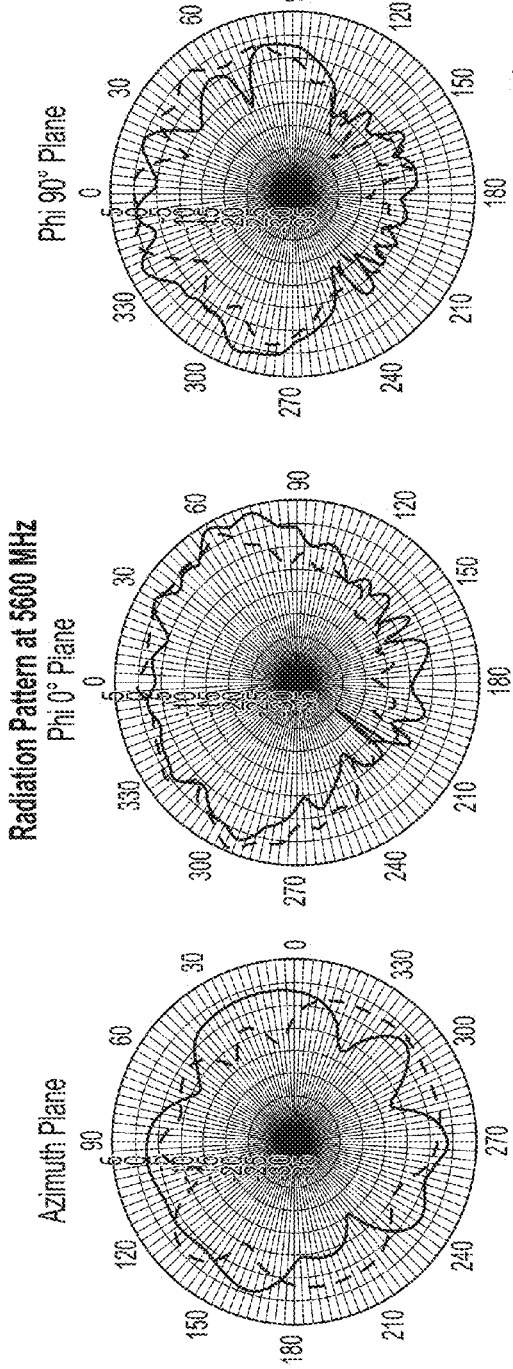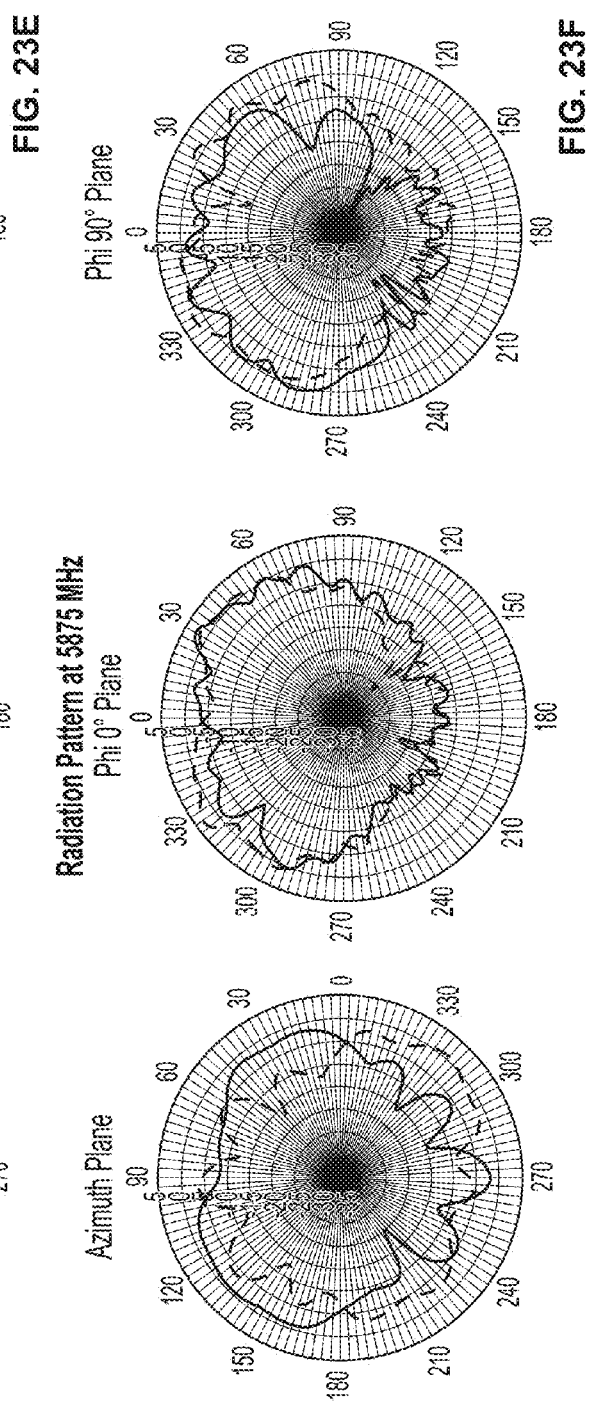
FIG. 23E
FIG. 23F

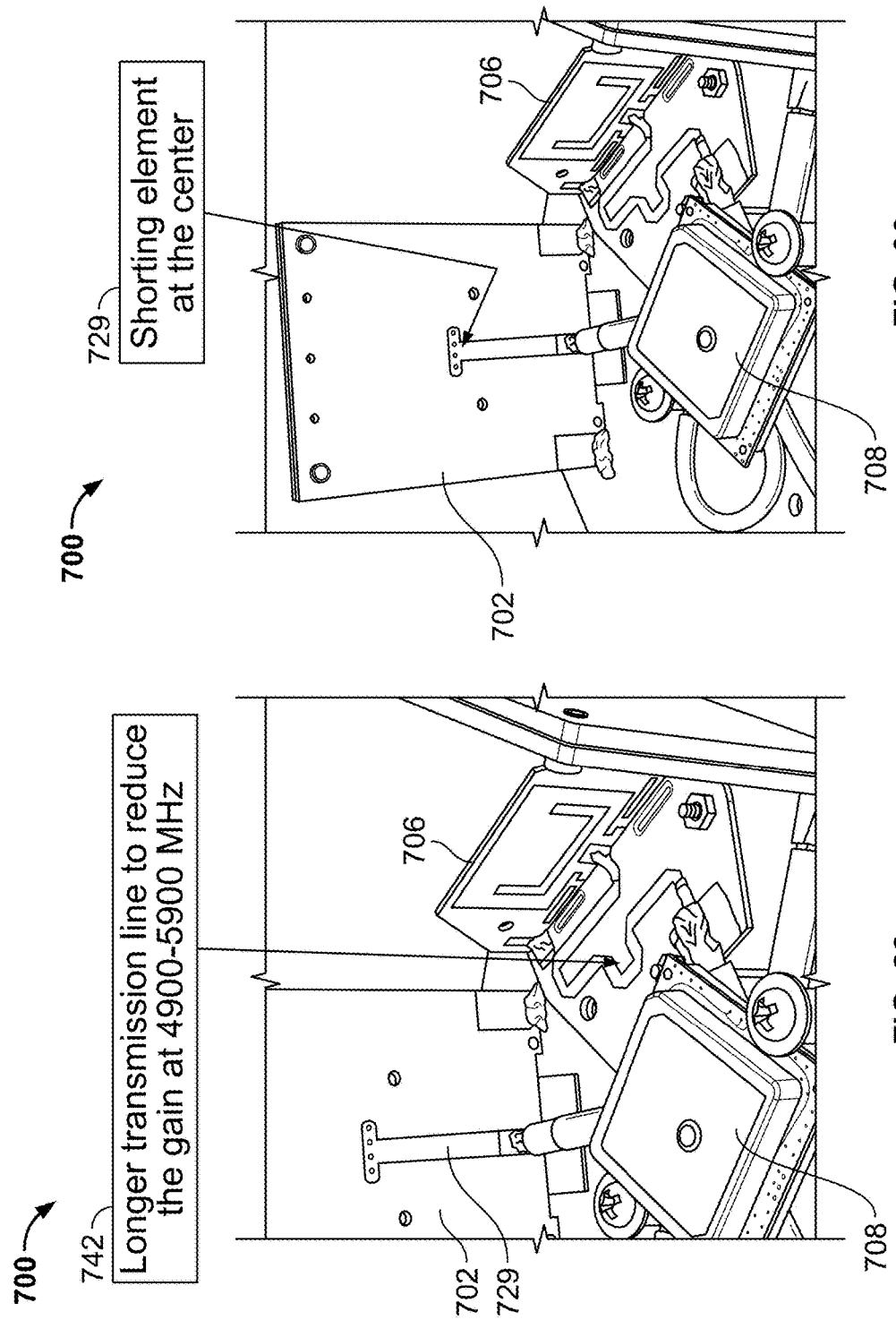

MULTIPORT MULTIBAND VEHICULAR ANTENNA ASSEMBLIES INCLUDING MULTIPLE RADIATORS

CROSS-REFERENCE TO RELATED APPLICATIONS

This application is a continuation-in-part of PCT International Application No. PCT/US2016/036864 filed Jun. 10, 2016 (published as WO 2016/201208 on Dec. 15, 2016), which in turn, claimed priority to and the benefit of Malaysian patent application No. PI2015701948 filed Jun. 11, 2015. The entire disclosures of the above applications are incorporated herein by reference.

FIELD

The present disclosure relates to multiport multiband vehicular antenna assemblies including multiple radiators or antennas.

BACKGROUND

This section provides background information related to the present disclosure which is not necessarily prior art.

It is challenging to integrate and place multiple radiators of an multiband antenna assembly within a single structure, e.g., under the same radome of a single roof-mount antenna system, etc. It is especially hard to place one or more of Long Term Evolution (LTE) multi-input-multi-output (MIMO) radiators, Wi-Fi radiators, and Global Positioning System (GPS) radiators into a single vehicular antenna system. Thus, conventional vehicular antenna systems, even with small and low profile antennas, tend to have limited bandwidth covering.

DRAWINGS

The drawings described herein are for illustrative purposes only of selected embodiments and not all possible implementations, and are not intended to limit the scope of the present disclosure.

FIGS. 2A and 2B are exploded perspective views of the 4-port multiband antenna assembly shown in FIG. 1A;

Figure 3D:
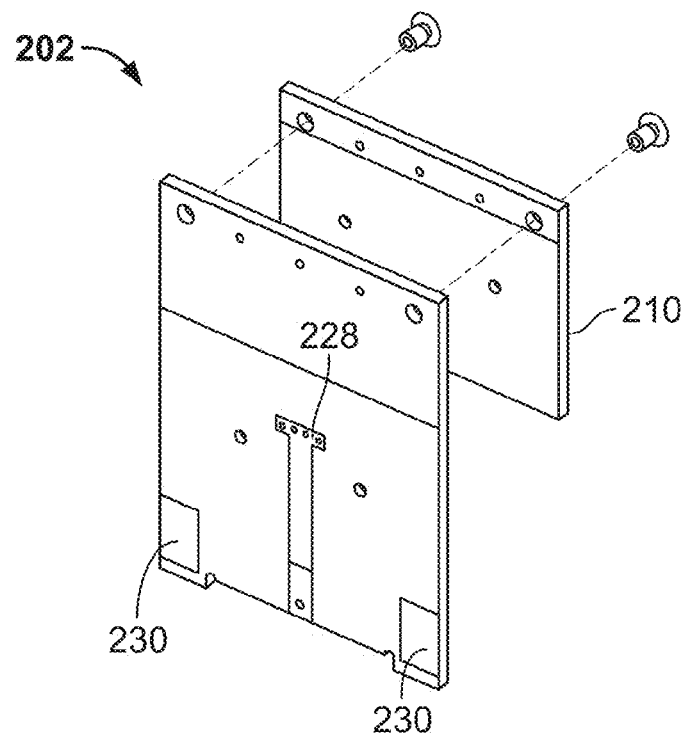
Figure 3E:
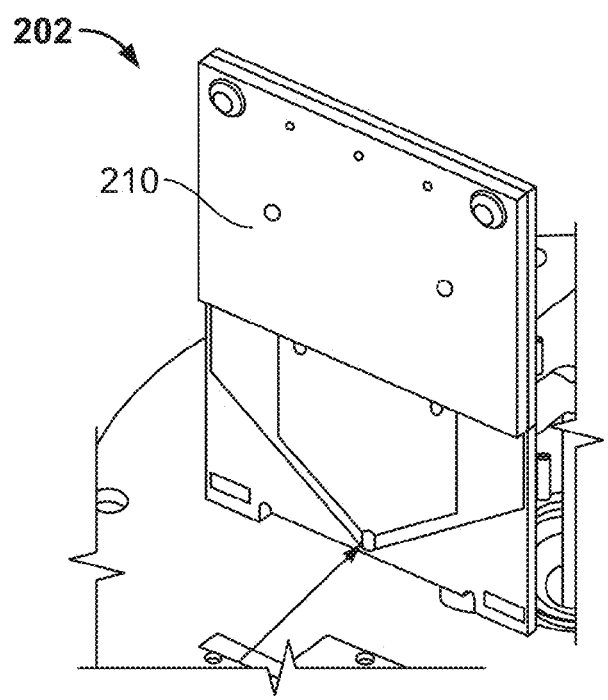
Figure 3F:
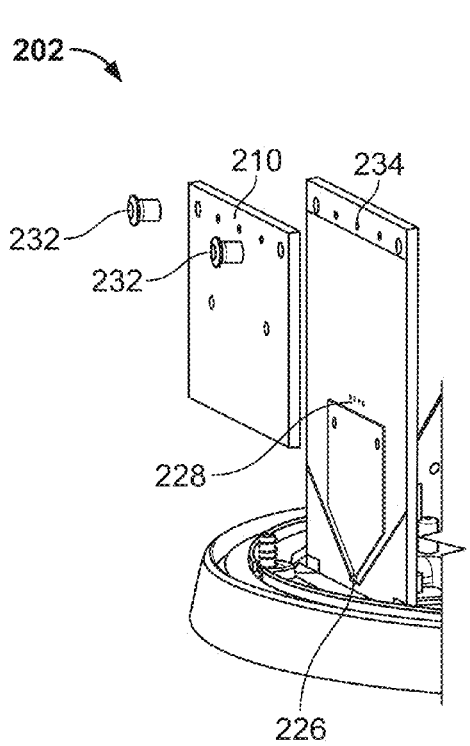
Figure 3G:
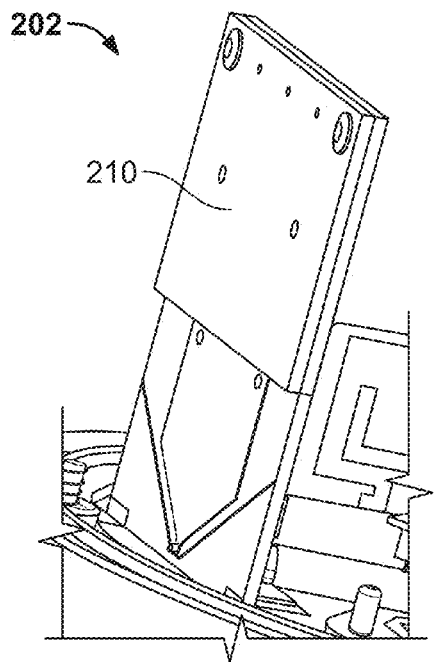
Figure 3H:
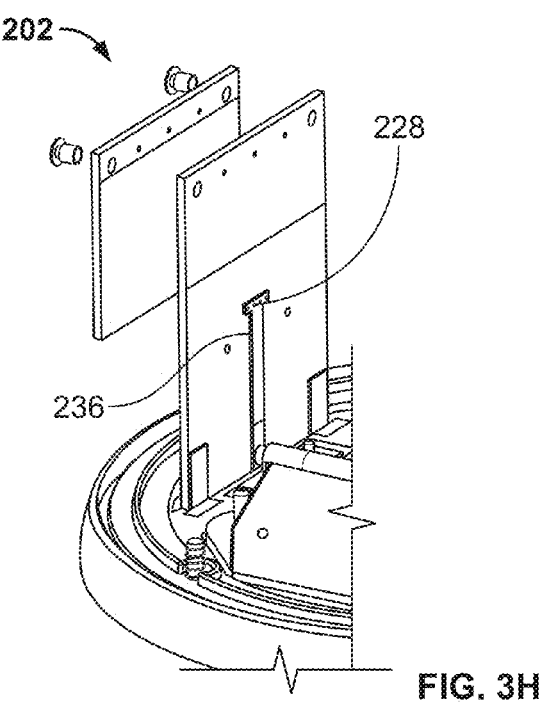
Figure 4:
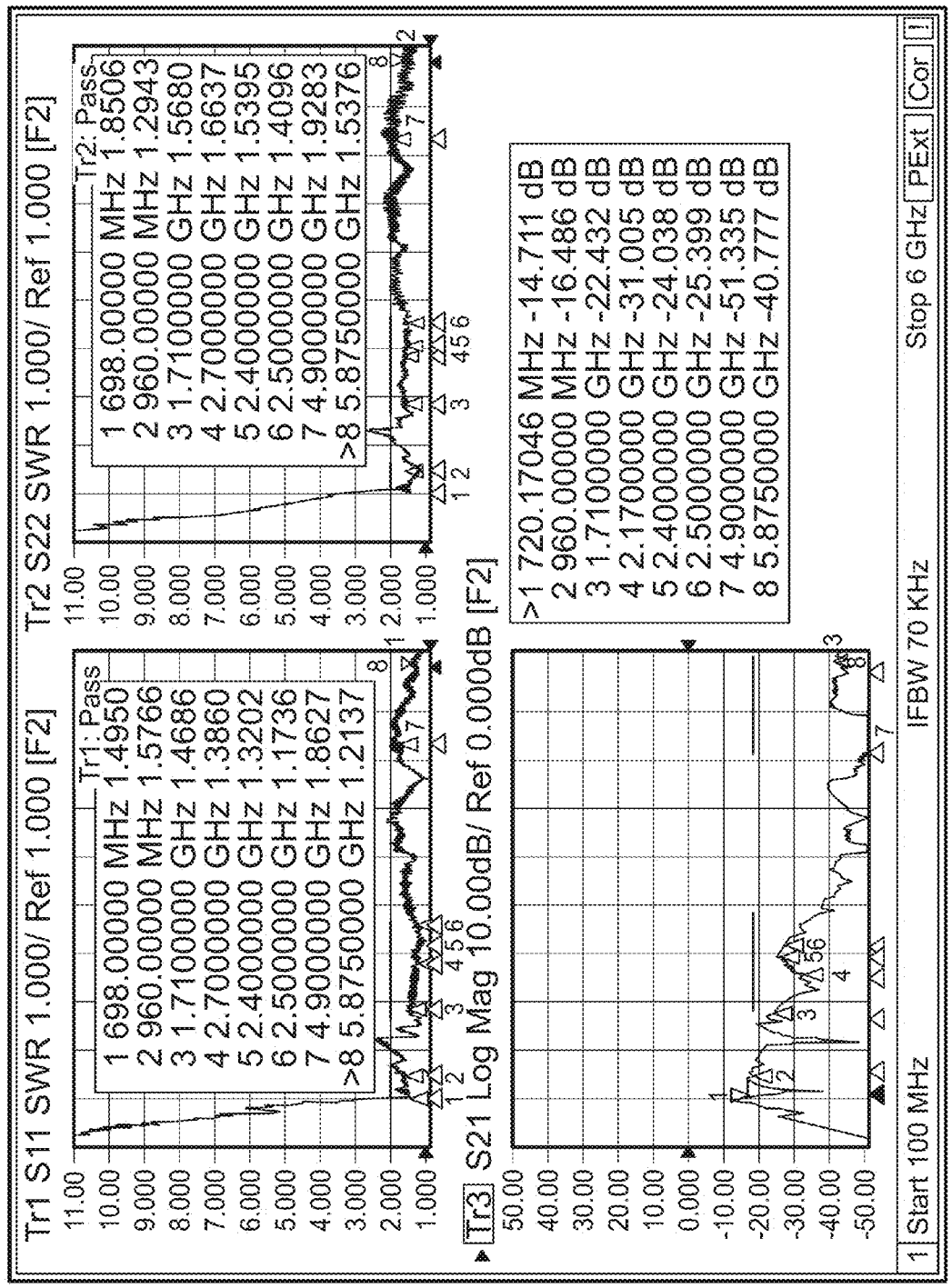
Figure 6:
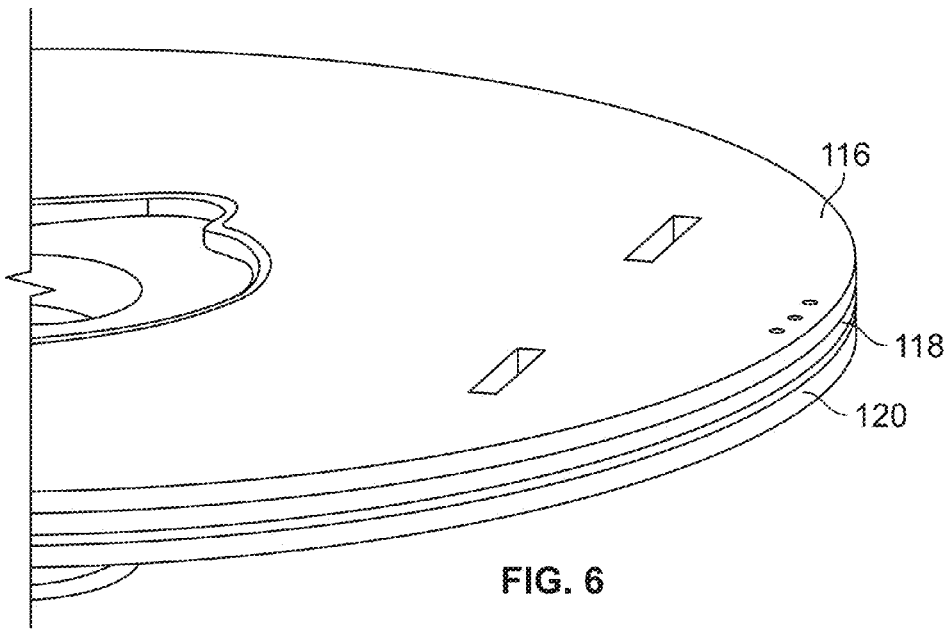
Figure 7A:
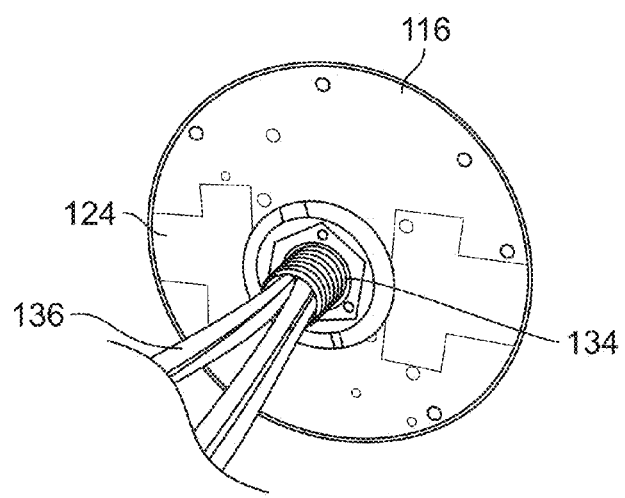
Figure 7B:
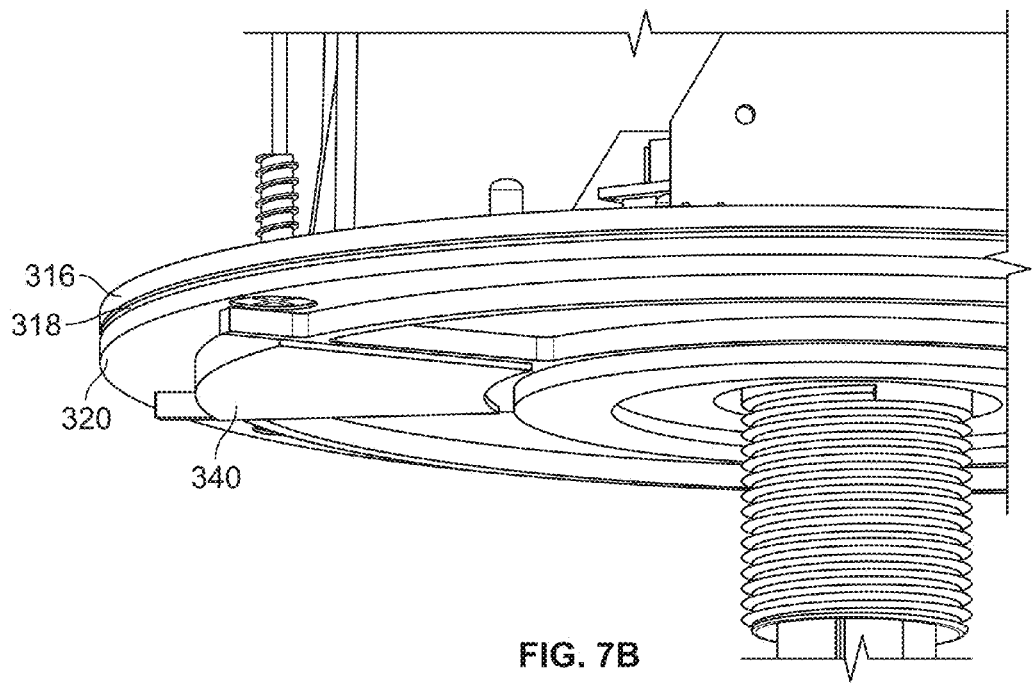
Figure 7C:
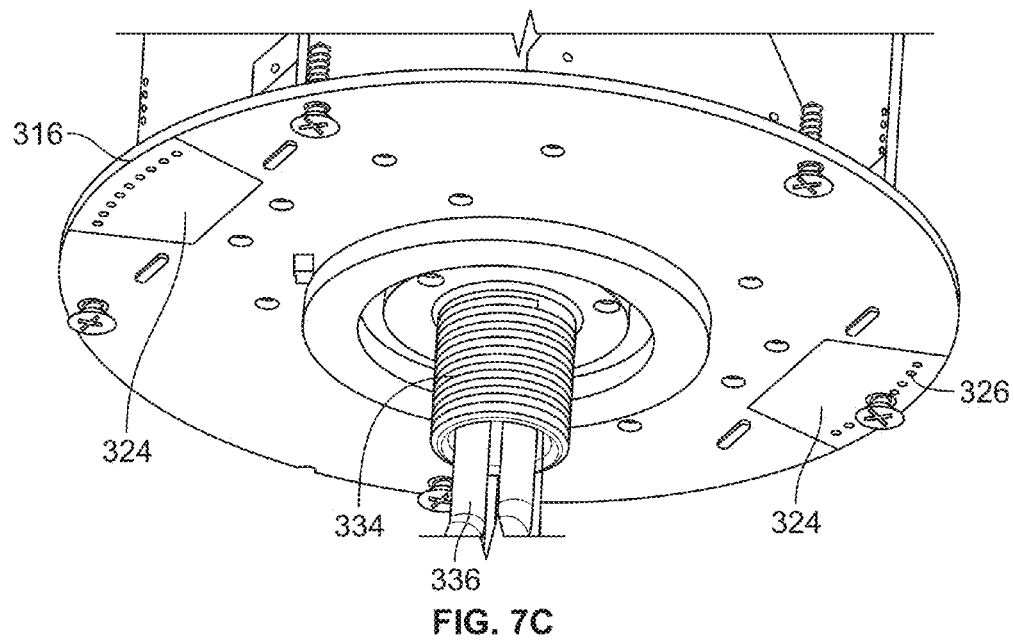
Figure 8A:
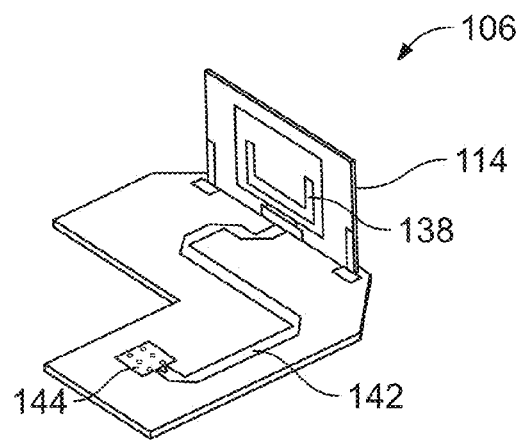
Figure 8B:
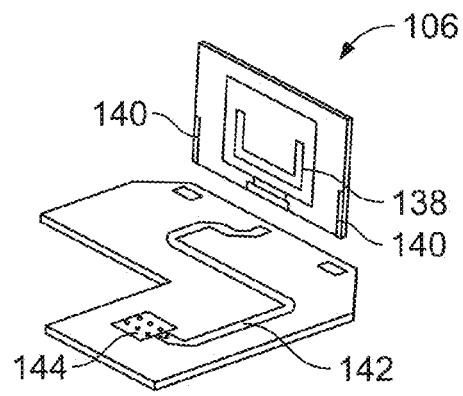
Figure 8C:
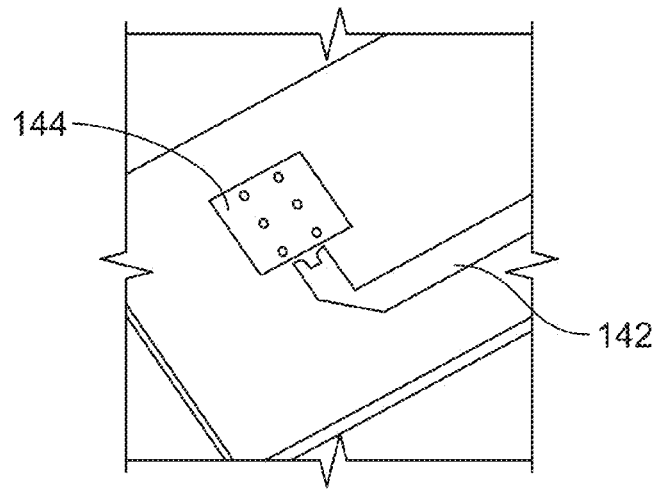
Figure 9:
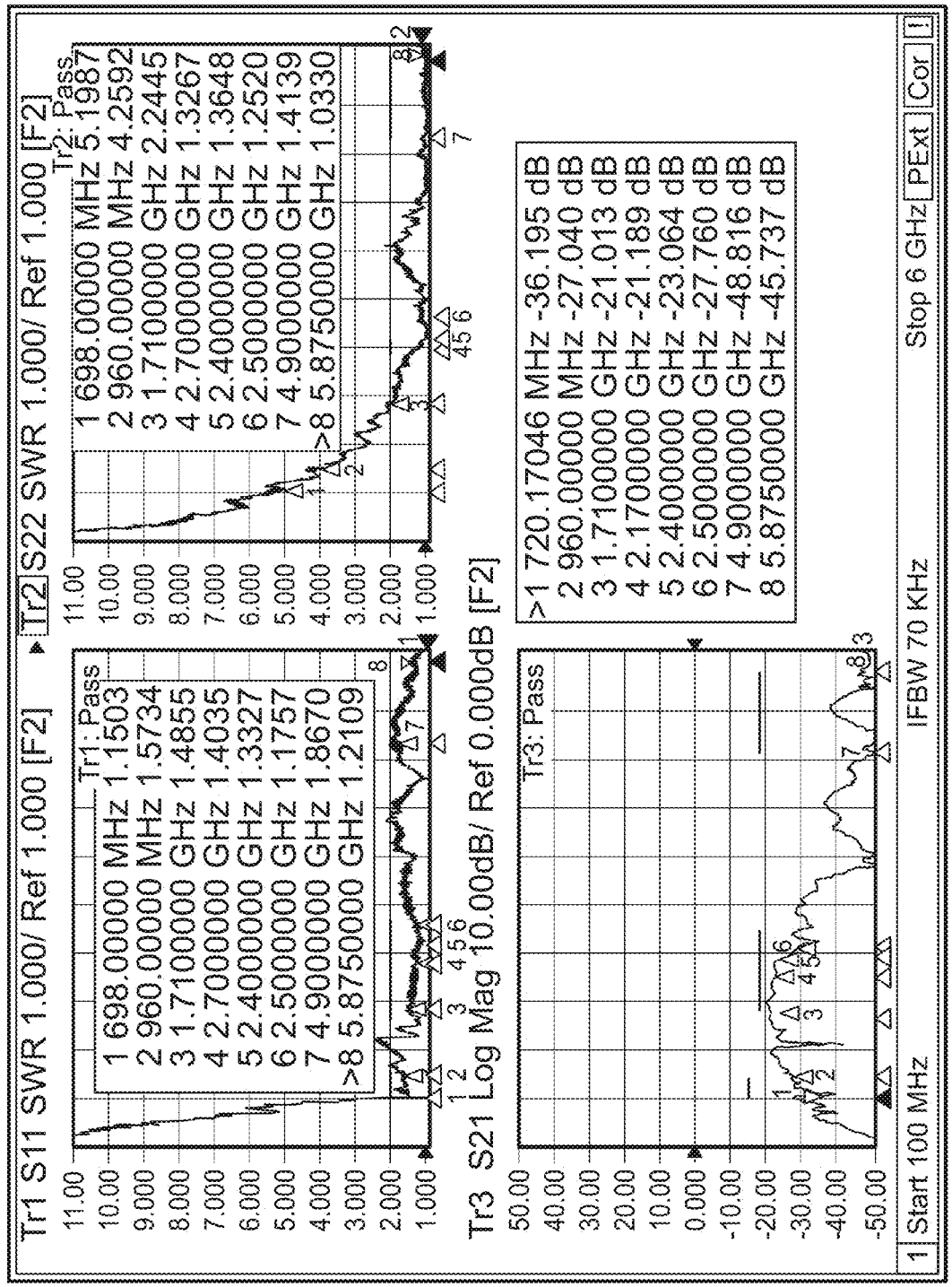
Figure 11:
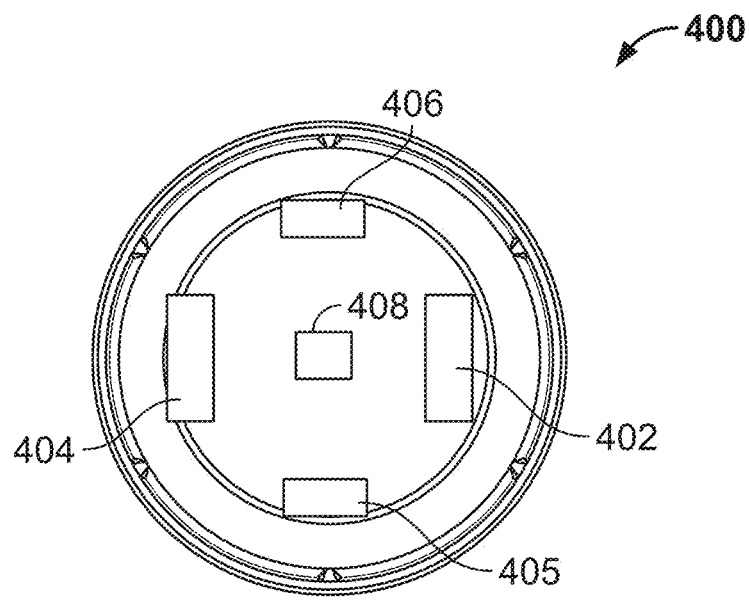
Figure 12:
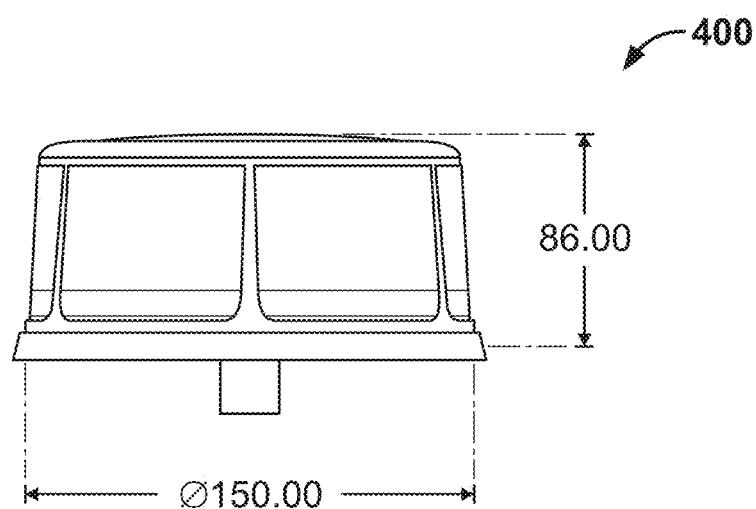
Figure 13:
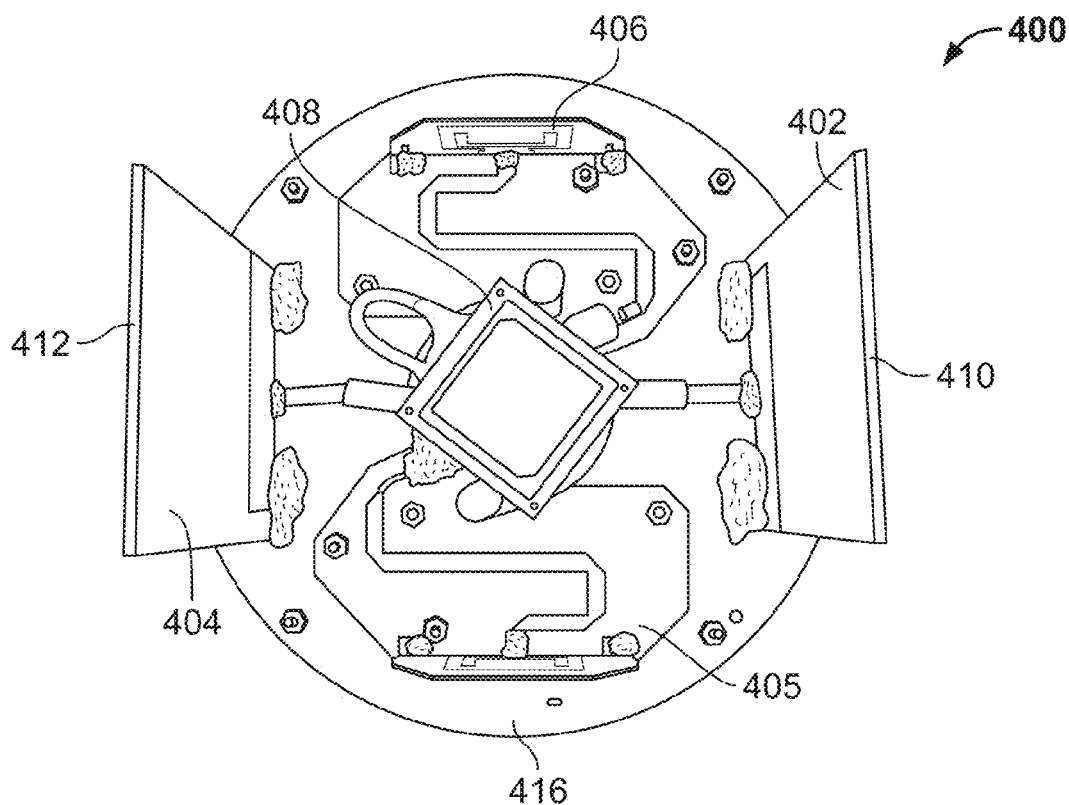
Figure 14:
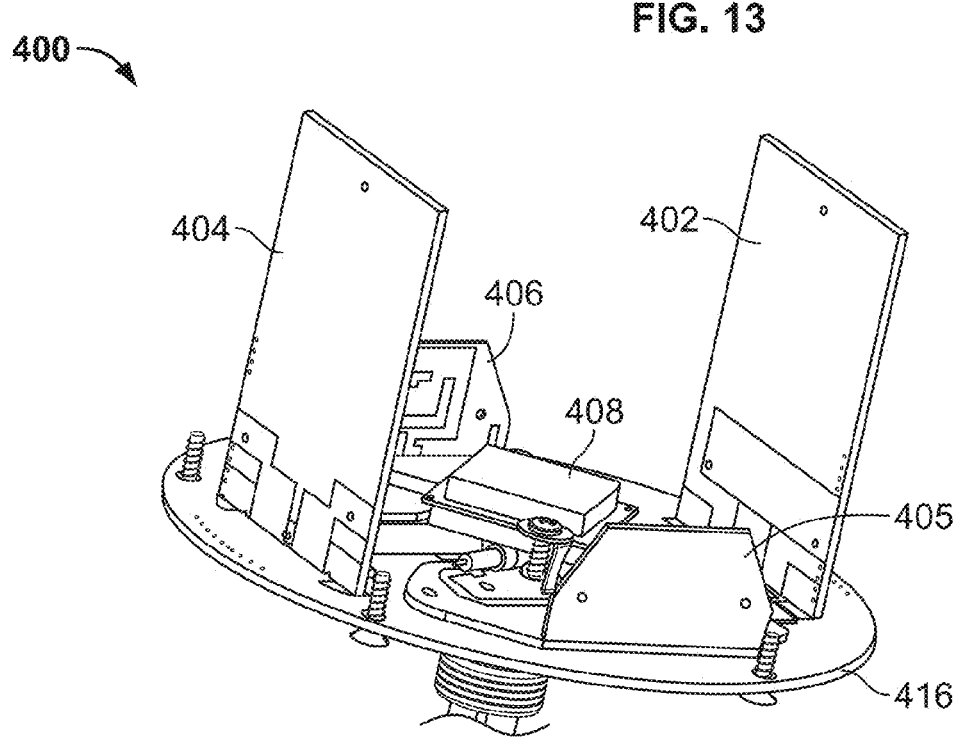
Figure 15:
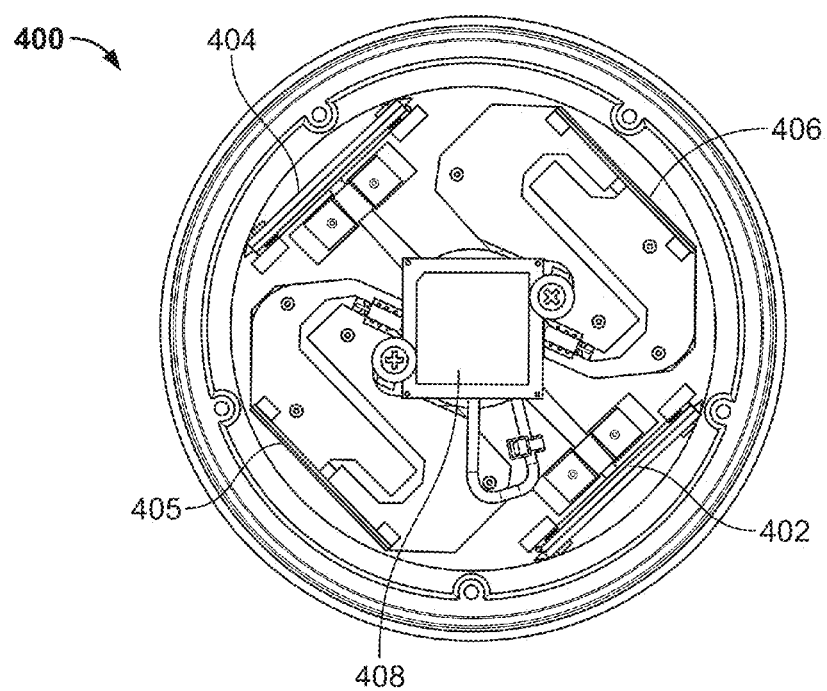
Figure 16:
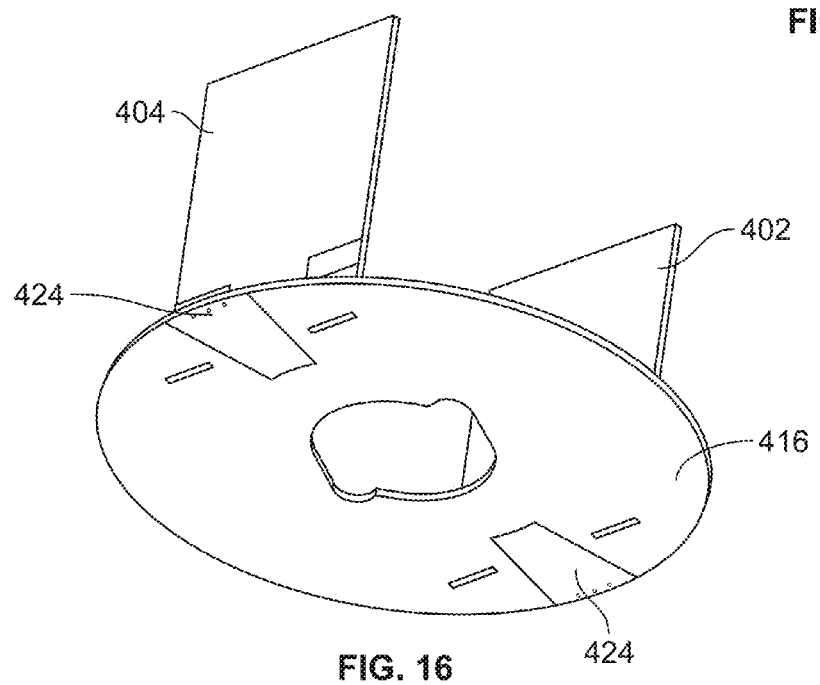
Figure 17:
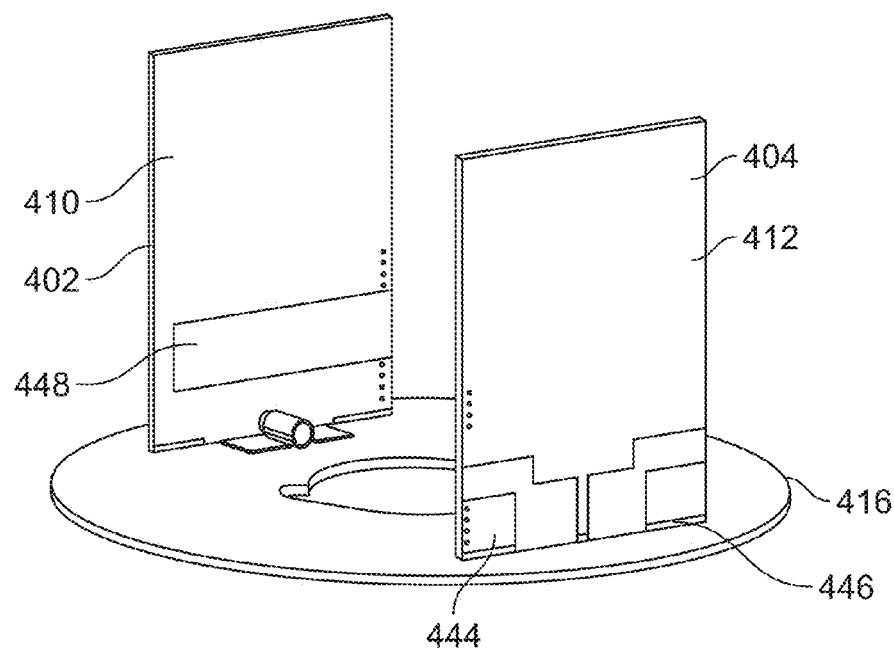
Figure 18:
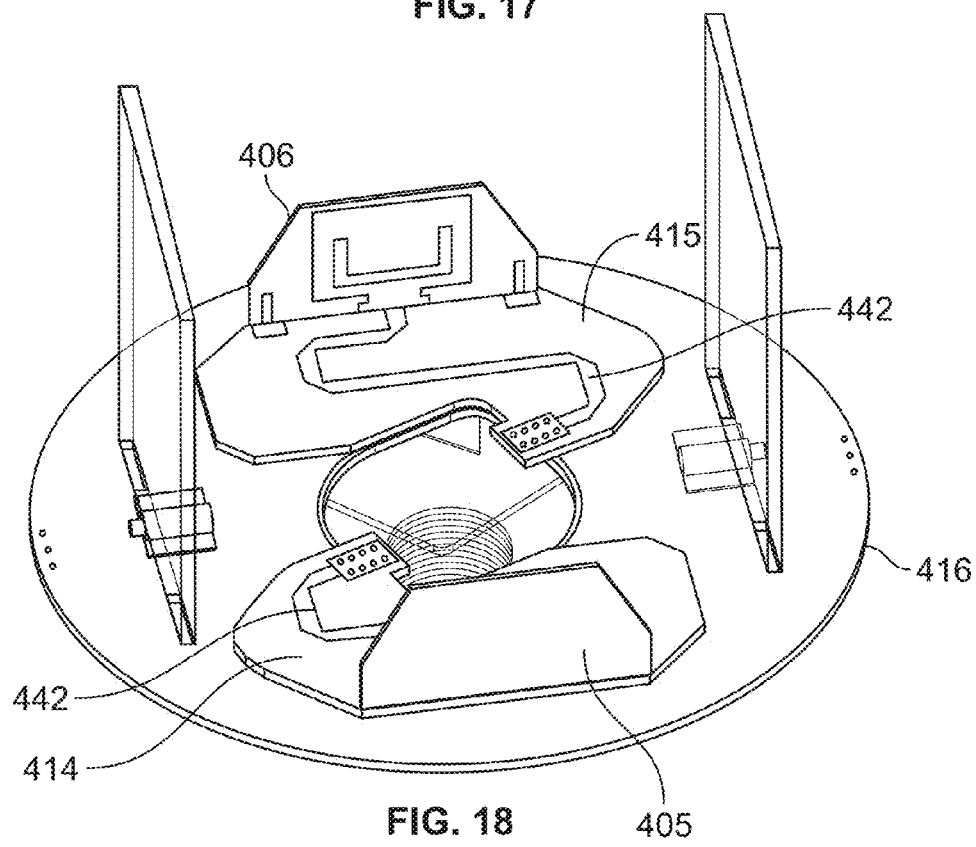
Figure 19:
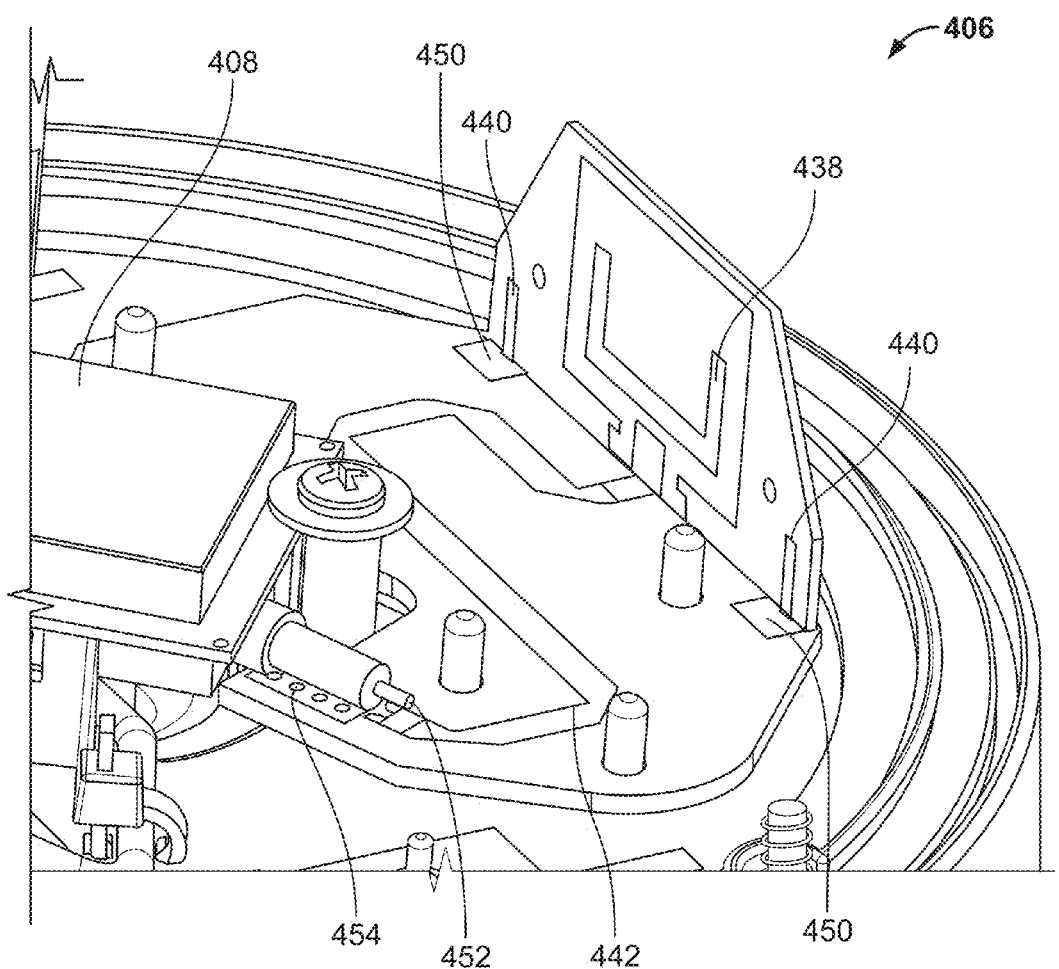
Figure 20:
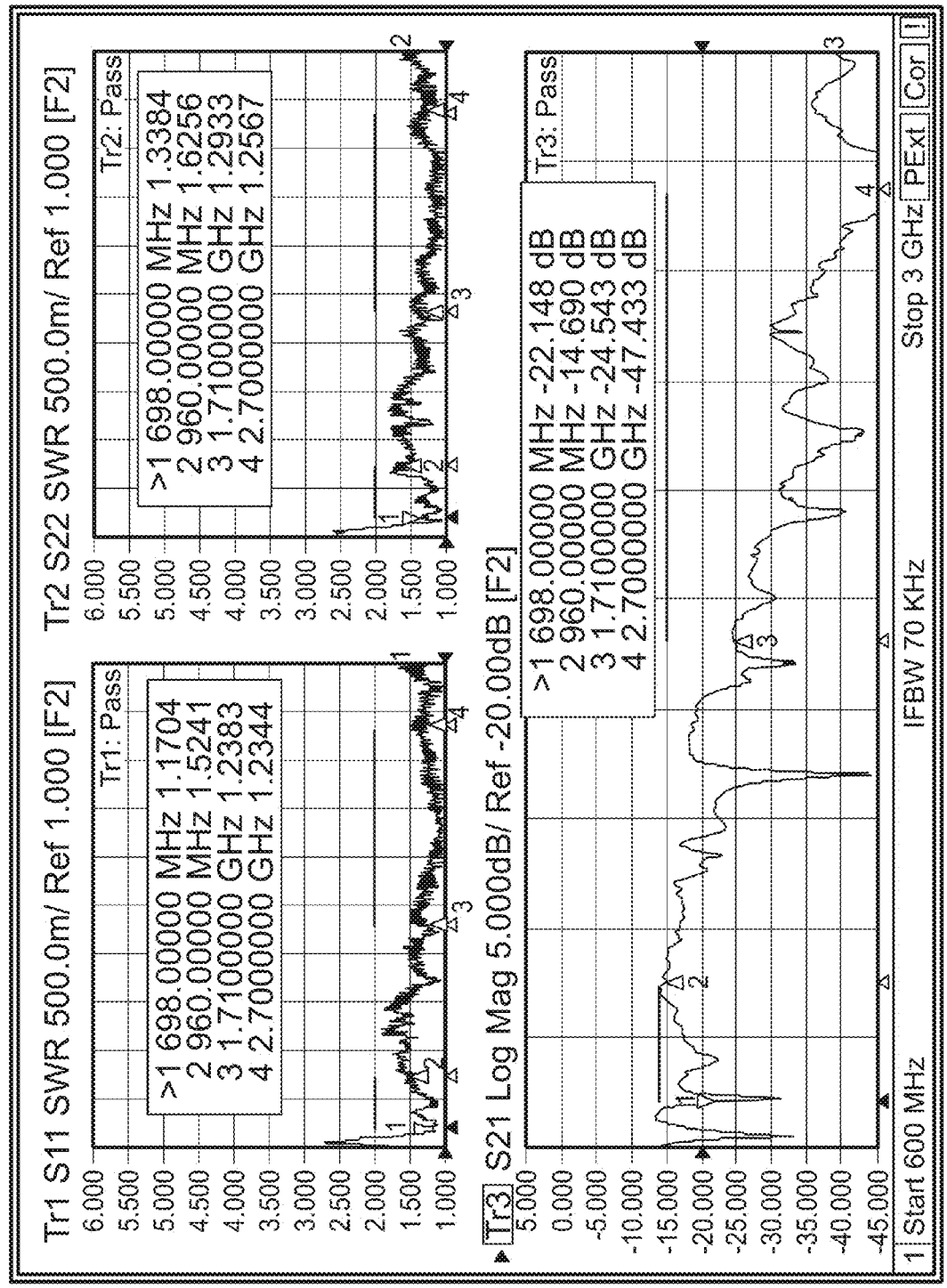
Figure 21E:
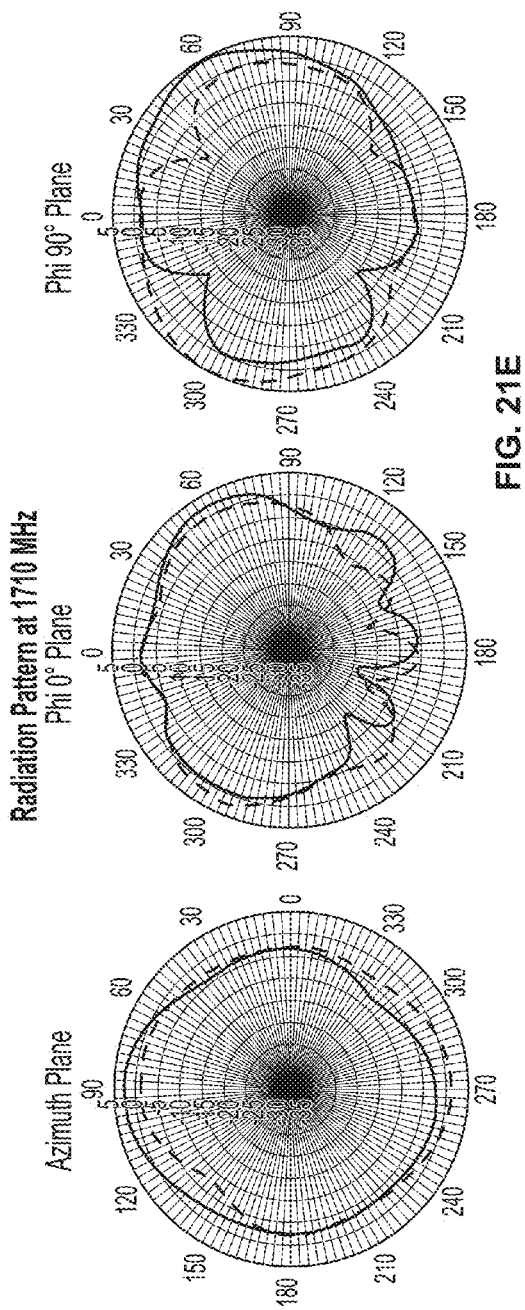
Figure 21F:
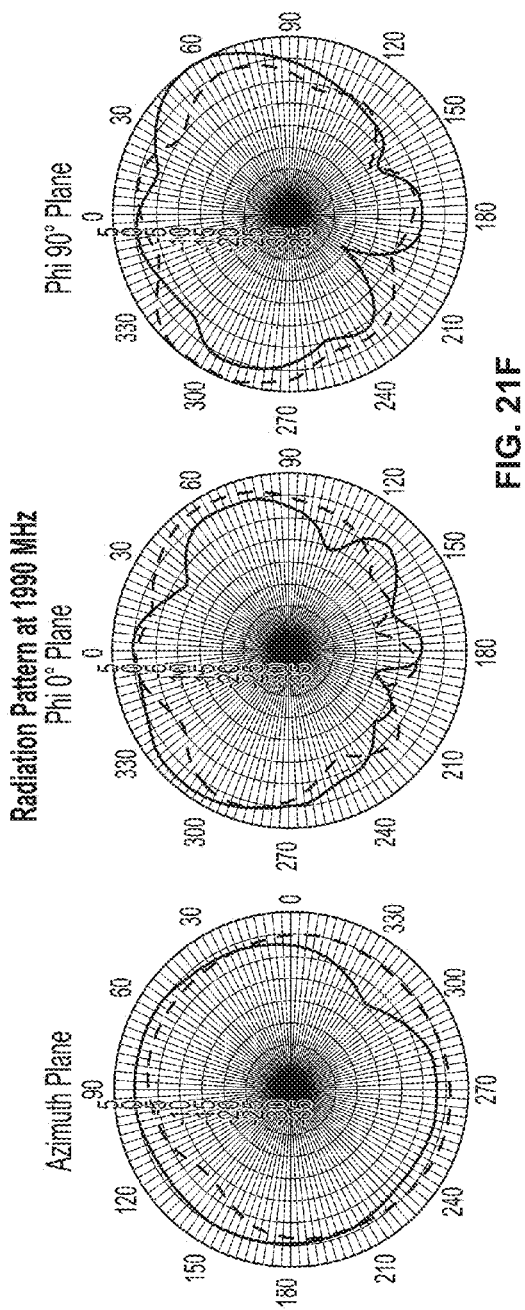
Figure 22:
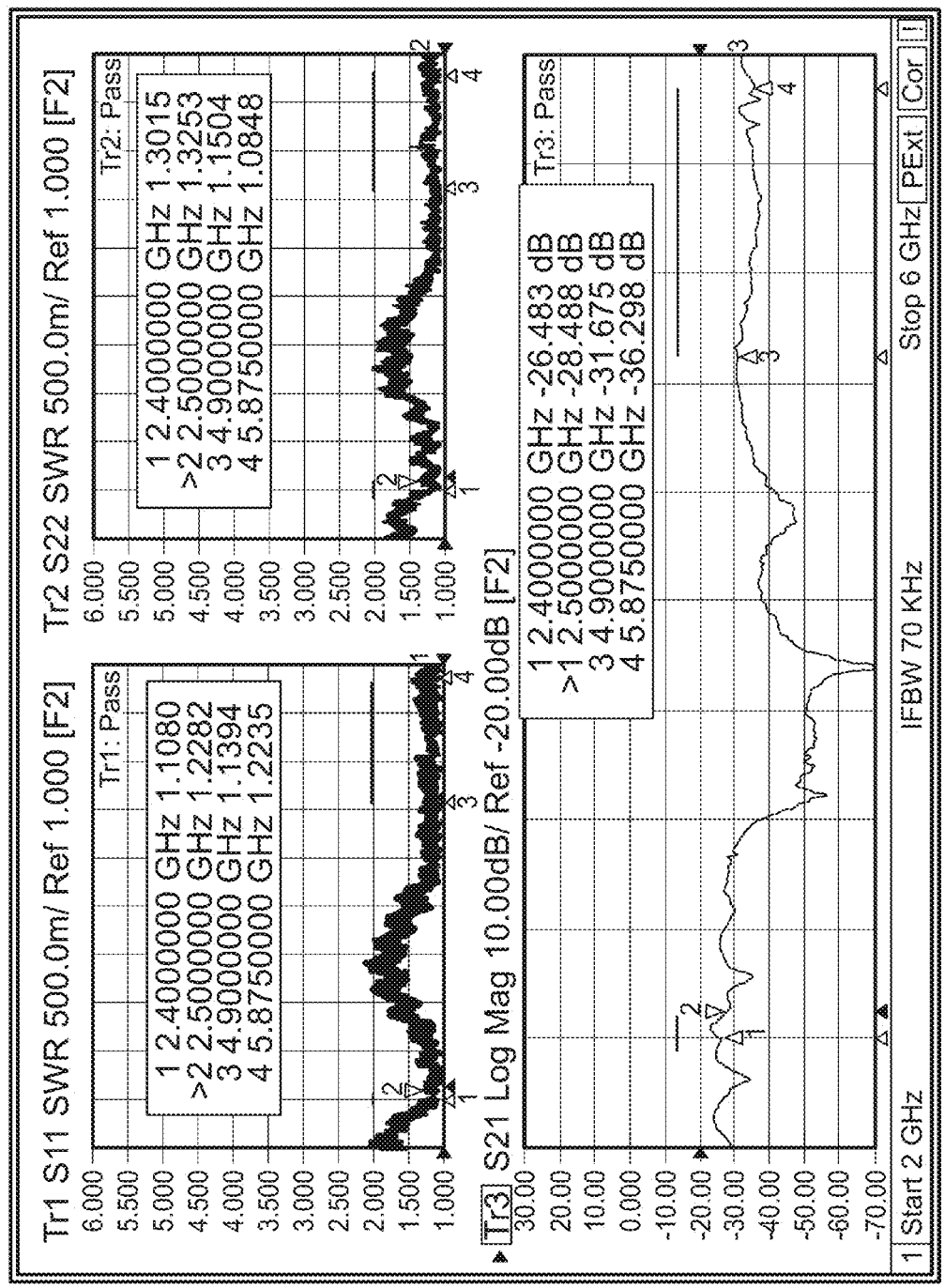
Figure 23A:
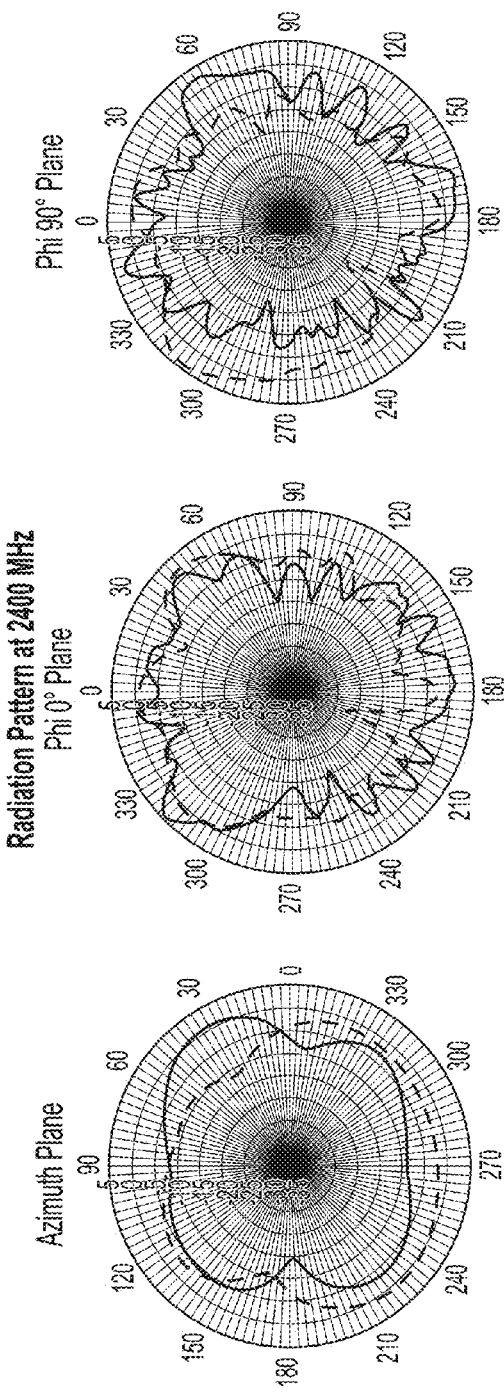
Figure 23B:
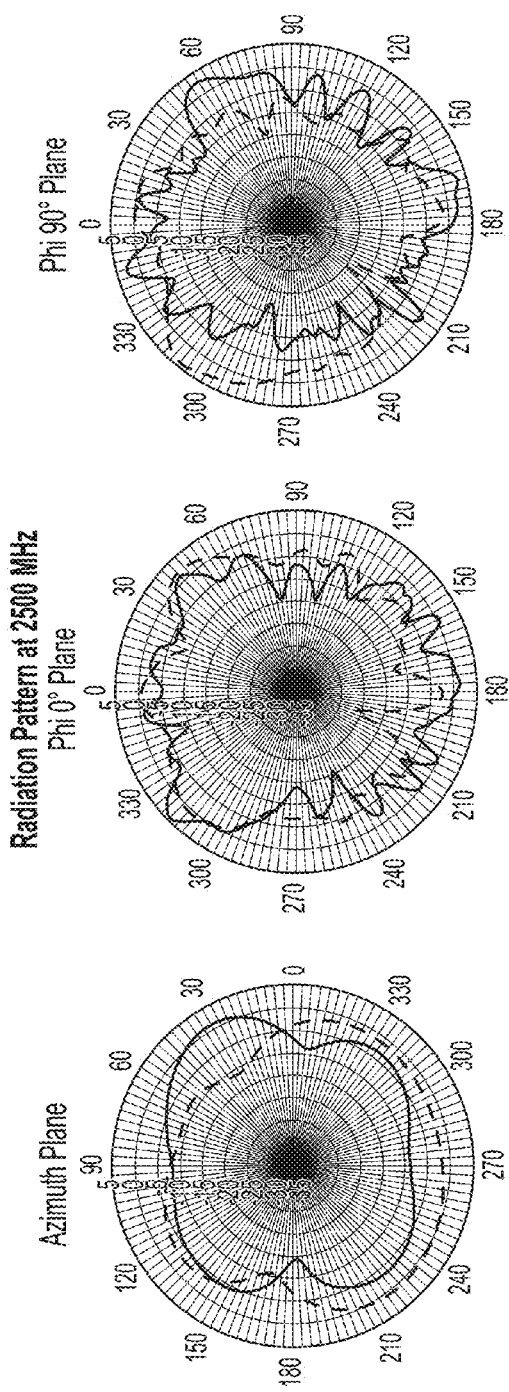
Figure 24A:
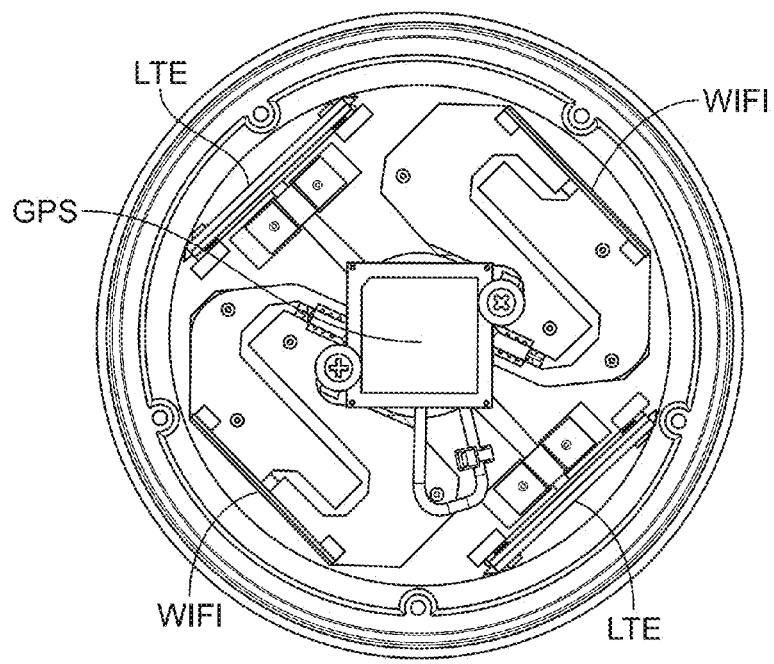
Figure 24B:
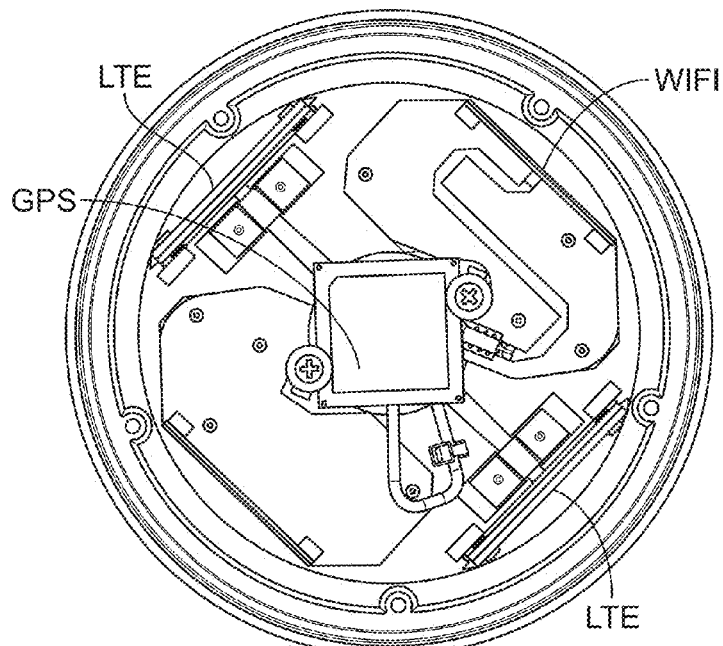
Figure 24C:
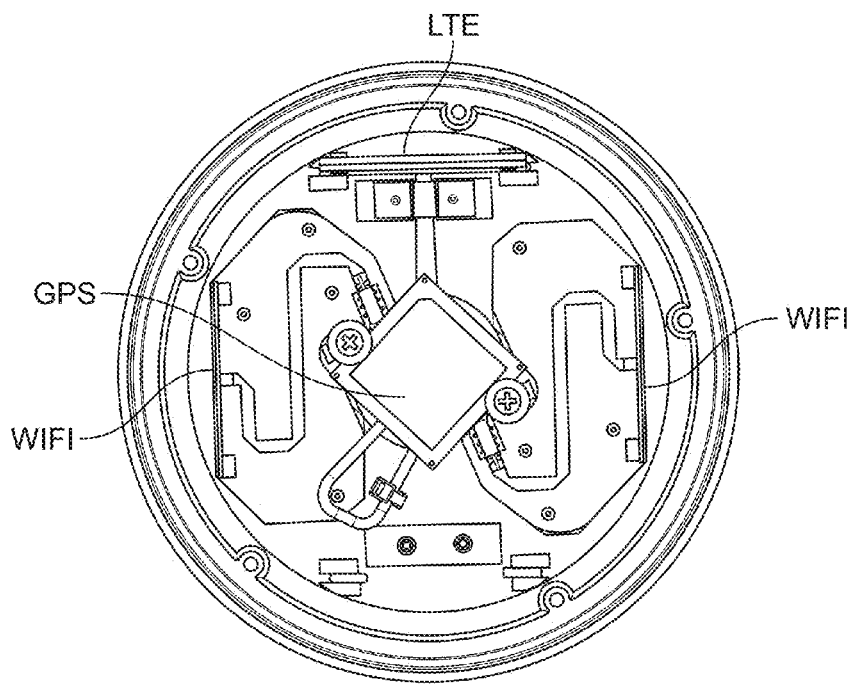
Figure 24D:
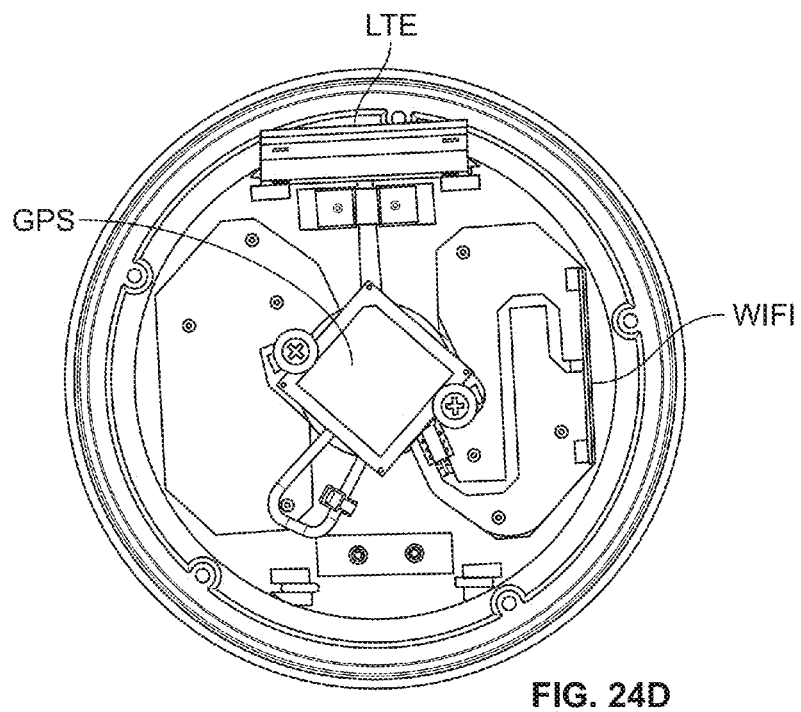
Figure 24E:
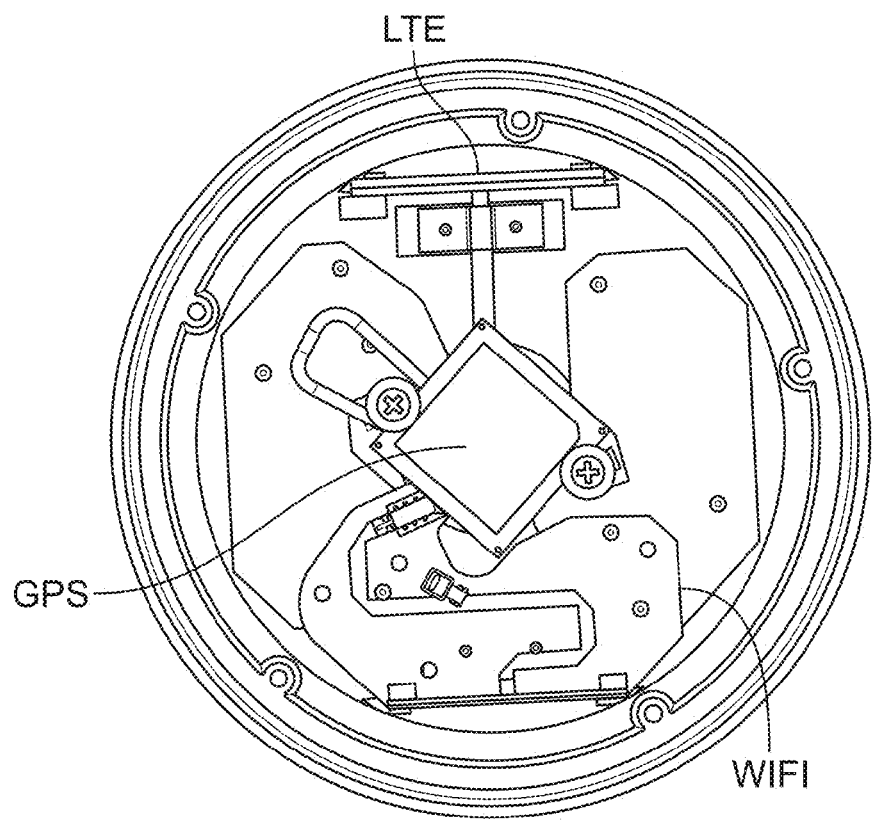
Figure 25:
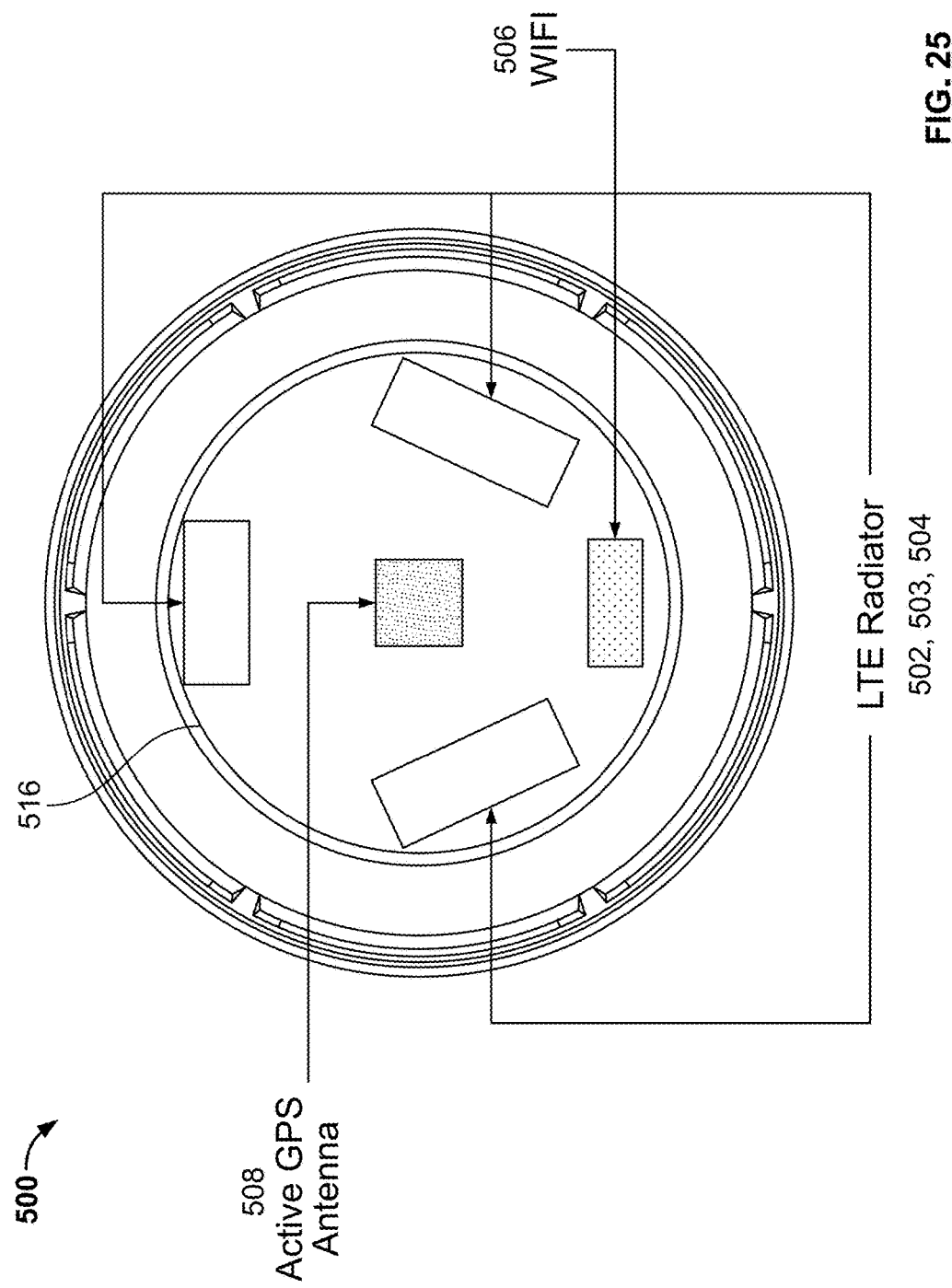
Figure 26:
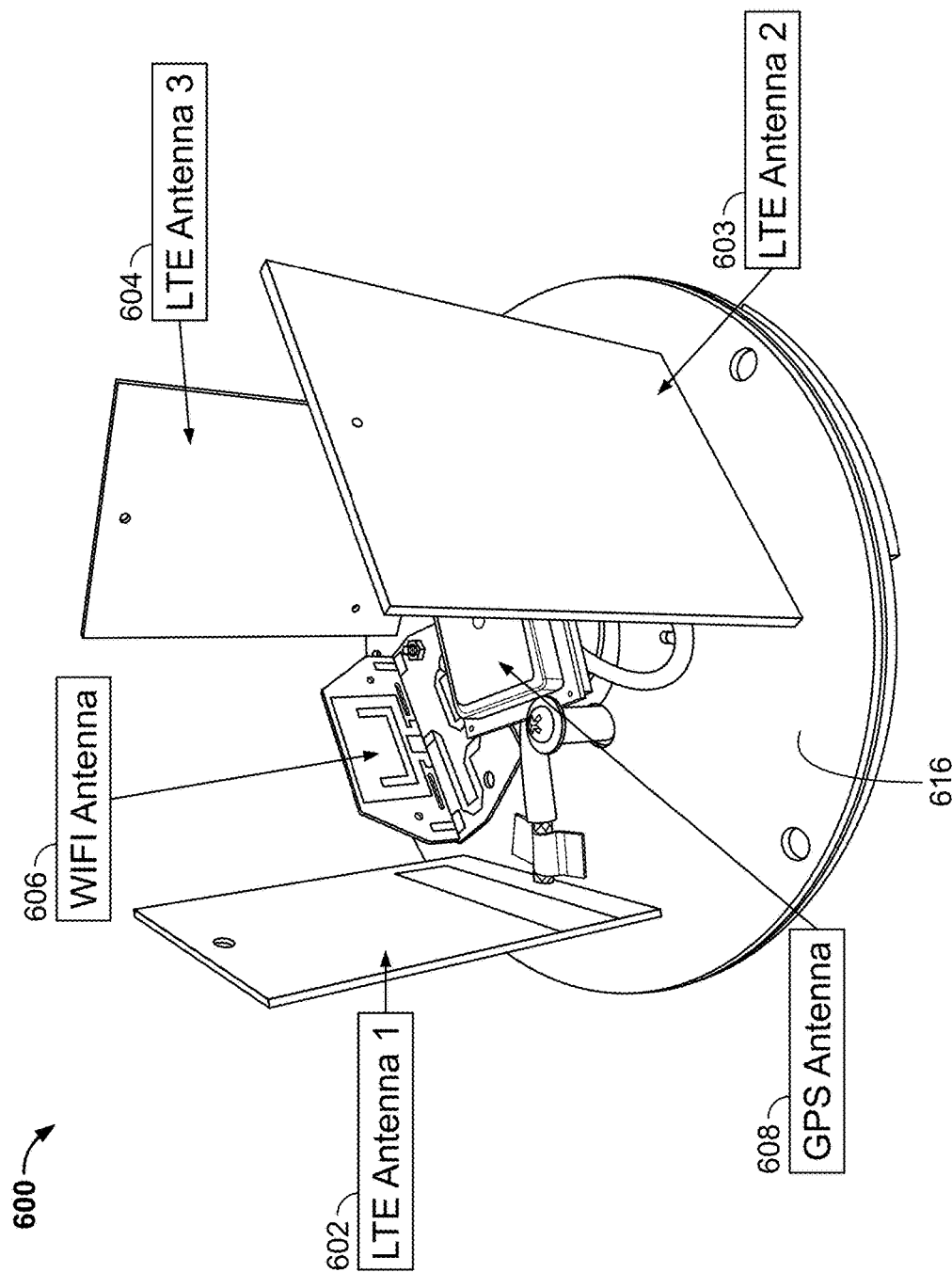

FIGS. 3A, 3B, and 3C illustrate an exemplary LTE antenna that may be used in a multiband antenna assembly according to exemplary embodiments;

FIGS. 3D and 3E illustrate an exemplary LTE antenna that may be used in a multiband antenna assembly according to exemplary embodiments;

FIGS. 3F, 3G, and 3H illustrate an exemplary LTE antenna that may be used in a multiband antenna assembly according to exemplary embodiments;

FIG. 4 includes exemplary line graphs of voltage standing wave ratio (VSWR) S11 and S22 and isolation S21 in decibels (dB) versus frequency measured for the LTE antennas of the 4-port multiband antenna assembly shown in FIGS. 1A through 2B;

FIGS. 5A through 5H illustrate radiation patterns (azimuth plane, Phi 0° plane, and Phi 90° plane) measured for a prototype of the 4-port multiband antenna assembly shown in FIGS. 1A through 2B at frequencies of 698 megahertz (MHz), 807 MHz, 824 MHz, 960 MHz, 1710 MHz, 2170 MHz, 2400 MHz, and 2700 MHz, respectively;

FIG. 6 illustrates an exemplary double sided printed circuit board (PCB), a base, and a pad that may be used as a base assembly or chassis in a multiband antenna assembly according to exemplary embodiments;

FIG. 7A is a bottom perspective view of the base shown in FIG. 6, and also illustrating an antenna mounting member and coaxial cables according to exemplary embodiments;

FIG. 7B is a partial perspective view showing the multiple layers of an example base assembly that may be used in a multiband antenna assembly according to exemplary embodiments;

FIG. 7C is a bottom perspective view showing the bottom layer of the double sided PCB of the exemplary base assembly shown in FIG. 7B;

FIGS. 8A, 8B, and 8C illustrate an example Wi-Fi antenna that may be used in a multiband antenna assembly according to exemplary embodiments;

FIG. 9 includes exemplary line graphs of voltage standing wave ratio (VSWR) S11 and S22 and isolation S21 in decibels (dB) versus frequency measured for the Wi-Fi and LTE antennas of the 4-port multiband antenna assembly shown in FIGS. 1A through 2B;

FIGS. 10A through 10F illustrate radiation patterns (azimuth plane, Phi 0° plane, and Phi 90° plane) measured for a prototype of the 4-port multiband antenna assembly shown in FIGS. 1A through 2B at frequencies of 2400 MHz, 2500 MHz, 4900 MHz, 5350 MHz, 5750 MHz, and 5875 MHz, respectively;

FIG. 11 is a schematic view of a 5-port multiband antenna assembly according to another exemplary embodiment;

FIG. 12 is a front view of the 5-port multiband antenna assembly shown in FIG. 11 with a radome or cover positioned over the LTE, Wi-Fi, and Active GPS antennas or radiators, where the dimensions are provided (in millimeters) as examples only;

FIG. 13 is an upper view of a prototype 5-port multiband antenna assembly including two LTE antennas, two WI-FI antennas, and an Active GPS antenna according to an exemplary embodiment;

FIG. 14 is a perspective view of a 5-port multiband antenna assembly including two LTE antennas, two Wi-Fi antennas, and an Active GPS antenna according to an exemplary embodiment;

FIG. 15 is a top view of the multiport multiband antenna assembly shown in FIG. 14;

FIG. 16 shows an exemplary base assembly or chassis having an extended ground plane to tune isolation in a multiband antenna assembly according to exemplary embodiments;

FIG. 17 is a perspective view of the two LTE antennas or radiators of the antenna assembly shown in FIG. 14, and illustrating an exemplary one-sided symmetry shorted monopole;

FIG. 18 is a perspective view showing the Wi-Fi antennas or radiators of the antenna assembly shown in FIG. 14, and illustrating a longer transmission line to reduce gain;

FIG. 19 is a perspective view showing a Wi-Fi antenna or radiator of the antenna assembly shown in FIG. 14;

FIG. 20 includes exemplary line graphs of voltage standing wave ratio (VSWR) S11 and S22 and isolation S21 in decibels (dB) versus frequency measured for the LTE antennas of the 5-port multiband antenna assembly shown in FIG. 13 with a 17 feet long cable;

FIGS. 21A through 21H illustrate radiation patterns (azimuth plane, Phi 0° plane, and Phi 90° plane) measured for the 5-port multiband antenna assembly shown in FIG. 13 at frequencies of 698 MHz, 824 MHz, 850 MHz, 960 MHz, 1710 MHz, 1990 MHz, 2170 MHz, and 2700 MHz, respectively;

FIG. 22 includes exemplary line graphs of voltage standing wave ratio (VSWR) S11 and S22 and isolation S21 in decibels (dB) versus frequency measured for the Wi-Fi antennas of the 5-port multiband antenna assembly shown in FIG. 13 with a 17 feet long cable;

FIGS. 23A through 23F illustrate radiation patterns (azimuth plane, Phi 0° plane, and Phi 90° plane) measured for the 5-port multiband antenna assembly shown in FIG. 13 at frequencies of 2400 MHz, 2500 MHz, 4900 MHz, 5200 MHz, 5600 MHz, and 5875 MHz, respectively;

FIGS. 24A through 24E are example configurations of different antennas or radiators that may be used for a multiband antenna assembly according to exemplary embodiments;

FIG. 25 illustrates an exemplary embodiment of an antenna assembly including three LTE antennas, a Wi-Fi antenna, and a GPS antenna;

FIG. 26 is a perspective view of an antenna assembly including three LTE antennas, a Wi-Fi antenna, and a GPS antenna according to an exemplary embodiment.

Figure 27A:
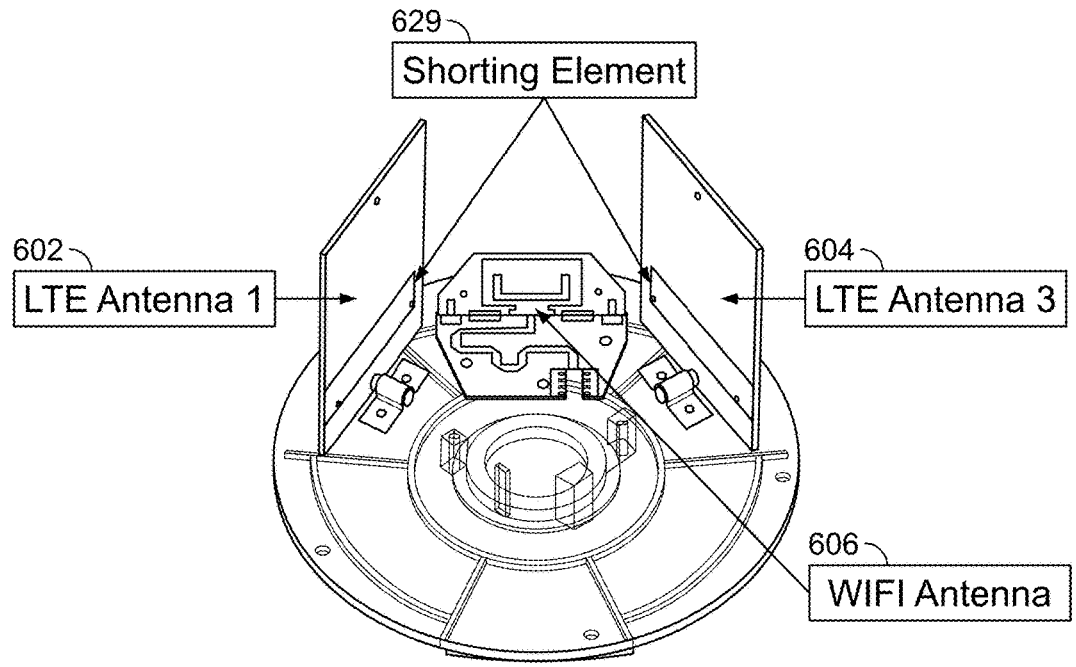
Figure 27B:
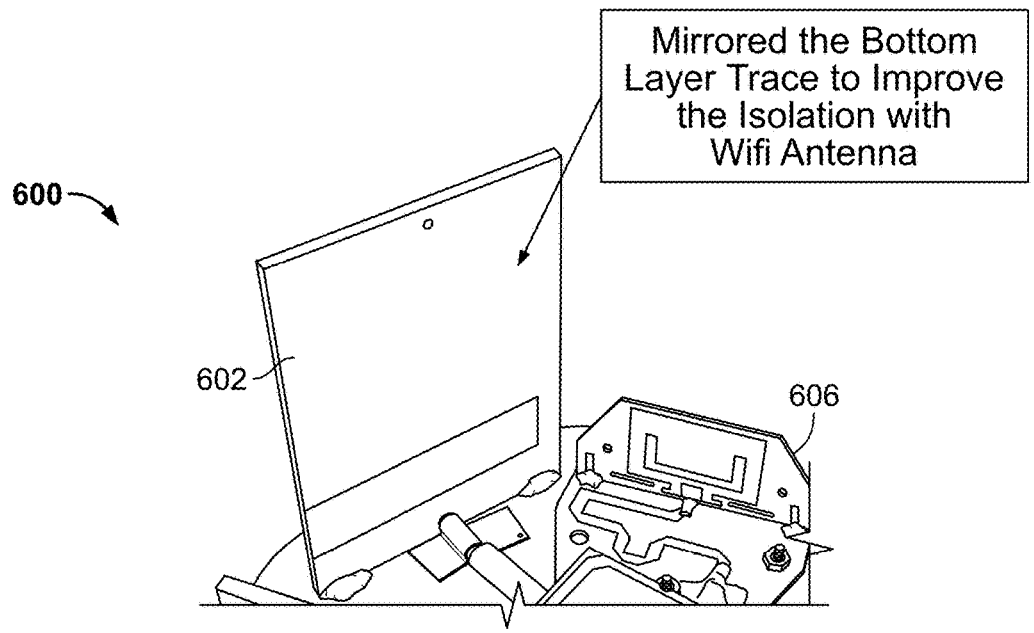
Figure 28:
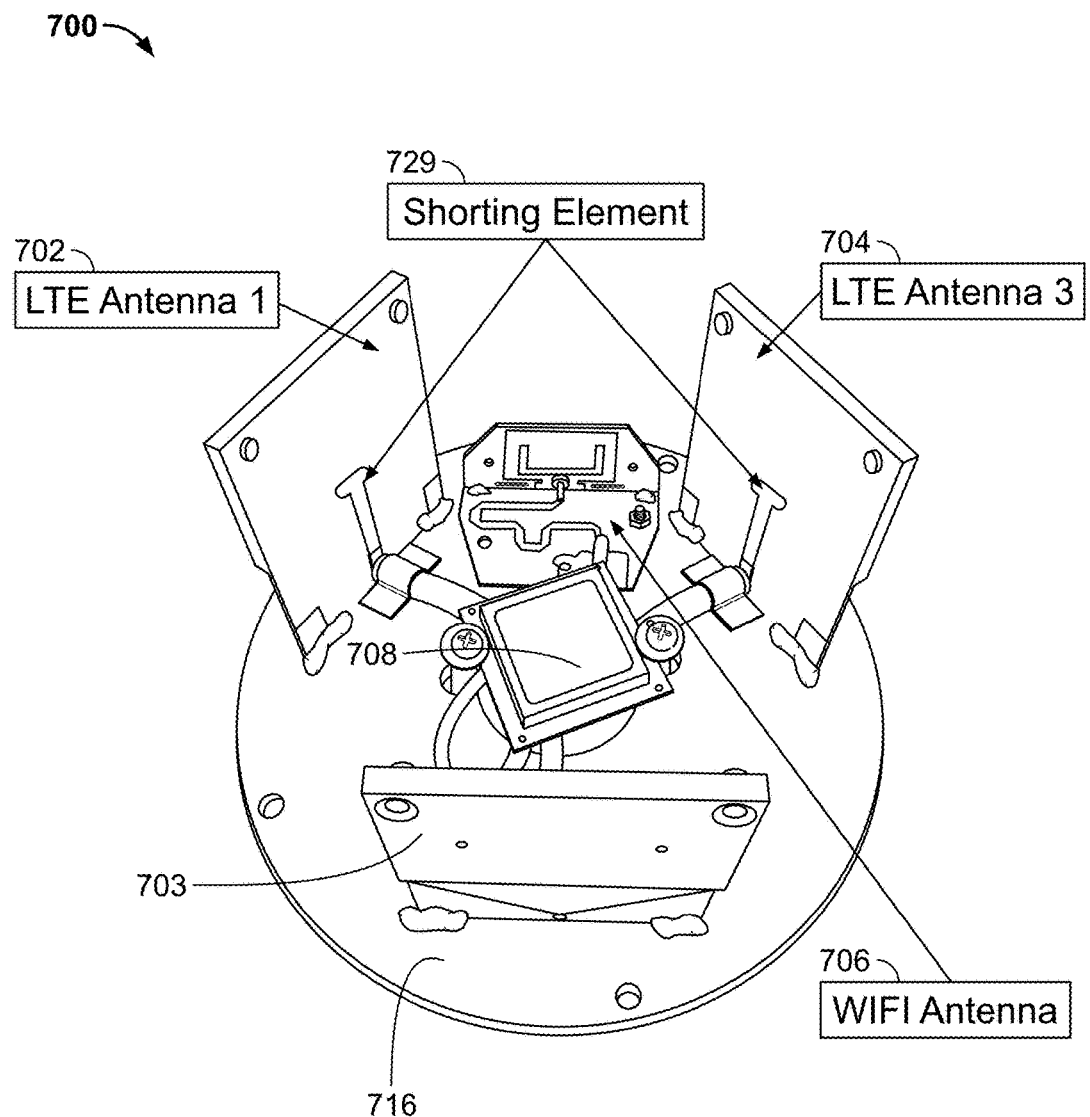

FIG. 27A is a partial perspective view of the antenna assembly shown in FIG. 26 and illustrating mirrored shorting elements of two LTE antennas;

FIG. 27B is a partial perspective view of the antenna assembly shown in FIG. 26 and illustrating the shorting element of an LTE antenna that includes a bottom layer trace mirrored so as to improve isolation with the Wi-Fi antenna;

FIG. 28 is a perspective view of an antenna assembly including three LTE antennas, a Wi-Fi antenna, and a GPS antenna according to an exemplary embodiment.

Figure 32:
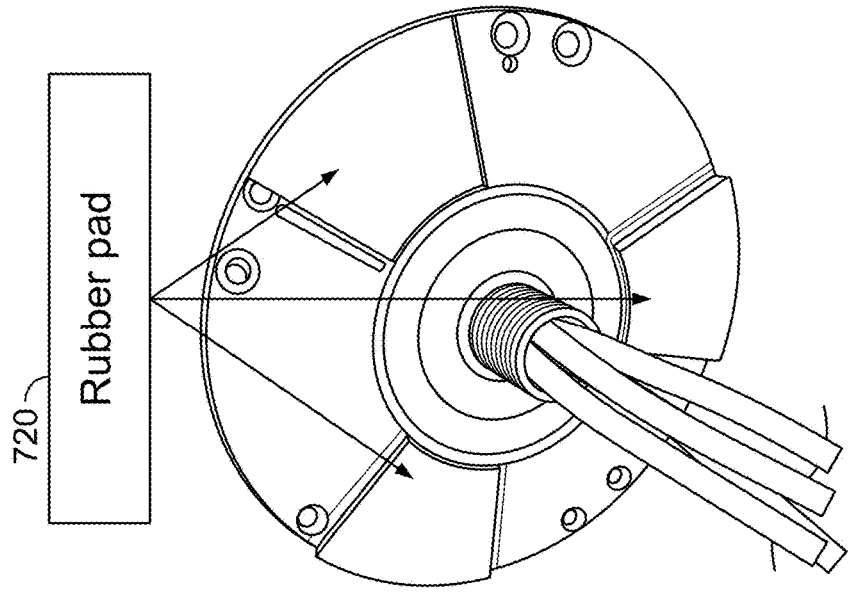
Figure 31:
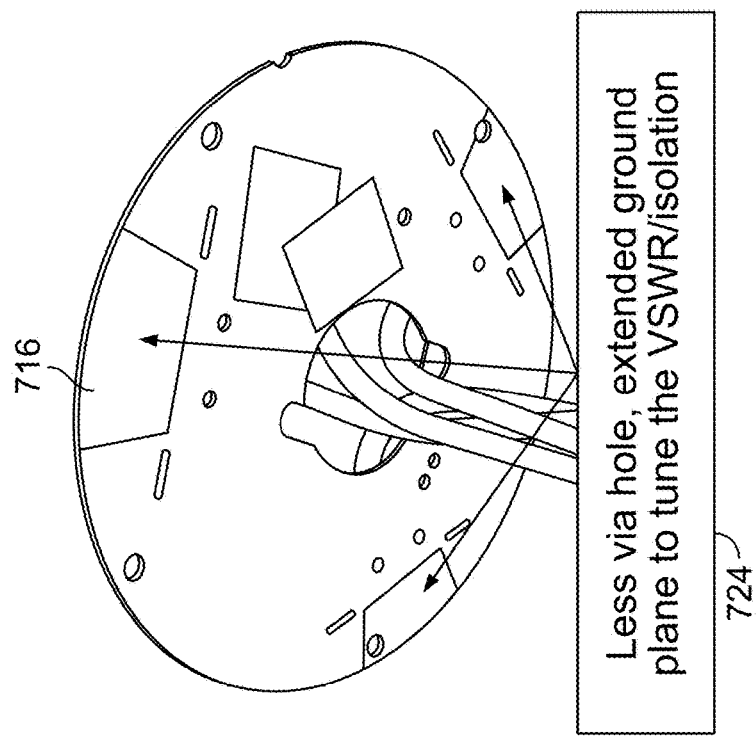

FIG. 29 is a partial perspective view of the antenna assembly shown in FIG. 28 and illustrating a longer/non-linear transmission line to reduce the gain at 4900-5900 MHz;

FIG. 30 is a partial perspective view of the antenna assembly shown in FIG. 28 and illustrating the shorting element at about the center of the LTE antenna;

FIG. 31 is a bottom perspective view of the antenna assembly shown in FIG. 28, and illustrating an extended ground plane to tune the VSRW/isolation;

FIG. 32 is a bottom perspective view of the antenna assembly shown in FIG. 28, and illustrating a pad (e.g., rubber, foam, etc.) that may be placed between the base and a mounting surface on which the antenna assembly is to be mounted.

Figure 33:
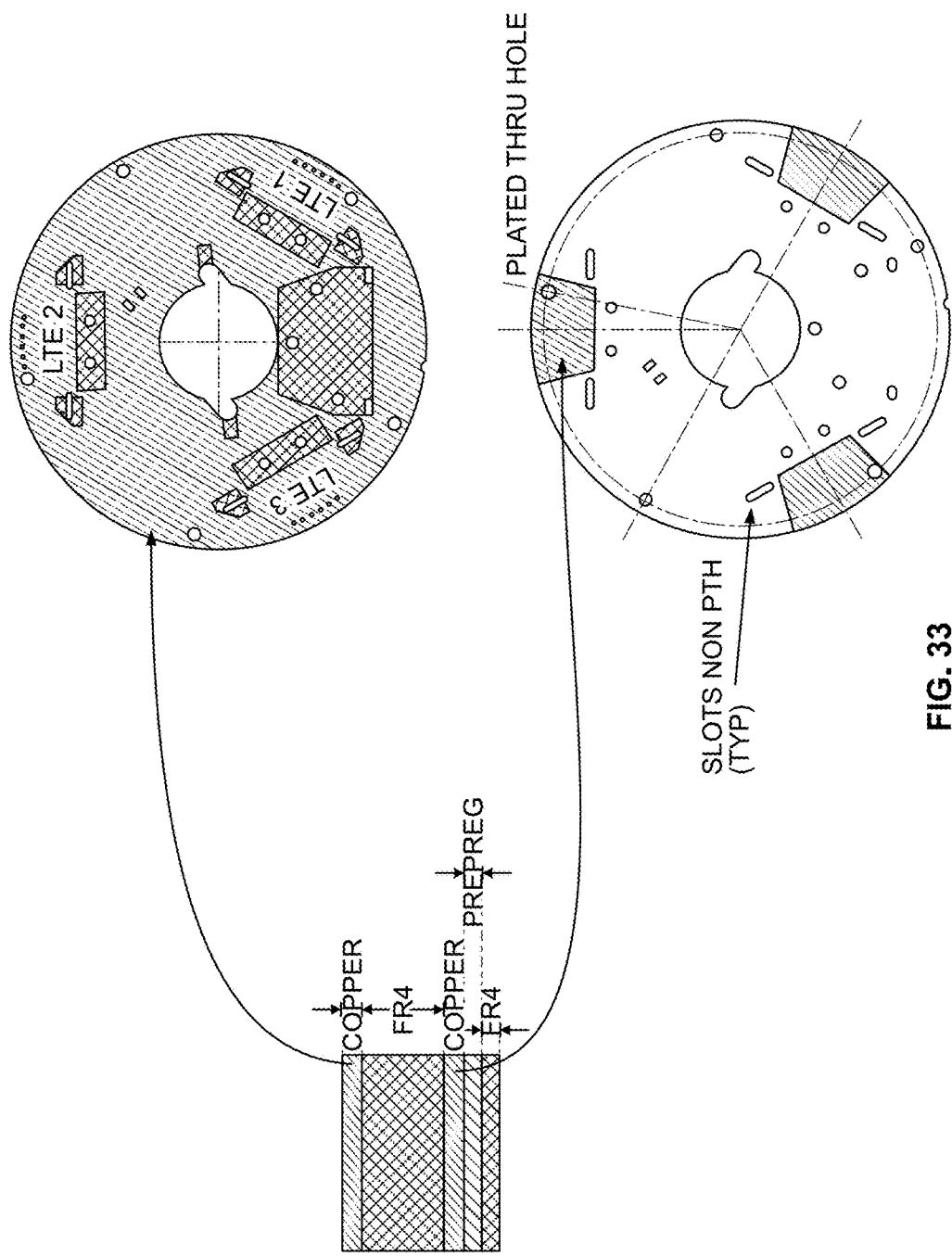
Figure 34:
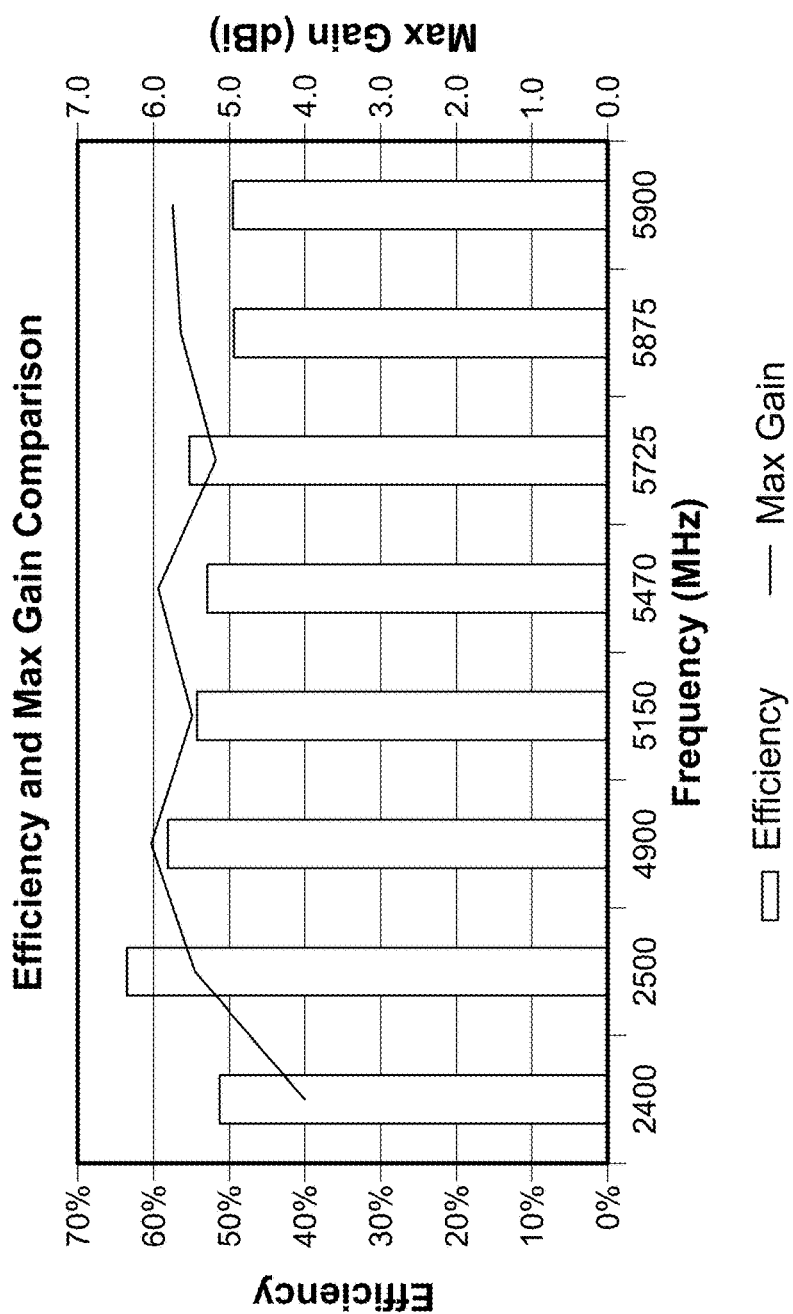
Figure 35:
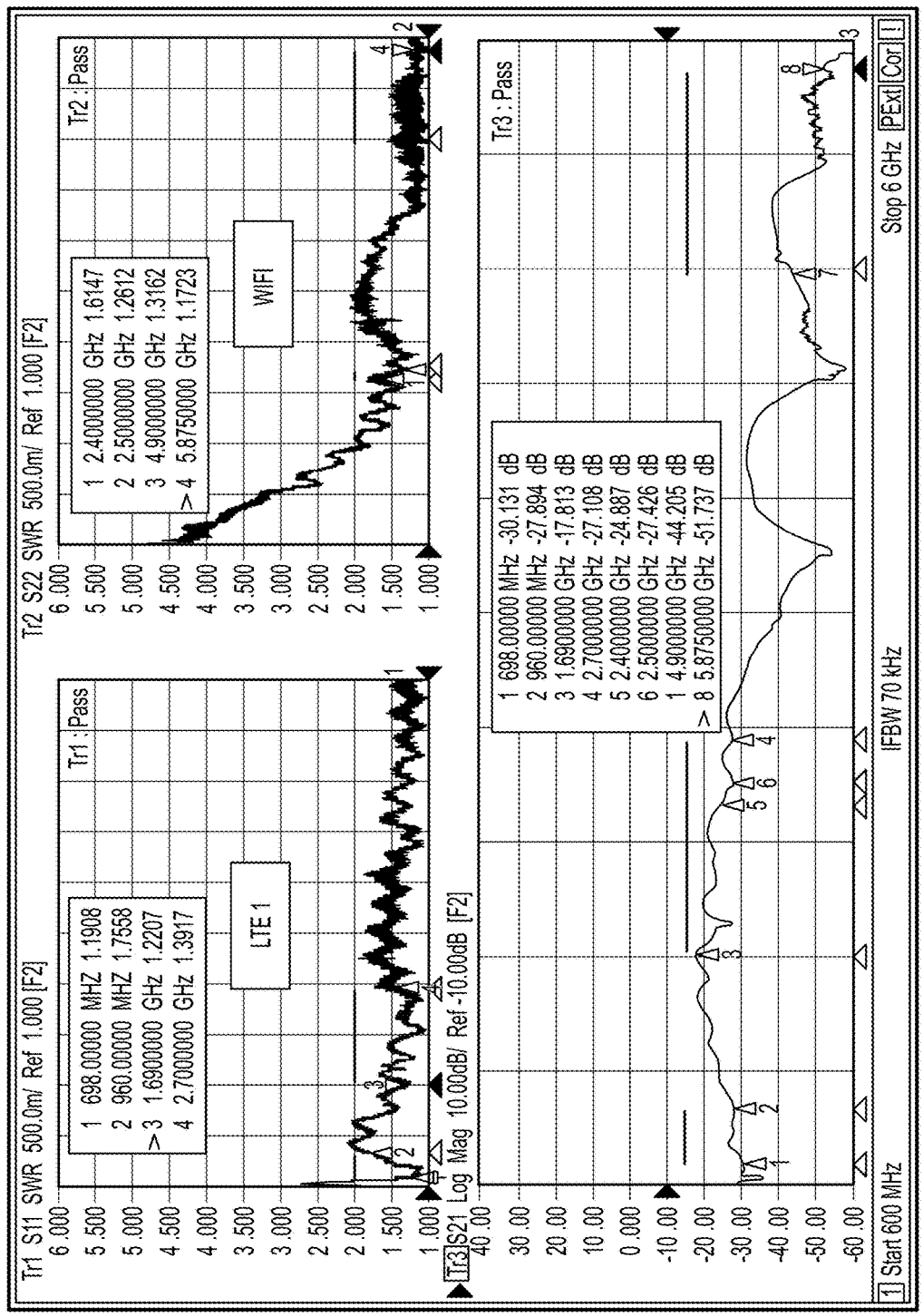
Figure 36:
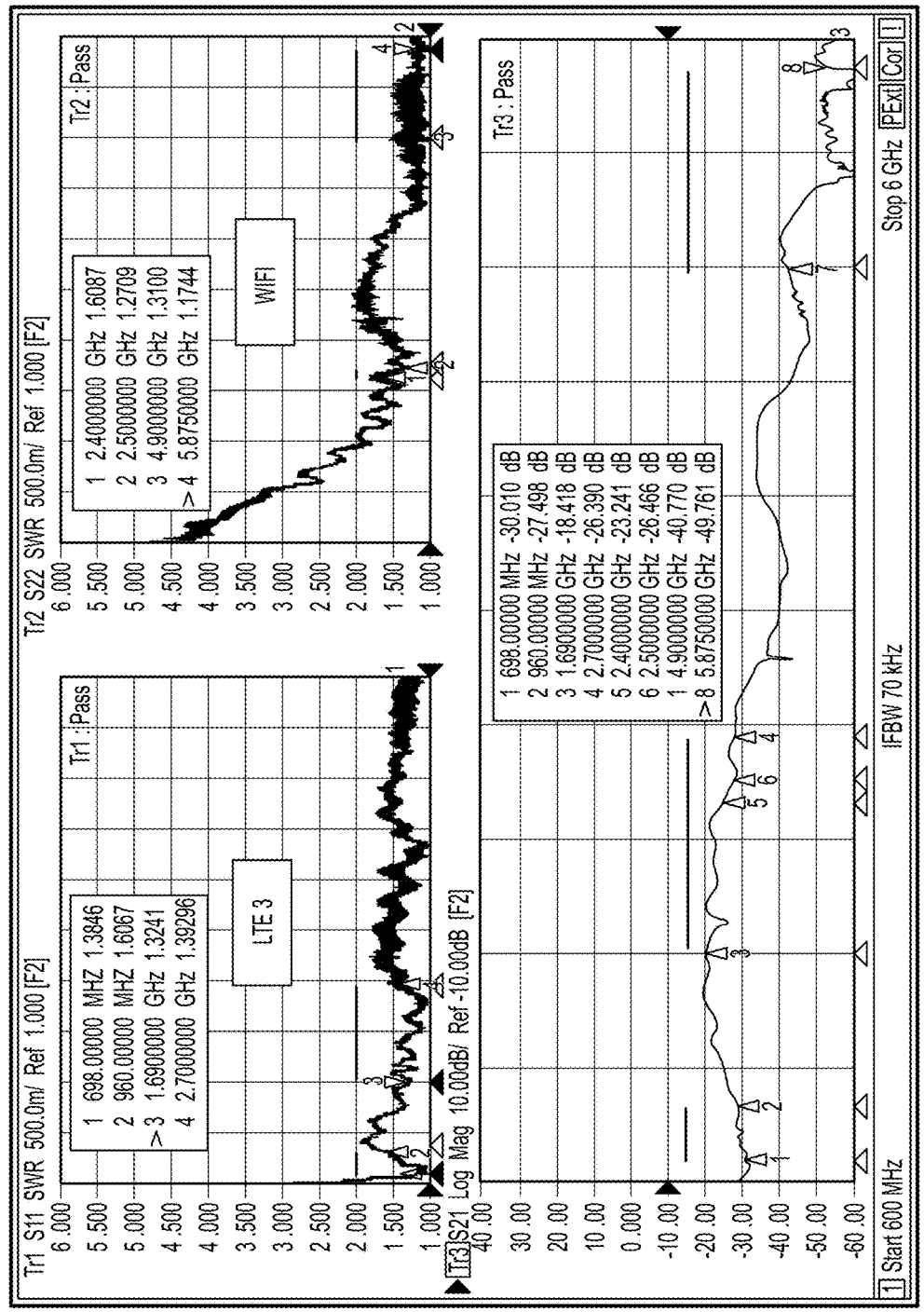
Figure 37:
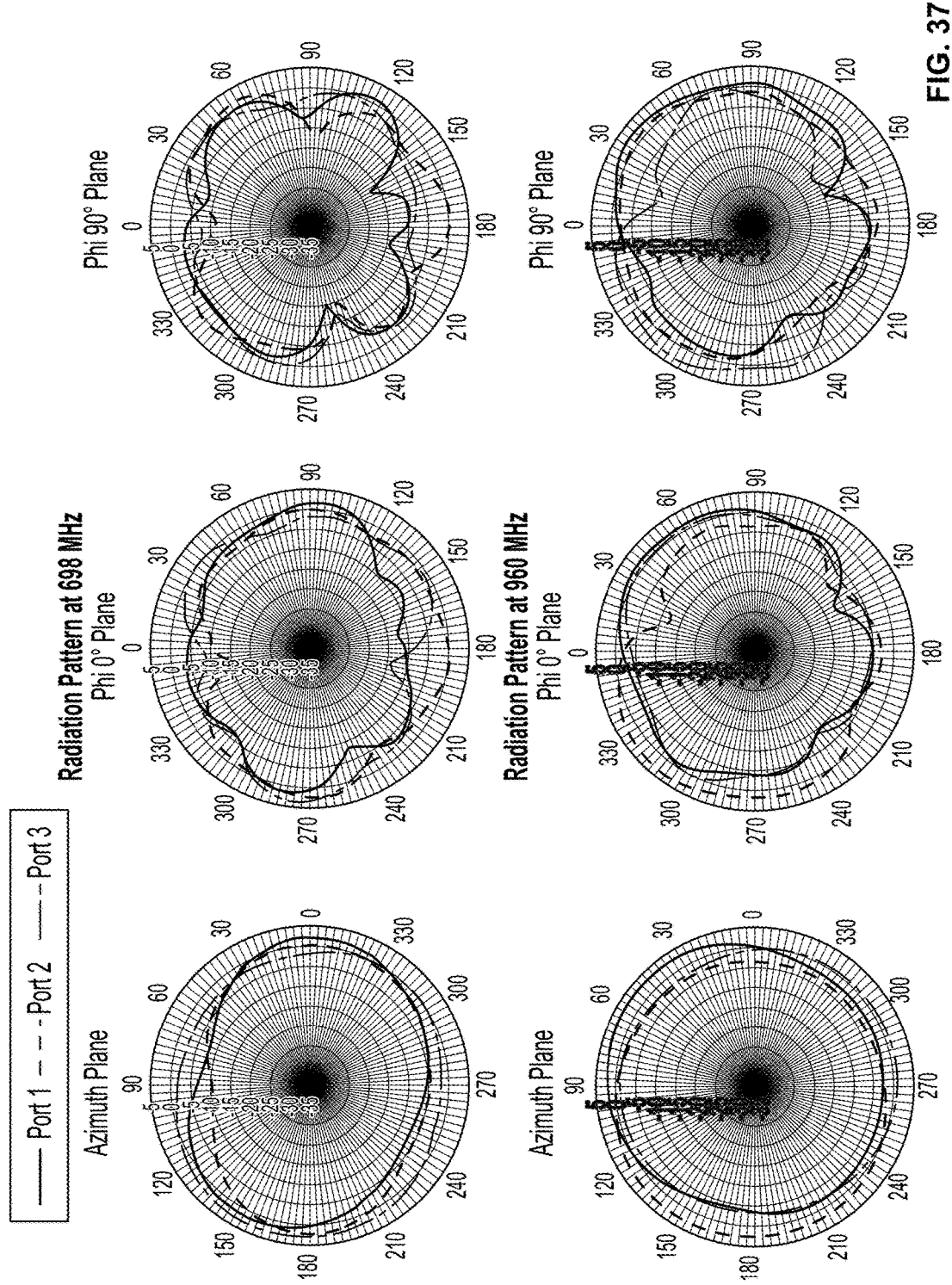
Figure 38:
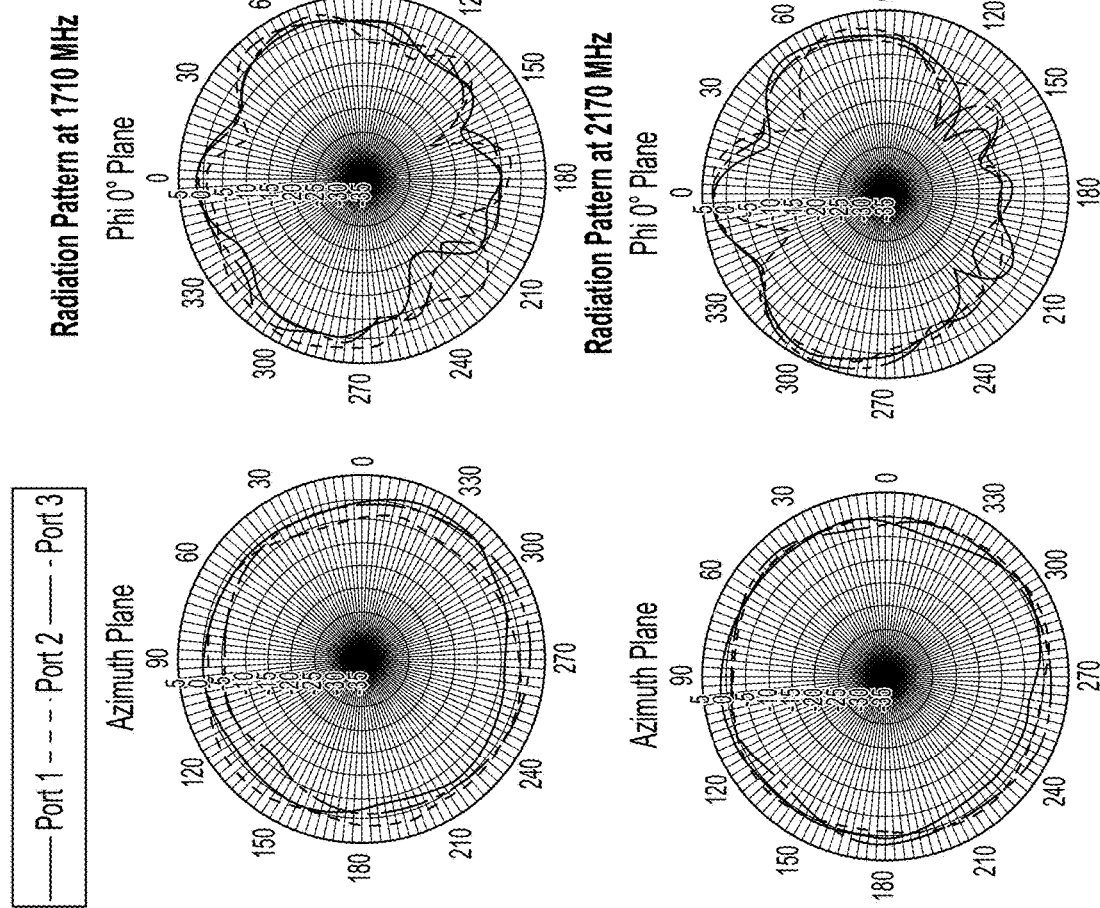
Figure 39:
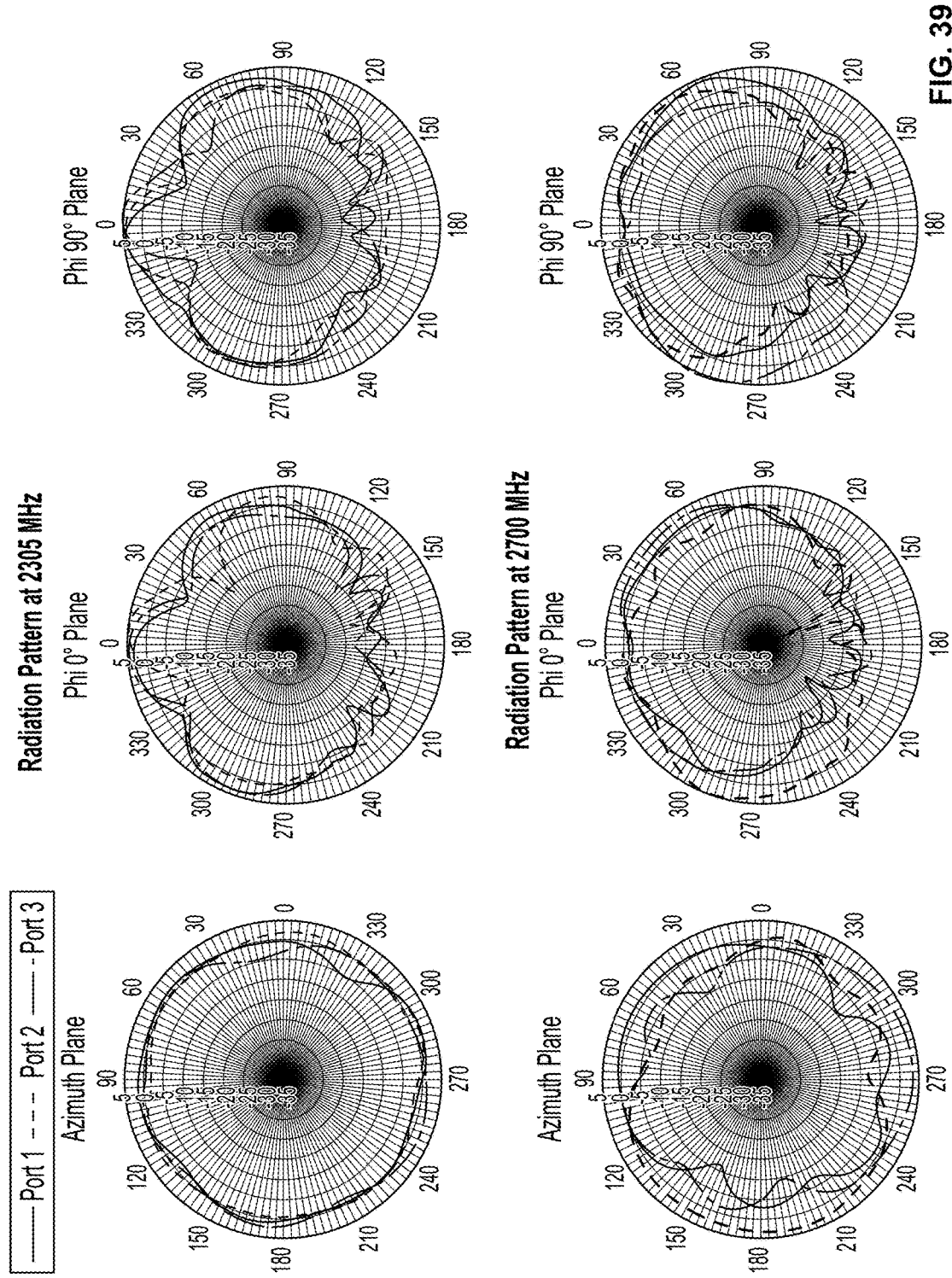

FIG. 33 illustrates the extended ground plane of the antenna assembly shown in FIG. 28, and illustrating a multilayer PCB (e.g., copper, FR4, copper, prepreg, FR4, etc.) that may be used for the ground plane according to an exemplary embodiment;

FIG. 34 includes an exemplary bar graph of efficiency and max gain in decibels (dB) for the Wi-Fi antenna of the antenna assembly shown in FIG. 28;

FIG. 35 includes exemplary line graphs of voltage standing wave ratio (VSWR) S11 and S22 and isolation S21 in decibels (dB) versus frequency for the first LTE antenna (LT1) and the Wi-Fi Antenna of the antenna assembly shown in FIG. 28;

FIG. 36 includes exemplary line graphs of voltage standing wave ratio (VSWR) S11 and S22 and isolation S21 in decibels (dB) versus frequency for the third LTE antenna (LT3) and the Wi-Fi Antenna of the antenna assembly shown in FIG. 28; and FIGS. 37 through 39 illustrate radiation patterns (azimuth plane, Phi 0° plane, and Phi 90° plane) measured for ports 1, 2, and 3 of the antenna assembly shown in FIG. 28 at frequencies of 698 MHz, 960 MHz, 1710 MHz, 2170 MHz, 2305 MHz, and 2700 MHz, respectively.

DETAILED DESCRIPTION

Example embodiments will now be described more fully with reference to the accompanying drawings.

The inventors hereof have recognized a need for more integration of and/or placement of more LTE MIMO, Wi-Fi, and GPS antennas or radiators (e.g., two in relatively low profile and relatively small diameter single radome structure systems. The inventors also recognized that isolation and cross correlation are important parameters to achieve full potential or optimum throughput for LTE MIMO applications. But placement of the radiators closely together increases the mutual coupling and thus reduces the performance of the MIMO system. Having high mutual coupling may not meet the isolation specification. A Wi-Fi antenna installed on a large ground plane may have its gain over the limit set by the FCC regulation. Using various radiators may also result in high gain depending on the whole configuration of the antenna assembly, for example, the arrangement of the radiators, the shorting paths for the radiators, etc. Moreover, it is a challenge to lower antenna gain especially for the high frequency bands where the radiation patterns tend to direct to the top direction due to the reflection of the mounting surface. In addition, the higher antenna gain at the high frequency band is a result of the larger mounting surface. Therefore, the inventors' developed and disclose arrangements and orientations of antennas or radiators that may preferably be adjusted for the necessary introduction of loss to the antenna systems and reasonable tradeoff for different antenna designs.

Accordingly, the inventors have disclosed herein exemplary embodiments of multiport (e.g., 3-port, 4-port, 5-port, etc.) multiband vehicular antenna assemblies that include multiple radiators or antennas operable over various frequencies, such as one or more cellular frequencies (e.g., Long Term Evolution (LTE), etc.), internet frequencies (e.g., WIFI, WIFI ISM, etc.), satellite navigation frequencies (e.g., Global Positioning System (GPS), Global Navigation Satellite System (GLONASS), etc.), and/or other frequencies. For example, a multiport multiband antenna assembly may include radiators or antennas operable with LTE, WI-FI, GPS (and/or with other cellular, internet, and/or satellite navigation frequencies) where the radiators or antennas are located and/or part of a single antenna system, e.g., positioned on and/or supported by the same or common base assembly and within the same interior enclosure cooperatively defined by the base assembly and radome of a single roof-mount antenna system, etc.

In an exemplary embodiment, a multiport multiband antenna assembly includes at least one cellular radiator or antenna operable with LTE, at least one internet radiator or antenna operable with WI-FI, and at least one satellite navigation radiator or antenna operable with at least GPS. The cellular or LTE antenna, internet or WI-FI antenna, and satellite navigation or GPS antenna may all be located and/or part of a single antenna system, e.g., positioned on and/or supported by the same or common base assembly and within the same interior enclosure cooperatively defined by the base assembly and radome of a single roof-mount antenna system, etc. In some exemplary embodiments, a multiport multiband antenna assembly may preferably have a relatively low profile and relatively small diameter yet still be operable for covering the large bandwidths of the LTE bands and operable with good isolation between the antennas or radiators, good omnidirectional radiation frequency patterns, and good peak gain (e.g., good peak gain for the Wi-Fi radiators or antennas, etc.).

In some exemplary embodiments, a vehicular multiband antenna assembly includes two LTE radiators, two Wi-Fi radiators, and one active GPS radiator. The antenna assembly may be used in applications for a MIMO system that operates for LTE bands, Wi-Fi bands, as well as GPS, which antenna assembly may be mounted on an external surface of a vehicle body wall or other large ground plane, e.g., having a diameter of 1 foot or 300 millimeters (mm) or more, etc. For example, exemplary embodiments are disclosed of 3-port, 4-port, and 5-port multiband antenna assemblies or systems (e.g., 100 (FIG. 1), 200 (FIG. 2C), 300 (FIG. 2D), 400 (FIG. 13), etc.) that include multiple antennas or radiators placed under the same radome or cover on a common base assembly and that are operable with good isolation between antennas, good omnidirectional radiation patterns across broad frequency bands or ranges, e.g., across the LTE, Wi-Fi, and GPS frequency bands, from about 698 megahertz (MHz) to about 960 MHz, from about 1710 MHz to about 2170 MHz, from about 2400 MHz to 2700 MHz, from about 2400 MHz to about 2500 MHz, from about 4900 MHz to about 5875 MHz, etc.

With reference now to the figures, FIGS. 1A through 2B illustrate an exemplary embodiment of a 4-port multiband antenna assembly 100 embodying one or more aspects of the present disclosure. As shown, the antenna assembly 100 includes two LTE antennas or radiators 102 and 104, one Wi-Fi antenna or radiator 106, and one GPS antenna or radiator 108 (e.g., a patch antenna, etc.).

Each LTE radiator 102, 104 may be electrically coupled with dielectric substrates 110, 112 (e.g., top-loaded printed circuit boards (PCBs), etc.). The Wi-Fi radiator 106 may be electrically coupled with a dielectric substrate 114 (e.g., PCB with at least one transmission line, etc.).

The antenna assembly 100 is configured to be installed on a ground plane 116 (e.g., a PCB with plated through holes, a double sided PCB ground plane, etc.). The ground plane 116 may be mounted with a base 118 (e.g., dielectric base, plastic base, etc.). Additionally, a pad 120 (e.g., rubber, foam, etc.) may be placed between the base 118 and a mounting surface (not shown) on which the antenna assembly 100 is to be mounted. The pad 120 may be attached to base 118 via, e.g., a friction or interference fit, etc. The pad 120 may help prevent water ingress into the antenna assembly 100. The pad 120 may also help with tweaking or tuning the isolations between the LTE antennas 102, 104.

Further, the antenna assembly 100 also includes a radome or cover 122 (e.g., a plastic radome, etc.). The cover 122 is configured to fit over the LTE radiators 102, 104, Wi-Fi radiator 106, and GPS patch element 108, such that the antennas 102, 104, 106, 108 are disposed or co-located under the cover 122. The cover 122 is configured to protect the relatively fragile antenna elements from damage due to environmental conditions such as vibration or shock during use. The cover 122 may be formed from a wide range of materials, such as, for example, polymers, urethanes, plastic materials (e.g., polycarbonate blends, Polycarbonate-Acrylnitril-Butadien-Styrol-Copolymer (PC/ABS) blend, etc.), glass-reinforced plastic materials, synthetic resin materials, thermoplastic materials (e.g., GE Plastics Geloy® XP4034 Resin, etc.), etc. within the scope of the present disclosure.

Figure 2B:
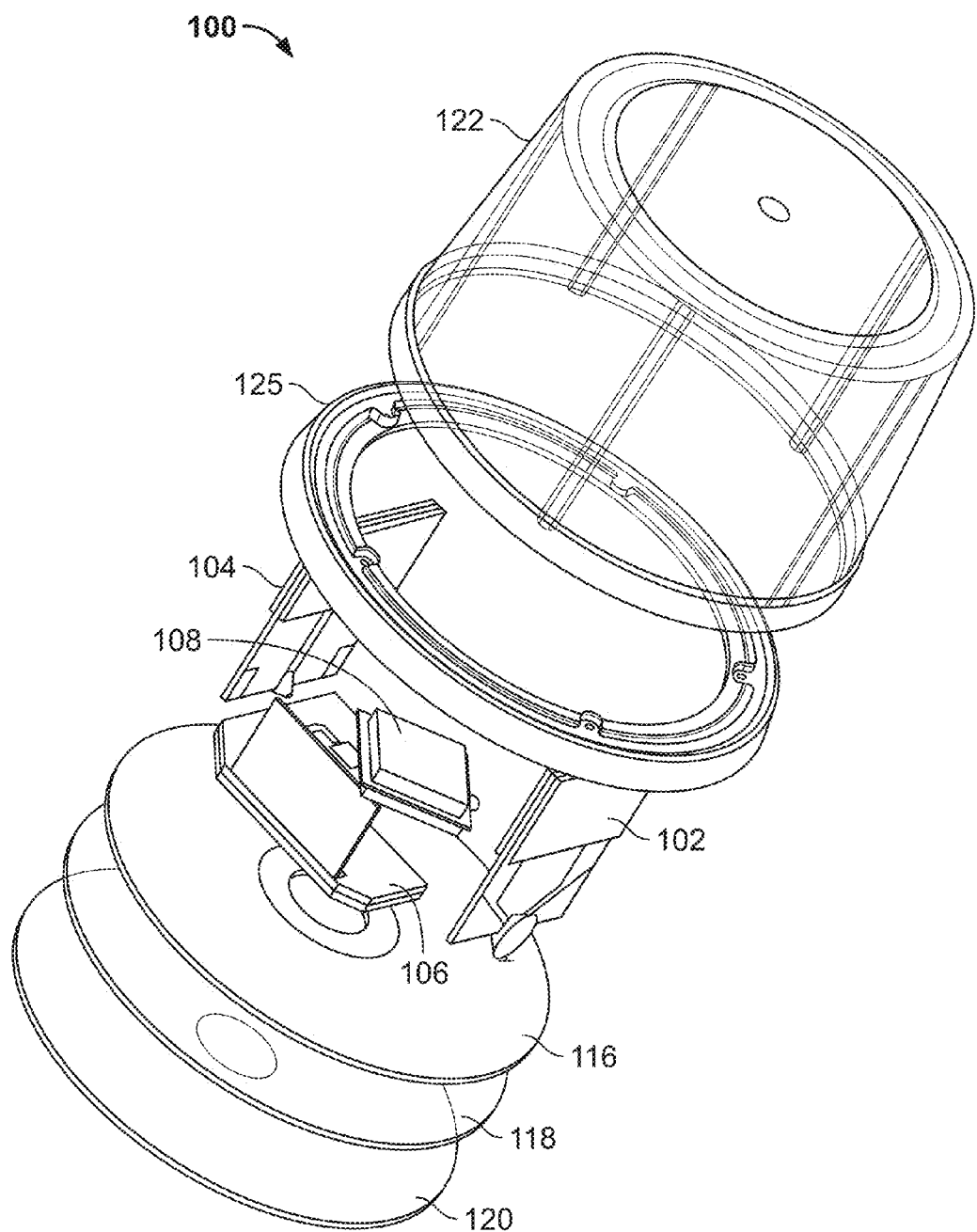

As shown in FIGS. 2A and 2B, the antenna assembly 100 may also include a sealing member 125 (e.g., an O-ring, a resiliently compressible elastomeric or foam gasket, caulk, adhesives, other suitable packing or sealing members, a silicon gasket, etc.) that is positioned between the cover 122 and the mounting surface for substantially sealing the cover 122 against the mounting surface. The sealing member 125 may be operable as a seal against dust, water ingress, etc. and as a shield support. In some embodiments, sealing may be achieved by one or more integral sealing features rather than with a separate sealing mechanism.

Figure 1A:
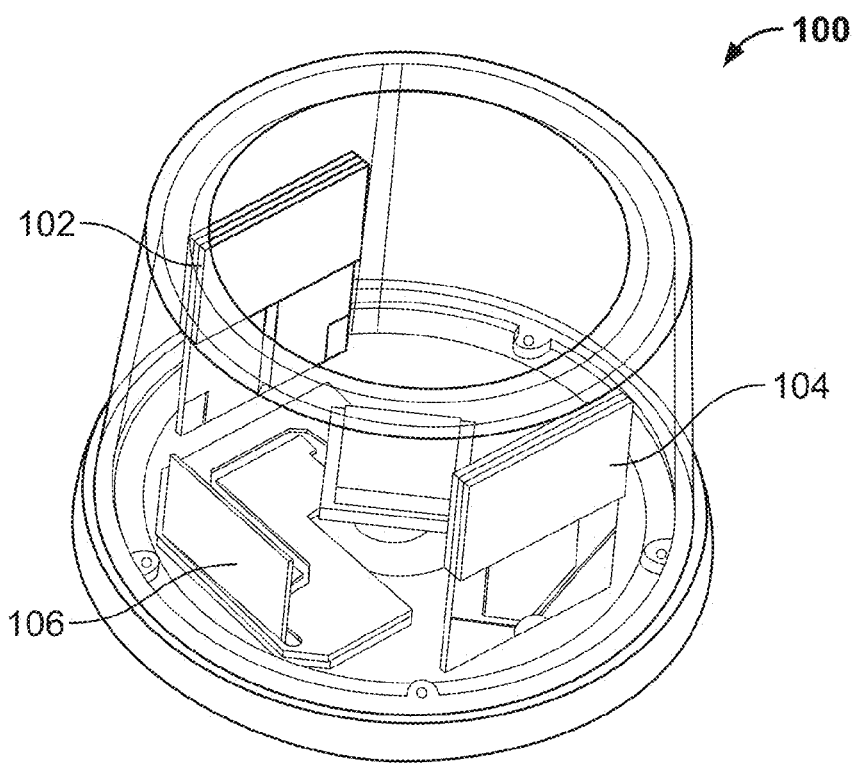
FIG. 1A is a perspective view of a 4-port multiband antenna assembly according to an exemplary embodiment where the cover or radome is shown transparent to illustrate two LTE antennas, a Wi-Fi antenna, and a GPS antenna within the interior enclosure cooperatively defined by the cover or radome and a base assembly or chassis of the antenna assembly.
Figure 1B:
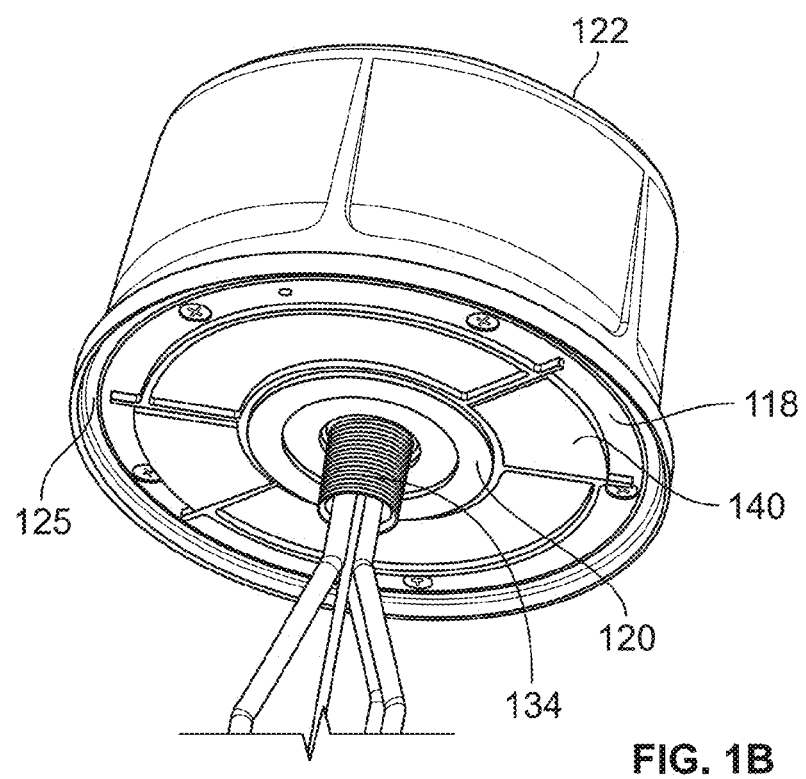
FIG. 1B is a bottom perspective view of the 4-port multiband antenna assembly shown in FIG. 1A.
Figure 1C:
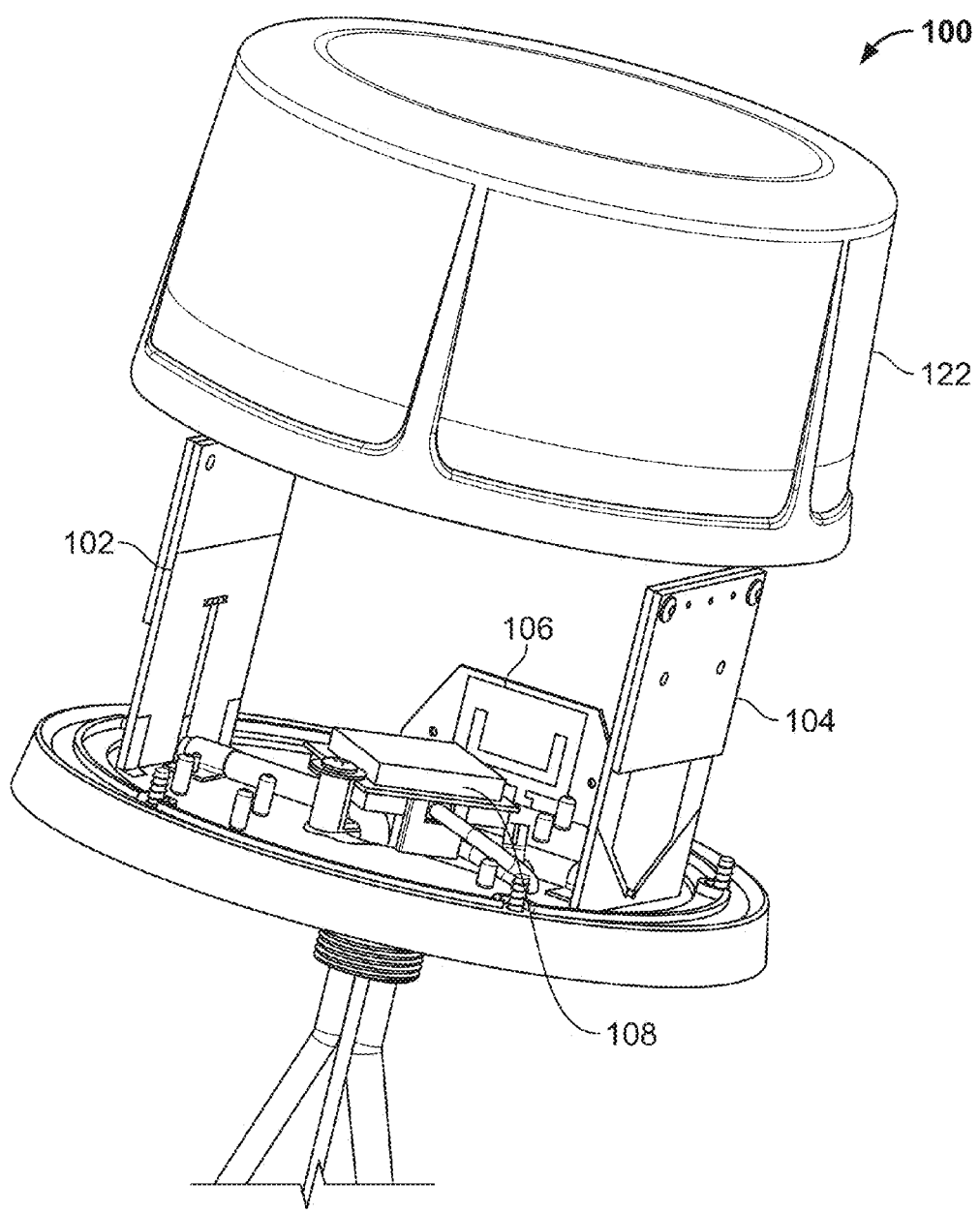
FIG. 1C is a perspective view of the 4-port multiband antenna assembly shown in FIG. 1B where the cover or radome has been opened or removed from the base assembly, and illustrating the two LTE antennas, the Wi-Fi antenna, and the GPS antenna of the antenna assembly.

As shown in FIG. 1B, the antenna assembly 100 may include a pad 140 (e.g., a lossy rubber pad, etc.) used for loading to an extended ground plane 124 (FIG. 7A) to tweak or tune isolation. The size and shape of the lossy pad 140 may depend on the loading effect needed for desired optimizations.

The LTE radiators 102, 104 may be configured to achieve good radiation patterns and large bandwidth. The LTE radiators 102, 104 may or may not be shorted to the ground plane 116. It is preferable to have the LTE radiators 102, 104 shorted to the ground plane 116 to provide the antenna assembly 100 with electrostatic discharge (ESD) protection.

Figure 2D:
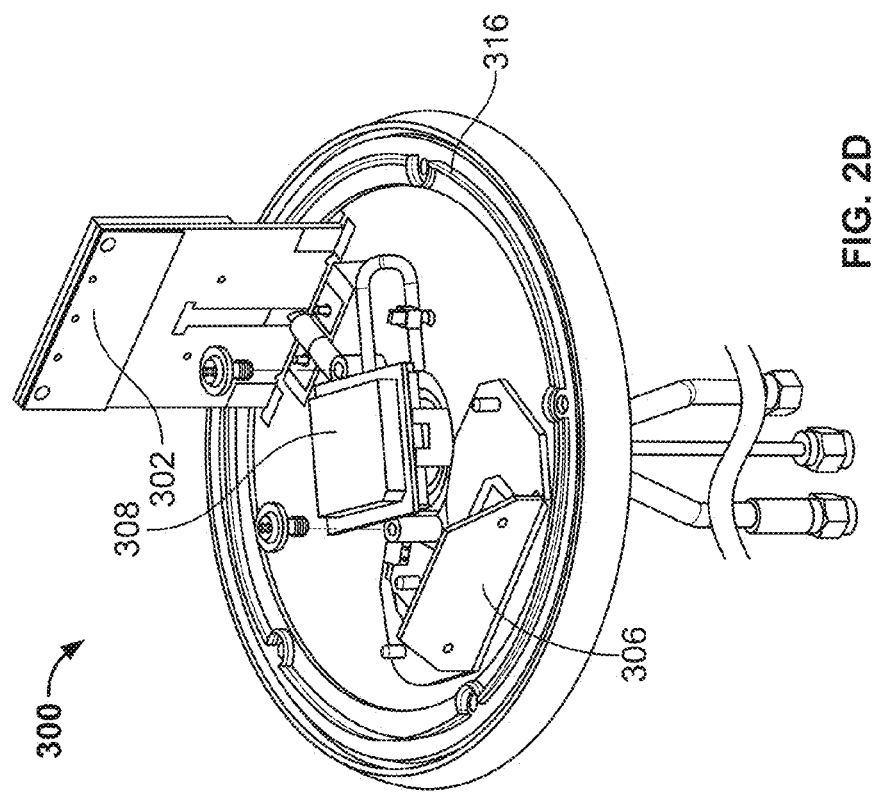
FIG. 2D is a perspective view of a 3-port multiband antenna assembly having one LTE antenna, one Wi-Fi antenna, and one GPS antenna according to yet another exemplary embodiment.
Figure 2C:
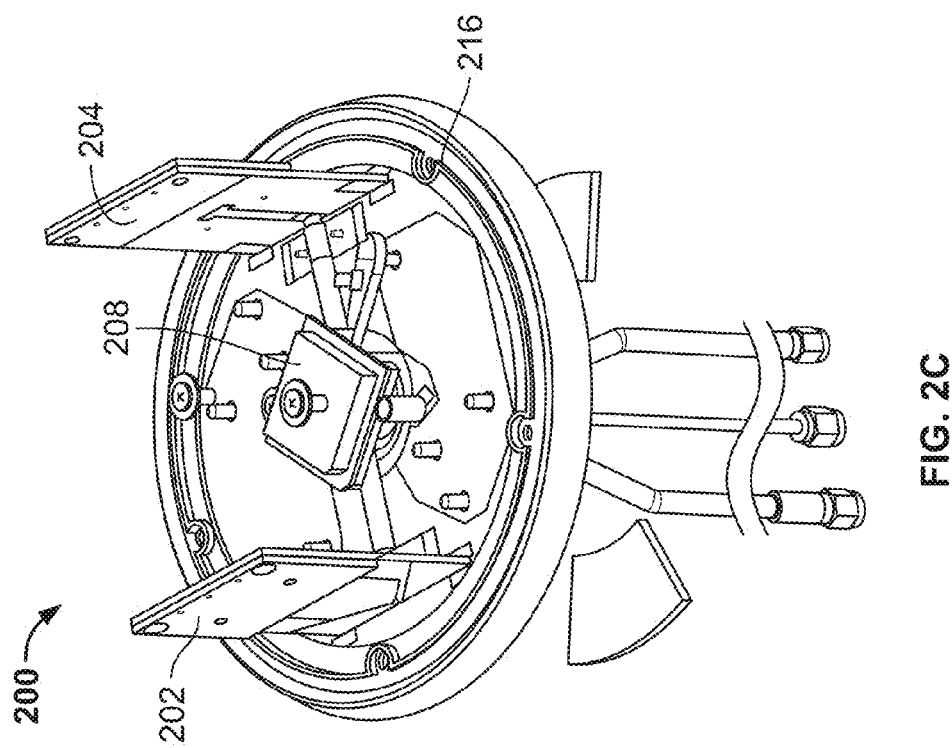
FIG. 2C is a perspective view of a 3-port multiband antenna assembly having two LTE antennas and a GPS antenna according to another exemplary embodiment.

FIG. 2C illustrates an exemplary embodiment of a 3-port multiband antenna assembly 200 embodying one or more aspects of the present disclosure. As shown in FIG. 2C, the antenna assembly 200 includes two LTE antennas 202, 204 with top-loaded PCB elements and a single GPS antenna 208 placed at about the center of a PCB ground plane 216.

FIG. 2D illustrates another exemplary embodiment of a 3-port multiband antenna assembly 300 embodying one or more aspects of the present disclosure. As shown in FIG. 2D, the antenna assembly 300 includes one LTE antenna 302 with a top-loaded PCB element, one Wi-Fi antenna 306 attached to a transmission line of a PCB, and one GPS antenna 308 placed at about the center of a PCB ground plane 316.

FIGS. 3A, 3B, and 3C illustrate an example LTE antenna or radiator 102 that may be used in a multiband antenna assembly, such as antenna assembly 100 (FIG. 1), 200 (FIG. 2C), 300 (FIG. 2D), and/or 400 (FIG. 13). As shown in FIGS. 3A, 3B, and 3C, the LTE antenna 102 comprises top-loaded PCBs 110a and 110b. For example, the PCBs 110a and 110b may be coated with copper on a top side and be in galvanic contact with each other at the top the of the PCBs 110a, 110b. As such, the dielectric substrates and the coated copper may help to load the LTE antenna 102 and enable miniaturization of the antenna assembly 100. Having such top-loaded feature may also be very useful to maintain the LTE antenna 102 in low profile because it can help to minimize (or at least reduce) the overall height of the LTE antenna 102.

FIG. 3B is an exploded perspective view showing the LTE antenna or radiator 102 and the two top-loaded PCBs 110a and 110b. FIG. 3C shows the other side of the exploded perspective view of FIG. 3B. As shown in FIGS. 3A, 3B, and 3C, the LTE radiator 102 includes a feeding point 126 and a shorting point 128. The LTE radiator 102 also includes parasitic elements 130 spaced apart from each other and located on different sides of the dielectric substrate 131 of the LTE radiator 102.

In this example embodiment, the shorting point 128 is located close to the center of the dielectric substrate and is electrically connected to an electrically-conductive trace 129 (FIG. 3C) that extends from the shorting point 128 to the bottom edge of the dielectric substrate 131. The electrically-conductive trace 129 may be soldered to the ground plane 116. The LTE radiator 102 is configured to have an open area 132 to allow shorting in the center of the dielectric substrate 131 thereby minimizing (or at least reducing) impact to the radiation patterns especially at high band. The symmetrical shorting will provide or have better omnidirectionality of the radiation patterns for the high band. Such configuration also changes the impedance of the antenna. Alternatively, the shorting point may be disposed adjacent or side-by-side the bottom portion of the antenna element 102 and may electrically contact the ground plane 116. The shorting point 128 connects the electrically-conductive traces or elements 127 with the electrically-conductive trace or element 129 via a plated through hole (PTH).

As shown in FIGS. 3A and 3B, the feeding point 126 is adjacent or located at about an edge of the dielectric substrate of the LTE radiator 102. Two electrically-conductive traces 127 extend from the feeding point 126 with an angle therebetween. An island 132 (or dielectric area devoid of electrically-conductive material thereon) separates the two electrically-conductive traces 127 on the dielectric substrate 131 of the LTE radiator 102. The two traces 127 converge after the island 132 into an electrically-conductive block or section. The gradual change of impedance from the tapering feeding point 126 enables a broader bandwidth. The island 132 being located close to the feeding point 126 of the dielectric substrate of the LTE radiator 102 may further enable the match for both the bands introduced by the feeding point 126 and the center shorting point 128.

In addition, parasitic elements 130 are located on the back bottom of the LTE radiator 102. The parasitic elements 130 may further provide better match for high band. In certain cases, the parasitic elements 130 can be used to optimize (or at least improve) the radiation patterns of the high band.

FIGS. 3D through 3H illustrate an example LTE antenna or radiator 202 that may be used in a multiband antenna assembly, such as antenna assembly 100 (FIG. 1), 200 (FIG. 2C), 300 (FIG. 2D), and/or 400 (FIG. 13). The LTE radiator 202 (FIG. 3D) includes similar features or elements as the LTE radiator 102 (FIG. 3B) as described. The LTE antenna 202 has parasitic elements 230 with a different size than the parasitic elements 130 of the LTE antenna 202, e.g., to tweak the high band, etc. The LTE radiator 202 may also include a shorting element or point 228 at about the center of the dielectric substrate. The shorting point 228 is electrically connected to an electrically-conductive trace that extends from the shorting point 228 to the bottom edge of the dielectric substrate. A feeding point 226 (FIG. 3F) is located at about a bottom edge portion of the LTE radiator 202.

As shown in FIGS. 3F through 3H, the top-loaded PCB 210 may be mechanically fastened via fasteners 232 (e.g., flat head screws or rivets, etc.) to the LTE radiator 202 to form a lower profile top-loaded LTE monopole radiator. The fasteners 232, for example, may be metal rivets for ease of mounting both top-loaded PCBs together with the LTE radiator therebetween. The LTE radiator 202 may include exposed copper spots 234 configured for contact with the top-loaded PCB 210. Additionally, a cable (e.g., a braid cable, etc.) may be soldered to the shorting trace 236 of the radiator 202. Alternatively, the top-loaded PCBs of the radiators 102, 202 can be one integrated piece instead of multiple pieces.

Immediately below is Table 1 with gain and efficient performance data measured for one of the LTE antenna elements 102, 104 of the antenna assembly 100. This data is provided only for purposes of illustration and not for purposes of limitation as other exemplary embodiments may be configured differently.

TABLE 1

(LTE Antenna of a 4-port multi-radiator multi-band antenna assembly)

| Frequency (MHz) | 3D | |
|---|---|---|
| | Efficiency | Max Gain |
| 698 | 52% | 2.38 |
| 704 | 53% | 2.77 |
| 798 | 81% | 3.30 |
| 807 | 81% | 3.16 |
| 824 | 79% | 2.92 |
| 894 | 77% | 3.19 |
| 960 | 73% | 2.44 |
| 1710 | 71% | 3.47 |
| 1880 | 72% | 4.19 |
| 1960 | 71% | 4.45 |
| 2170 | 71% | 4.25 |
| 2400 | 63% | 5.63 |
| 2500 | 64% | 5.80 |
| 2700 | 63% | 4.64 |

FIGS. 4 through 5H provide results measured for the LTE radiators 102, 104 of a prototype of the 4-port multiband antenna assembly 100. These analysis results are provided only for purposes of illustration and not for purposes of limitation, as other exemplary embodiments may be configured differently.

More specifically, FIG. 4 includes exemplary line graphs of voltage standing wave ratio (VSWR) S11 and S22 and isolation S21 in decibels (dB) versus frequency measured for the LTE antennas 102, 104 of the 4-port multiband antenna assembly 100. FIGS. 5A through 5H illustrate radiation patterns (azimuth plane, Phi 0° plane, and Phi 90° plane) measured for a prototype of the 4-port multiband antenna assembly 100 at frequencies of 698 megahertz (MHz), 807 MHz, 824 MHz, 960 MHz, 1710 MHz, 2170 MHz, 2400 MHz, and 2700 MHz, respectively. Generally, FIGS. 5A through 5H show that the 4-port multiband antenna assembly 100 has good omnidirectional radiation patterns at both low band and high band.

FIG. 6 illustrates an exemplary double sided printed circuit board 116 (PCB), a base 118 (e.g., plastic base plate, etc.), and a pad 120 (e.g., rubber, foam, EPDM (ethylene propylene diene monomer), etc.) that may be used as a base assembly in a multiband antenna assembly, such as antenna assembly 100 (FIG. 1), 200 (FIG. 2C), 300 (FIG. 2D), and/or 400 (FIG. 13). Foam insulation (e.g., ring-shaped gasket, etc.) may be disposed between the PCB 116 and base 118 for water resistance. In an example embodiment, the double sided PCB 116 has a thickness of about 1.6 mm, the base 118 comprises a plastic base plate having a thickness of about 5 mm, and the pad 120 comprises a rubber pad having a thickness of about 2.5 mm. The dimensions provided in this paragraph and elsewhere in the application are examples only and do not limit the scope of the present disclosure. Other exemplary embodiments may be configured differently, such as smaller or larger in size.

Continuing with this example, FIG. 7A shows the double sided PCB 116 and an antenna mounting member 134 (e.g., electrically conductive threaded stub or portion, etc.) protruding outwardly close to the center of the base assembly. The mounting member 134 allows the antenna assembly 100 to be mounted to a mounting or support surface (e.g., planar surface, etc.) via one or more locking nuts that are threaded onto the mounting member 134. The threaded stub does not have any galvanic contact to the PCB ground plane of the antenna in this example. If the antenna assembly 100 is mounted to an electrically-conductive (e.g., metal, etc.) external ground plane, the external ground plane is grounded and electrically connected only to the threaded mounting member 134 of the antenna assembly 100. Though this grounding of the mounting member 134 with the external ground plane may negatively impact omnidirectionality of the antenna assembly 100, it may also allow the antenna assembly 100 to have broader bandwidth. Depending on the particular application and operating requirements, the antenna assembly 100 may thus be used either on an external electrically-conductive (ground plane) mounting surface or a dielectric (non-ground plane) mounting surface. The mounting member 134 may further include coaxial cables 136 routed through the center of the ground plane PCB 116 and through the metal mounting member 134.

Additionally, the bottom of the ground plane PCB 116 may further include plated through hole (PTH) vias to connect to the extended ground behind the ground plane PCB 116. The extended ground plane may be configured to tune the isolation.

FIG. 7B shows multiple layers of an example base assembly that may be used in a multiband antenna assembly, such as antenna assembly 100 (FIG. 1), 200 (FIG. 2C), 300 (FIG. 2D), and/or 400 (FIG. 13). As shown in FIG. 7B, the base assembly includes a PCB having a top copper layer for a ground plane and a bottom layer with extended ground stud. Optionally, a relatively thin double sided foam pad 318 (e.g., rubber, foam, etc.) may be placed between the PCB 316 and the base plate 320 (e.g., plastic base plate, etc.) to reduce the risk of water ingress. Adding the thin double sided foam pad 318 may necessitate a trade off with the isolation characteristic between the two LTE radiators. The base plate 320 is configured to support both the PCB base 316 and the pad 340, while also functioning as a bottom enclosure to the whole antenna assembly. The pad 340 may be used for loading to an extended ground plane (e.g., 324 shown in FIG. 7C, etc.) to tweak or tune isolation. The size and shape of the pad 340 may depend on the loading effect needed for desired optimizations. The dielectric load on the extended ground may be important for isolation performance. The height or thickness of the PCB 316 and the dielectric constant may preferably be optimized for a good isolation performance. Lossy material may be preferred for the pad 340, which may help lower the current interaction between the antenna ground plane and a mounting metal surface.

FIG. 7C shows a bottom layer of the PCB 316 having extended ground planes 324 (e.g., a ground PCB, etc.). The extended ground plane 324 is generally located at the bottom of the PCB 316 and connected to the top layer of the PCB 316 via plated through holes (PTHs) 326. The extended ground plane 324 may be configured to tweak or tune the isolation. The size of the extended ground planes 324 may generally be adjusted to have the isolation (dip) tweaked or tuned at the low band operating frequency range. The area of the extended ground plane 324 may be loaded with a selective lossy pad (e.g., a high density rubber pad, an EPDM pad, etc.) to increase the loading between the LTE radiators 302 with the ground plane if the base dielectric loading is not sufficient to move the isolation dip to the operating frequency range. As shown in FIG. 7C, a stud 334 (e.g., a metal threaded stud, etc.) is disposed about the coaxial cables 336. But the stud 334 may not be electrically connected to the PCB ground or electrically shorted with the LTE radiators.

Isolation between radiators may be important to help ensure the antenna performs well in a MIMO antenna system. But it is a challenge to have the antennas below 15 decibels (dB) when mounted on a large ground plane (e.g., 300 mm diameter or more, etc.). A few features of the antenna are important to ensure sufficient performance of the isolation. FIGS. 6 and 7 illustrate the construction of multi-layer substrates for the antenna structure. The top layer (e.g., a PCB plate, etc.) may function as the ground plane while the bottom layer has an extended ground to optimize (or at least improve) the isolation between the LTE radiators.

In some exemplary embodiments, a metal threaded stud may be inserted and molded with the plastic base plate. In some other exemplary embodiments, the metal threaded stud may be assembled together with the plastic base plate using fastener(s). Multi-layer substrates can enable interactions between the antenna ground plane and the surface for mounting the antenna ground plane, which may impact the isolation level between LTE antennas. The metal threaded stud is preferably not connected to a PCB ground, thus is not shorted with the LTE or Wi-Fi radiators. The size of the extended ground plane can generally be adjusted to tweak or tune the isolation at the low band operating frequency range, and the dielectric loading on the extended ground plane may also affect the isolation performance. Thus, the height of the base plate and the dielectric parameters may be configured to achieve a desired operating frequency range. The area of the extended ground plane can be loaded with lossy high density rubber (EPDM) pad to increase the loading between the LTE elements with the ground plane if the base plate dielectric loading is not sufficient to move the isolation dip to the operating frequency range.

FIGS. 8A, 8B, and 8C show an example Wi-Fi antenna or radiator 106 that may be used in a multiband antenna assembly, such as antenna assembly 100 (FIG. 1), 200 (FIG. 2C), 300 (FIG. 2D), and/or 400 (FIG. 13). As shown in FIG. 8A, the Wi-Fi antenna 106 is generally a monopole radiator including a U-shape slot 138 and two parasitic ground flaps configured to have good omnidirectional radiation pattern. The Wi-Fi radiator 106 is configured to electrically couple with the dielectric substrate 114. The dielectric substrate 114 may be a PCB having at least one transmission line 142 and a stub matching 144. The stub matching 144 has a plurality of stubs for antenna impedance matching circuits. The gain of the Wi-Fi radiator 106 may be controlled to have a gain below 6 decibels isotropic (dBi) in order to meet FCC regulations. The radiation pattern of the Wi-Fi radiator 106 may also be changed by the design environment of LTE antennas 102, 104 and GPS antenna 108 of the antenna assembly 100 and ripples may be created to lead a gain hike. Additionally, the shorting of the GPS radiator 108 and its orientation may affect the radiation pattern of the Wi-Fi radiator 106. Accordingly, the GPS radiator 108 may be carefully placed, e.g., diagonally oriented to the Wi-Fi radiator 106, etc. Further, in the situation when the GPS radiator 108 is shorted with two shorting posts, the shorting posts are preferably configured not to be a goal post to the Wi-Fi antenna because goal posts linked parallel to a Wi-Fi radiator may increase the gain for the Wi-Fi antenna and thus may act like a reflector for the radiator. In addition, when the antenna assembly 100 is mounted on an external surface of a vehicle body wall, the large ground plane of the vehicle may tilt the radiation pattern upward and may increase the 3-D gain dramatically. Conduction losses due to the transmission line 142 can help reducing the gain of the Wi-Fi radiator 106 especially at the 5 GHz band. A longer transmission line 142 (e.g., nonlinear, not straight, curved, winding, and/or serpentine transmission line, etc.) can reduce more gain. As the losses increase with frequency, the transmission lines 142 will attenuate more at higher frequencies as compared to low resonance. By way of example, the transmission line 142 may have a length of about 70 millimeters (mm).

FIGS. 9 through 10F provide results measured for the LTE radiators 102, 104 and the Wi-Fi radiator 106 of the prototype of the 4-port multiband antenna assembly 100. These analysis results are provided only for purposes of illustration and not for purposes of limitation.

More specifically, FIG. 9 includes exemplary line graphs of voltage standing wave ratio (VSWR) S11 and S22 and isolation S21 in decibels (dB) versus frequency measured for the Wi-Fi and LTE antennas of the 4-port multiband antenna assembly 100. FIGS. 10A through 10F illustrate radiation patterns (azimuth plane, Phi 0° plane, and Phi 90° plane) measured for a prototype of the 4-port multiband antenna assembly 100 at frequencies of 2400 MHz, 2500 MHz, 4900 MHz, 5350 MHz, 5750 MHz, and 5875 MHz, respectively.

Generally, FIGS. 10A through 10F show that the antenna assembly 100 has good omnidirectional radiation patterns at high band for LTE radiators 102, 104. The antenna assembly 100 generally has lower profile compared to a single PCB antenna. The top-loaded LTE monopole radiators can be maintained to be thin compared to disc type top loading configuration, which may take more space. The antenna assembly 100 can achieve at least 15 decibels (dB) isolation for the LTE band with antenna diameter around 132 mm mounted on 30 cm ground plane tested with a 17 feet long cable. The LTE radiators 102, 104 shorted to ground have large bandwidth covering the whole LTE band. The gain of the Wi-Fi radiator 106 is configured to have its gain reduced to meet FCC regulation. Accordingly, the antenna assembly 100 includes a lower profile and size with comparable performance. Alternatively, the 4-port antenna assembly 100 may be enabled to selectively remove one of the antennas (e.g., the LTE radiator, Wi-Fi radiator, or GPS) as desired for a customized product.

FIGS. 11 through 15 illustrate an exemplary embodiment of a 5-port multiband antenna assembly 400 embodying one or more aspects of the present disclosure. As shown, the antenna assembly 400 includes two LTE antennas or radiators 402, 404, two Wi-Fi antennas or radiators 405, 406, and one GPS antenna or radiator 408 (e.g., patch antenna, etc.).

The configurations for the LTE radiators 402, 404, the Wi-Fi radiators 405, 406, and the GPS patch element 408 may be similar to the corresponding LTE radiators 102, 104, Wi-Fi radiator 106, and GPS patch element 108 of the 4-port antenna assembly 100. For example, as shown in FIG. 17, each LTE radiator 402, 404 may include dielectric substrates 410, 412 (e.g., printed circuit boards (PCBs) loaded with extended grounds, etc.). As shown in FIG. 18, the Wi-Fi radiators 405, 406 may include dielectric substrates 414, 415 respectively (e.g., PCB with at least one transmission line 442, etc.). By way of example, the transmission line 442 may have a length of about 70 mm. The antenna assembly 400 is configured to be installed on a PCB 416 defining a ground plane (e.g., a PCB with plated through holes, a double sided PCB ground plane, etc.).

As shown in FIG. 16, an extended ground plane 424 is generally located at the bottom of the PCB 416. The extended ground plane 424 may be connected to the top electrically-conductive ground plane layer of the PCB 416 via plated through holes (PTHs). The extended ground plane 424 may be configured to tweak or tune the isolation. The size of the extended ground plane 424 may generally be adjusted to have the isolation (dip) tweaked or tuned at the low band operating frequency range.

The PCBs 410, 412 (FIG. 17) may be coated with copper to enable slight miniaturization or size reduction of the antenna as the dielectric and copper may help to load the antenna. This subsequently helps the antenna slightly to have more omnidirectional radiation pattern for high band edge than antennas with only copper radiators. Fatter radiators (e.g., only copper radiators) normally lead to more oval radiation pattern and higher ripple at high band edge of the antenna.

In this example, the PCBs 410, 412 are one-sided with symmetric electrically-conductive traces on each dielectric substrate of the PCBs 410, 412. The one-sided symmetry side shorted monopole LTE elements 402, 404 may have a height of about 70 millimeters. The electrically-conductive traces on the PCBs may include a symmetric step shape (as shown on the LTE element 404 in FIG. 17) configured for gradually changing impedance to broaden bandwidth. Additionally, plated thru holes may be used to electrically connect the electrically-conductive traces with the shorted parasitic loading at the back of the PCB. Further, extended ground elements 444 may be included for gradual change of impedance. Soldering pads 446 allow the extended ground elements 444 to be soldered to the ground plane. A shorting path 448 may provide a DC short to the antenna, while allowing the antenna to match broadband operations. Extended ground loading element 444 may also broaden the bandwidth of the antenna.

The LTE radiators 402, 404 may also include two parasitic elements to provide better match for high band. Shorted elements may be located at the edge of the LTE radiator via PTHs to the front PCB.

The 5-port antenna assembly 400 may include a ground plane (e.g., a PCB with plated through holes, a double sided PCB ground plane, etc.) similar to the ground plane 116 shown in FIG. 6. The ground plane may be mounted with a base (e.g., dielectric base, plastic base, etc.). Additionally, a pad (e.g., rubber, foam, etc.) may be placed between the base and a mounting surface (not shown) on which the antenna assembly 400 is to be mounted. The pad may be attached to base via, e.g., a friction or interference fit, etc. The pad may help prevent water ingress into the antenna assembly 400.

In an example embodiment, the base assembly of the antenna assembly 400 may include double sided PCB 116 having a thickness of about 1.6 mm, a base plate having a thickness of about 5 mm, and a rubber pad having a thickness of about 2.5 mm. The base assembly may be configured to improve the isolation at LTE band(s). The dimensions provided in this paragraph and elsewhere in the application are examples only and do not limit the scope of the present disclosure. Other exemplary embodiments may be configured differently, such as smaller or larger in size.

As shown in FIG. 18, each Wi-Fi antennas or radiator 405, 406 is a monopole radiator or antenna element on a PCB. Relatively long transmission lines 442 are used in order to reduce gain around a particular Wi-Fi frequency band or range (e.g., the 5 GHz band, etc.). Wi-Fi elements 405, 406 may have similar design requirements and configurations as the Wi-Fi antenna or radiator 106 of the antenna assembly 100 (FIG. 8A).

As shown in FIG. 19, the Wi-Fi radiator 406 is generally a monopole radiator with a PCB having a U-shaped slot 438. The U-slot 438 helps to enable a change of the frequency ratio of dual band to cover, for example, a first frequency range from 2.3 GHz to 2.7 GHz and a second frequency range from 4.9 GHz to 5.9 GHz. Additionally, the Wi-Fi radiator 406 includes suspended parasitic elements 440 that may help with omnidirectionality (e.g., for the second frequency range from 4.9 GHz to 5.9 GHz, etc.). The parasitic elements 440 may also help reduce excessive gain, which may otherwise be too high. The parasitic elements 440 may be in galvanic contact with soldering pads 450 via soldering joints.

The transmission line 442 may be used for feeding the Wi-Fi antenna 406. The transmission line 442 may also help meet the max gain restriction (e.g., around the 5 GHz band, etc.) due to regulation. Cable feeding may be provided by a cable center core 452 soldered to the transmission line 442 and a cable braid 454 soldered to a grounding pad, which is shorted to ground via plated thru hole (PTH).

As shown in FIG. 15, the GPS antenna or radiator 408 is generally placed at the center of the antenna assembly 400. The GPS antenna 408 is oriented diagonally to avoid being a good reflector for the Wi-Fi antennas 405, 406. The GPS radiator 408 is configured to avoid working like a goal post having the post shorted to the ground so that the GPS radiator 408 does not increase the gain of the Wi-Fi radiators 405, 406. Generally, a height of the antenna assembly 400 may preferably be optimized or configured to minimize (or at least reduce) depolarization because the existence of different radiators may affect the GPS radiation pattern where the cross polarization to Right Hand Circularly Polarized (RHCP) increases.

Immediately below is Table 2, which includes various parameters and reveals the achievable performance of the antenna assembly 400. This data is provided for purpose of illustration only, as other exemplary embodiments may be configured differently.

TABLE 2

| Parameter | Plastic Base Plate |
|---|---|
| Antenna Diameter × Height | 150 × 86.4 mm |
| Frequency (MHz) | 698-960; 1710-2700 (2 ports) |
| | 2400-2500; 4900-5875 (2 ports) |
| | Active GPS L1 Band (1 port) |
| VSWR | 2:1 @698-690; 1710-2700 MHz |
| | 2:1 @ 2400-2500; 4900-5875 MHz |
| | (measure on 1 ft ground plane with 17 ft cable) |
| Typical Gain | 3.4 dBi (Max) @ 698-960 MHz |
| | 5.0 dBi (Max) @ 1710-2700 MHz |
| | 5.4 dBi (Max) @ 2400-2500 MHz |
| | 4.7 dBi (Max) @ 4900-5875 MHz |

TABLE 2-continued

| Parameter | Plastic Base Plate |
|---|---|
| Peak Gain | 4.4 dBi (Max) @ 698-960 MHz |
| | 6.0 dBi (Max) @ 1710-2700 MHz |
| | 6.5 dBi (Max) @ 2400-2500 MHz |
| | 5.8 dBi (Max) @ 4900-5875 MHz |
| Efficiency | 76% @ 698-960 MHz |
| | 74% @ 1710-2700 MHz |
| | 62% @ 2400-2500 MHz |
| | 43% @ 4900-5875 MHz |
| Isolation | >15 dB @ 698-960 MHz |
| | >25 dB @ 1710-2700 MHz |
| | >20 dB @ 2400-2500 MHz |
| | >30 dB @ 4900-5875 MHz |

FIGS. 20 through 23F provide results measured for a prototype of the 5-port multiband antenna assembly 400. These analysis results are provided only for purposes of illustration and not for purposes of limitation, as other exemplary embodiments may be configured differently.

More specifically, FIG. 20 includes exemplary line graphs of voltage standing wave ratio (VSWR) S11 and S22 and isolation S21 in decibels (dB) versus frequency measured for the LTE antennas 402, 404 of the 5-port multiband antenna assembly 400 with a 17 feet long cable.

FIGS. 21A through 21H illustrate radiation patterns (azimuth plane, Phi 0° plane, and Phi 90° plane) measured for the 5-port multiband antenna assembly 400 at frequencies of 698 MHz, 824 MHz, 850 MHz, 960 MHz, 1710 MHz, 1990 MHz, 2170 MHz, and 2700 MHz, respectively.

FIG. 22 includes exemplary line graphs of voltage standing wave ratio (VSWR) S11 and S22 and isolation S21 in decibels (dB) versus frequency measured for the Wi-Fi antennas 405, 406 of the 5-port multiband antenna assembly 400 with a 17 feet long cable.

FIGS. 23A through 23F illustrate radiation patterns (azimuth plane, Phi 0° plane, and Phi 90° plane) measured for the 5-port multiband antenna assembly 400 at frequencies of 2400 MHz, 2500 MHz, 4900 MHz, 5200 MHz, 5600 MHz, and 5875 MHz, respectively.

Immediately below are Tables 3 and 4 with gain and efficiency performance data measured for the LTE antenna elements 402, 404 of the antenna assembly 400. This data is provided for purpose of illustration only, as other exemplary embodiments may be configured differently.

TABLE 3

LTE Antenna of 5-Port Multiband Antenna Assembly

| Frequency (MHz) | 3D | |
|---|---|---|
| | Efficiency | Max Gain |
| 698 | 78% | 2.51 |
| 725 | 75% | 2.05 |
| 746 | 67% | 2.31 |
| 806 | 81% | 3.80 |
| 824 | 85% | 3.38 |
| 850 | 85% | 3.66 |
| 880 | 80% | 3.33 |
| 894 | 76% | 3.79 |
| 960 | 74% | 4.38 |
| 1710 | 68% | 4.91 |
| 1730 | 67% | 5.23 |
| 1755 | 65% | 5.19 |
| 1850 | 76% | 4.94 |
| 1880 | 75% | 4.53 |
| 1910 | 77% | 4.33 |
| 1930 | 78% | 4.90 |
| 1990 | 78% | 5.66 |

TABLE 3-continued

LTE Antenna of 5-Port Multiband Antenna Assembly

| Frequency (MHz) | 3D Efficiency | Max Gain |
|---|---|---|
| 2110 | 78% | 5.29 |
| 2130 | 82% | 5.21 |
| 2170 | 81% | 5.36 |
| 2310 | 75% | 5.07 |
| 2350 | 75% | 5.18 |
| 2412 | 70% | 4.60 |
| 2507 | 71% | 4.57 |
| 2600 | 68% | 5.23 |
| 2700 | 71% | 5.63 |

TABLE 4

LTE Antenna Port 2 of 5-Port Multiband Antenna Assembly

| Frequency (MHz) | 3D Efficiency | Max Gain |
|---|---|---|
| 698 | 66% | 3.05 |
| 725 | 62% | 1.92 |
| 746 | 67% | 2.57 |
| 806 | 83% | 4.43 |
| 824 | 77% | 4.37 |
| 850 | 82% | 3.76 |
| 880 | 78% | 3.84 |
| 894 | 72% | 3.84 |
| 960 | 72% | 3.49 |
| 1710 | 67% | 4.70 |
| 1730 | 67% | 4.70 |
| 1755 | 66% | 4.68 |
| 1850 | 72% | 4.27 |
| 1880 | 71% | 4.37 |
| 1910 | 74% | 4.13 |
| 1930 | 75% | 4.58 |
| 1990 | 77% | 5.99 |
| 2110 | 77% | 5.21 |
| 2130 | 82% | 5.17 |
| 2170 | 81% | 5.45 |
| 2310 | 74% | 5.29 |
| 2350 | 75% | 4.72 |
| 2412 | 79% | 5.85 |
| 2507 | 74% | 5.27 |
| 2600 | 70% | 5.22 |
| 2700 | 72% | 5.57 |

Immediately below are Tables 5 and 6 with efficiency and gain performance data measured for the Wi-Fi antenna elements 405, 406 of the antenna assembly 400. This data is provided for purpose of illustration only, as other exemplary embodiments may be configured differently.

TABLE 5

Wi-Fi Antenna Port 1 of 5-Port Multiband Antenna Assembly

| Frequency (MHz) | 3D Efficiency | Max Gain |
|---|---|---|
| 2400 | 62% | 4.24 |
| 2420 | 65% | 5.05 |
| 2440 | 67% | 5.62 |
| 2460 | 67% | 5.84 |
| 2480 | 66% | 6.08 |
| 2500 | 64% | 6.53 |
| 4900 | 45% | 4.34 |
| 5000 | 47% | 5.54 |
| 5100 | 45% | 5.63 |
| 5200 | 48% | 5.76 |

TABLE 5-continued

Wi-Fi Antenna Port 1 of 5-Port Multiband Antenna Assembly

| Frequency (MHz) | 3D Efficiency | Max Gain |
|---|---|---|
| 5300 | 48% | 5.25 |
| 5400 | 44% | 4.55 |
| 5500 | 44% | 4.79 |
| 5600 | 41% | 4.42 |
| 5700 | 43% | 4.57 |
| 5800 | 43% | 3.86 |
| 5875 | 41% | 4.64 |

TABLE 6

Wi-Fi Antenna port 2 of a 5-port multiband antenna assembly

| Frequency (MHz) | 3D Efficiency | Max Gain |
|---|---|---|
| 2400 | 59% | 5.24 |
| 2420 | 60% | 5.14 |
| 2440 | 60% | 4.76 |
| 2460 | 58% | 4.79 |
| 2480 | 57% | 4.80 |
| 2500 | 56% | 5.62 |
| 4900 | 45% | 4.33 |
| 5000 | 44% | 4.36 |
| 5100 | 42% | 4.34 |
| 5200 | 44% | 4.80 |
| 5300 | 44% | 5.21 |
| 5400 | 43% | 4.73 |
| 5500 | 43% | 4.49 |
| 5600 | 42% | 4.06 |
| 5700 | 41% | 3.75 |
| 5800 | 40% | 4.78 |
| 5875 | 36% | 4.37 |

Immediately below is Table 7, which includes isolation summary data between LTE antenna 402 and Wi-Fi antenna 405 when measured with a 17 feet long cable for the antenna assembly 400. This data is provided for purpose of illustration only, as other exemplary embodiments may be configured differently.

TABLE 7

Wi-Fi Antenna Port 1 of 5-port Multiband Antenna Assembly

| Isolation (S2,1) | 698-960 MHz | 1710-2700 MHz | 4900-5875 MHz |
|---|---|---|---|
| LTE 1 - WIFI1 | >25 dB | >15 dB | >35 dB |
| LTE 1 - WIFI2 | >25 dB | >25 dB | >30 dB |
| LTE 2 - WIFI1 | >25 dB | >20 dB | >25 dB |
| LTE 2 - WIFI2 | >25 dB | >15 dB | >40 dB |

FIGS. 24A through 24E illustrate example configurations of multiport multiband antenna assemblies according to exemplary embodiments. As shown, a multiport multiband antenna assembly may include multiple ports (e.g., three, four, or five ports, etc.) with different combinations of cellular (e.g., Long Term Evolution (LTE), etc.), internet (e.g., Wi-Fi, etc.), and satellite navigation (e.g., Global Positioning System (GPS), etc.) antennas or radiators. The LTE, Wi-Fi, and GPS radiators or antennas may be located and/or part of a single antenna system, e.g., positioned on and/or supported by the same or common base assembly and within the same interior enclosure cooperatively defined by the base assembly and radome of a single roof-mount antenna system, etc.

FIG. 25 illustrates an exemplary embodiment of an antenna assembly 500 embodying one or more aspects of the present disclosure. As shown in FIG. 26, the antenna assembly 500 includes three LTE antennas 502, 503, 504, a Wi-Fi antenna 506, and an active GPS antenna 508 placed at about the center of a PCB ground plane 516.

FIGS. 26, 27A, and 27B illustrate an exemplary embodiment of an antenna assembly 600 embodying one or more aspects of the present disclosure. As shown in FIG. 26, the antenna assembly 600 includes three LTE antennas 602, 603, 604, a Wi-Fi antenna 606, and an active GPS antenna 608 placed at about the center of a PCB ground plane 616. As shown in FIGS. 27A and 27B, the LTE antenna shorting elements 629 include a bottom layer trace mirrored so as to improve isolation with the Wi-Fi antenna 606.

Due to the relatively small ground plane size, the Wi-Fi antenna 606 is placed relatively close in between two LTE radiators 602, 604 as shown in FIGS. 26 and 27A. The shorting orientation of the first LTE radiator 602 is the mirrored trace of the third LTE radiator 604 (FIG. 27A) so as to improve isolation with the Wi-Fi antenna 606.

FIGS. 28 through 32 illustrates an exemplary embodiment of an antenna assembly 700 embodying one or more aspects of the present disclosure. As shown in FIG. 28, the antenna assembly 700 includes three LTE antennas 702, 703, 704, a Wi-Fi antenna 706, and an active GPS antenna 708 placed at about the center of a PCB ground plane 716.

As shown in FIG. 29, a longer/non-linear transmission line 742 may be used for the Wi-Fi antenna 706, which may help to reduce the gain at 4900-5900 MHz. The Wi-Fi antenna 706 may be configured as a monopole antenna. The gain of the Wi-Fi antenna 706 is controlled such that the gain may preferably be less than 6 dBi. For the high band, the large ground plane of the mounting surface (e.g., a vehicle roof, etc.) may tilt the radiation pattern upward and make the three-dimensional gain increase dramatically. Thus, this exemplary embodiment includes a longer lossy transmission line 742 as shown in FIG. 29, which may be used to reduce the gain. See also FIG. 34 showing efficiency and max gain measured for the Wi-Fi antenna 706 on a ground plane having a 30 centimeter diameter and with a 1 foot long cable.

As shown in FIG. 30, the shorting element 729 may be at about the center of the corresponding LTE antenna 702, 703, 704. Locating the shorting element 729 at about the center of the LTE antenna 702, 703, or 704 does not affect the isolation between the LTE antennas 702, 703, 704 and Wi-Fi antenna 706.

FIG. 31 shows extended ground planes 724 (e.g., a ground PCB, etc.). The extended ground planes 724 are generally located along and/or at the bottom of the PCB 716 and connected to the top layer of the PCB ground plane 716 via plated-through holes (PTHs). The extended ground plane 724 may be configured to tweak or tune the VSWR/isolation.

This exemplary embodiment includes three LTE radiators 702, 703, 704 and the three electrically-conductive ground plane extensions 724. Each electrically-conductive ground plane extension 724 is near the edge of the PCB ground plane 716 underneath a corresponding one of the LTE radiators 702, 703, 704, which helps to provide for better isolation between the LTE radiators 702, 703 704. In this exemplary embodiment, the electrically-conductive ground plane extensions 724 comprise electrically-conductive patches that are electrically-connected to the PCB ground plane 716 via plated thru holes. The extensions 724 preferably do not extend outside the perimeter or diameter of the PCB ground plane 716. The number of plated thru holes on the LTE extended ground planes 724 change the electrically extension of the ground plane length of the LTE radiators 702, 703, 704.

FIG. 32 illustrates a pad 720 (e.g., rubber, foam, etc.) that may be placed between the base of the antenna assembly 700 and a mounting surface (not shown) on which the antenna assembly 700 is to be mounted. The pad 720 may comprise a high density rubber (EPDM) pad configured to increase the loading between the LTE elements 702, 703, 704 with the ground plane 716 and move the isolation to the operating frequency range.

In alternative embodiments, the antenna assembly 700 may be configured differently. For example, another exemplary embodiment may include three LTE antennas, two Wi-Fi antennas, and a GPS antenna. Or, for example, another exemplary embodiment may include three LTE antennas, three Wi-Fi antennas, and a GPS antenna. Depending on the size of the ground plane, another exemplary embodiment may include four LTE antennas, four Wi-Fi antenna, and a GPS antenna.

FIGS. 34 through 39 provide results measured for a prototype of the 5-port multiband antenna assembly 700 shown in FIG. 28. These analysis results are provided only for purposes of illustration and not for purposes of limitation, as other exemplary embodiments may be configured differently.

More specifically, FIG. 34 includes an exemplary bar graph of efficiency and max gain in decibels (dB) for the Wi-Fi antenna of the antenna assembly 700.

FIG. 35 includes exemplary line graphs of voltage standing wave ratio (VSWR) S11 and S22 and isolation S21 in decibels (dB) versus frequency for the first LTE antenna (LT1) and the Wi-Fi Antenna of the antenna assembly 700 on a 30 centimeter ground plane and with a 17 foot cable.

FIG. 36 includes exemplary line graphs of voltage standing wave ratio (VSWR) S11 and S22 and isolation S21 in decibels (dB) versus frequency for the third LTE antenna (LT3) and the Wi-Fi Antenna of the antenna assembly 700 on a 30 centimeter ground plane and with a 17 foot cable.

FIGS. 37 through 39 illustrate radiation patterns (azimuth plane, Phi 0° plane, and Phi 90° plane) measured for ports 1, 2, and 3 of the antenna assembly 700 at frequencies of 698 MHz, 960 MHz, 1710 MHz, 2170 MHz, 2305 MHz, and 2700 MHz, respectively.

In exemplary embodiments, an antenna assemblies are disclosed that may achieve at least 14 dB isolation between LTE radiators at low band with antenna diameter around 132 mm mounted on 30 cm ground plane tested with 17 ft cable, and/or that have improved the isolation between LTE and WIFI radiators, and/or that have reduced gain for WIFI antenna to meet the FCC regulation.

Antenna assemblies having configurations disclosed herein may provide a lower profile with top loaded PCBs in a vertical configuration that helps avoid high coupling between the LTE antennas or radiators. This also subsequently may help lower isolation between LTE antennas or radiators. An antenna assembly disclosed herein may include a shorting point located generally at a center of the PCB, which generally has good matching but may suffer from reduced omnidirectionality. In exemplary embodiments, there is an opening (e.g., defined by an electrically-conductive trace of, etc.) in a monopole antenna that allows for good matching of the center shorting and a good radiation pattern. Additionally, parasitic elements may further help the radiation pattern of the high band.

Accordingly, exemplary embodiments of antenna assemblies are disclosed that may be mounted on top of a vehicle for a MIMO system operable with LTE, Wi-Fi, and GPS bands. As disclosed herein, antenna measurements were performed on a ground plane having a diameter of about 300 mm or 1 foot, which indicates suitability for use on large ground planes or having a ground plate mounted on a nonmetal plate roof of a vehicle. Exemplary embodiments disclosed herein may have good omnidirectionality and good isolation (e.g., −15 dB, −7 dB, etc.) and provide very good performance for a MIMO system even though the antenna assembly has a relatively low profile and small diameter form factor. Other than the requirement of omnidirectionality, the regulations of different regions may require gain to be below a certain gain level. Lowering gain is challenging especially for the high band where the radiation pattern tends to directed toward a top direction due to the reflection of the mounting surface. Plus, a higher gain will be observed at the higher frequency for a bigger mounting surface, such that an introduction of loss to the system may provide a reasonable tradeoff for the antenna design.

The inventors hereof have developed and disclosed herein exemplary embodiments of multiport multiband antenna assemblies having different configurations, arrangements, and orientations of the antennas or radiators which may be used for vehicular application or other applications. For example, exemplary embodiments disclosed herein are not limited to vehicular applications, but may be used inside a building, e.g., as an infrastructure or in-building antenna system which may require a modification to the mechanical structure, etc.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances. Whether or not modified by the term "about", the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A multiport multiband vehicular antenna assembly, the antenna assembly comprising:
    at least one radiator operable with one or more cellular frequencies;
    at least one radiator operable with one or more internet frequencies;
    at least one radiator operable with one or more satellite navigation frequencies;
    a base assembly; and
    a radome coupled to the base assembly;
    wherein the radiators are within an interior enclosure cooperatively defined by the radome and the base assembly; and
    wherein the at least one radiator operable with one or more cellular frequencies comprises two or more LTE multi-input-multi-output (MIMO) radiators spaced apart from each other and/or adjacent opposite sides of the base assembly.

2. The antenna assembly of claim 1, wherein the radiators are all positioned on and/or supported by the same base assembly and located under the same radome of a single roof-mount antenna system.

3. A multiport multiband vehicular antenna assembly, the antenna assembly comprising:
    at least one radiator operable with one or more cellular frequencies;
    at least one radiator operable with one or more internet frequencies;
    at least one radiator operable with one or more satellite navigation frequencies;
    a base assembly;
    a radome coupled to the base assembly;
    wherein the radiators are within an interior enclosure cooperatively defined by the radome and the base assembly; and
    wherein the at least one radiator operable with one or more cellular frequencies comprises a top-loaded LTE monopole radiator including a first printed circuit board (PCB) and an electrically-conductive monopole trace along the first PCB.

4. The antenna assembly of claim 3, wherein the top-loaded LTE monopole radiator comprises a second PCB including electrically-conductive material thereon that is electrically connected to electrically-conductive material along an upper portion of the first PCB.

5. The antenna assembly of claim 3, wherein the first PCB comprises:
    a shorting point located at a substantially center of the first PCB;
    an electrically-conductive shorted trace extending downwardly from the shorting point; and
    electrically-conductive shorted parasitic traces along opposite sides of the electrically-conductive shorted trace for symmetrically shorting to ground;
    a feed point at a bottom of the first PCB; and
    an open non-conductive area defined above the feed point by the electrically-conductive monopole trace including inwardly tapering or multiple step portions of the electrically-conductive monopole trace.

6. A multiport multiband vehicular antenna assembly, the antenna assembly comprising:
    at least one radiator operable with one or more cellular frequencies;
    at least one radiator operable with one or more internet frequencies;
    at least one radiator operable with one or more satellite navigation frequencies;
    a base assembly;
    a radome coupled to the base assembly;
    wherein the radiators are within an interior enclosure cooperatively defined by the radome and the base assembly; and
    wherein the at least one radiator operable with one or more cellular frequencies comprises an extended ground loaded printed circuit board LTE monopole radiator.

7. A multiport multiband vehicular antenna assembly, the antenna assembly comprising:
    at least one radiator operable with one or more cellular frequencies;
    at least one radiator operable with one or more internet frequencies;
    at least one radiator operable with one or more satellite navigation frequencies;
    a base assembly;
    a radome coupled to the base assembly;
    wherein the radiators are within an interior enclosure cooperatively defined by the radome and the base assembly; and
    wherein the at least one radiator operable with one or more cellular frequencies comprises:
        a printed circuit board (PCB);
        a feed along a lower portion of the PCB;
        a monopole radiator on a first surface of the PCB and including a stepped portion near the feed;
        extended ground elements on the first surface of the PCB along opposite sides of the stepped portion of the monopole radiator; and
        an extended ground loading element along an opposite second surface of the PCB and electrically connected to the monopole radiator.

8. The antenna assembly of claim 7, wherein:
    the monopole radiator is symmetric which helps improve omnidirectionality; and/or
    the stepped portion of the monopole radiator is operable for providing a gradual change of impedance over frequencies to enable broadband characteristic; and/or
    the extended ground elements are operable for providing a gradual change of impedance;
    and/or the extended ground loading element is operable for broadening bandwidth.

9. A multiport multiband vehicular antenna assembly, the antenna assembly comprising:

at least one radiator operable with one or more cellular frequencies;
at least one radiator operable with one or more internet frequencies;
at least one radiator operable with one or more satellite navigation frequencies;
a base assembly;
a radome coupled to the base assembly;
wherein the radiators are within an interior enclosure cooperatively defined by the radome and the base assembly; and
wherein the at least one radiator operable with one or more internet frequencies comprises two active Wi-Fi radiators spaced apart from each other and/or adjacent opposite sides of the base assembly.

10. A multiport multiband vehicular antenna assembly, the antenna assembly comprising:
at least one radiator operable with one or more cellular frequencies;
at least one radiator operable with one or more internet frequencies;
at least one radiator operable with one or more satellite navigation frequencies;
a base assembly;
a radome coupled to the base assembly;
wherein the radiators are within an interior enclosure cooperatively defined by the radome and the base assembly; and
wherein the at least one radiator operable with one or more internet frequencies comprises a monopole radiator on a printed circuit board (PCB).

11. The antenna assembly of claim 10, wherein the at least one radiator operable with one or more internet frequencies includes:
a U-shaped slot in the monopole radiator;
a non-linear transmission line for feeding the monopole radiator; and
parasitic elements along opposite sides of the monopole radiator.

12. The antenna assembly of claim 11, wherein:
the U-shaped slot is operable for changing frequency ratio for dual band operation for a first frequency band from 2.3 GHz to 2.7 GHz and a second frequency band from 4.9 GHz to 5.9 GHz; and/or
a longer length of the non-linear transmission line reduces gain; and/or
the parasitic elements are operable for improving omni-directionality from 4.9 GHz to 5.9 GHz and reducing excessive gain.

13. A multiport multiband vehicular antenna assembly, the antenna assembly comprising:
at least one radiator operable with one or more cellular frequencies;
at least one radiator operable with one or more internet frequencies;
at least one radiator operable with one or more satellite navigation frequencies;
a base assembly;
a radome coupled to the base assembly;
wherein the radiators are within an interior enclosure cooperatively defined by the radome and the base assembly; and
wherein the at least one radiator operable with one or more satellite navigation frequencies is located at about a center of the base assembly and/or with a diagonal orientation relative to the at least one radiator operable with one or more internet frequencies.

14. A multiport multiband vehicular antenna assembly, the antenna assembly comprising:
at least one radiator operable with one or more cellular frequencies;
at least one radiator operable with one or more internet frequencies;
at least one radiator operable with one or more satellite navigation frequencies;
a base assembly;
a radome coupled to the base assembly;
wherein the radiators are within an interior enclosure cooperatively defined by the radome and the base assembly; and
wherein the base assembly comprises:
a printed circuit board (PCB) having an electrically-conductive material along a top surface of the PCB that defines a ground plane for the antenna assembly; and
electrically-conductive material along a bottom surface of the PCB and electrically connected to the ground plane to thereby define an extended ground plane for the antenna assembly.

15. The antenna assembly of claim 14, wherein:
the at least one radiator operable with one or more cellular frequencies comprises at least one Long Term Evolution (LTE) radiator operable with LTE frequencies;
the at least one radiator operable with one or more internet frequencies comprises at least one Wi-Fi radiator operable with Wi-Fi frequencies;
at least one radiator operable with one or more satellite navigation frequencies comprises at least one active Global Positioning System (GPS) radiator operable with GPS frequencies; and
wherein the at least one LTE radiator, the at least one Wi-Fi radiator, and the at least one active GPS radiator are within the interior enclosure cooperatively defined by the radome and the base assembly.

16. The antenna assembly of claim 14, wherein the at least one radiator operable with one or more cellular frequencies comprises two or more LTE multi-input-multi-output (MIMO) radiators spaced apart from each other and/or adjacent opposite sides of the base assembly.

17. The antenna assembly of claim 14, wherein the base assembly further comprises:
a base plate below the PCB, and
lossy material along a bottom surface of the base plate, whereby the lossy material is configured to be operable for lowering current interaction between the ground plane and a mounting surface for the antenna assembly.

18. A multiport multiband vehicular antenna assembly, the antenna assembly comprising:
at least one radiator operable with one or more cellular frequencies;
at least one radiator operable with one or more internet frequencies;
at least one radiator operable with one or more satellite navigation frequencies;
a base assembly;
a radome coupled to the base assembly;
wherein the radiators are within an interior enclosure cooperatively defined by the radome and the base assembly; and
wherein:
the antenna assembly includes at least three ports; or
the antenna assembly includes at least four ports, the at least one radiator operable with one or more cellular frequencies comprises two or more LTE radiators spaced apart from each other and/or adjacent opposite sides of the base assembly, the at least one radiator operable with one or more satellite navigation frequencies includes an active GPS radiator located at about a center of the base assembly and/or between the two or more LTE radiators; or the antenna assembly includes at least four ports, the at least one radiator operable with one or more internet frequencies comprises two or more Wi-Fi radiators spaced apart from each other and/or adjacent opposite sides of the base assembly, the at least one radiator operable with one or more satellite navigation frequencies includes an active GPS radiator located at about a center of the base assembly and/or between the two or more Wi-Fi radiators; or the antenna assembly includes at least five ports, the at least one radiator operable with one or more cellular frequencies comprises two or more LTE radiators spaced apart from each other and/or adjacent opposite sides of the base assembly, the at least one radiator operable with one or more internet frequencies comprises two or more Wi-Fi radiators spaced apart from each other and/or adjacent other opposite sides of the base assembly, the at least one radiator operable with one or more satellite navigation frequencies includes a GPS radiator located at about a center of the base assembly and/or between the two or more LTE radiators and the two or more Wi-Fi radiators.

19. A multiport multiband vehicular antenna assembly, the antenna assembly comprising:
- at least one radiator operable with one or more cellular frequencies;
- at least one radiator operable with one or more internet frequencies;
- at least one radiator operable with one or more satellite navigation frequencies;
- a base assembly;
- a radome coupled to the base assembly;
- wherein the radiators are within an interior enclosure cooperatively defined by the radome and the base assembly; and
- wherein:
  - the at least one radiator operable with one or more cellular frequencies includes three LTE radiators spaced apart from each other and adjacent sides of the base assembly, each of the LTE radiators including a shorting element at about a center of the LTE radiator;
  - the at least one radiator operable with one or more internet frequencies includes a Wi-Fi radiator adjacent a side of the base assembly and between two of the three LTE radiators; and
  - the at least one radiator operable with one or more satellite navigation frequencies includes a GPS radiator located at about a center of the base assembly between the three LTE radiators.

20. A multiport multiband vehicular antenna assembly, the antenna assembly comprising:
- at least three radiators operable with one or more cellular frequencies and including a shorting element at about center of the corresponding radiator;
- at least one radiator operable with one or more internet frequencies;
- at least one radiator operable with one or more satellite navigation frequencies;
- a printed circuit board (PCB) having an electrically-conductive material along a top surface of the PCB that defines a ground plane for the antenna assembly; and
- electrically-conductive material along a bottom surface of the PCB underneath each of the three radiators operable with one or more cellular frequencies, the electrically-conductive material electrically connected to the ground plane to thereby define an extended ground plane for the antenna assembly.

\* \* \* \* \*